US008635168B2

(12) United States Patent
Junger et al.

(10) Patent No.: US 8,635,168 B2
(45) Date of Patent: Jan. 21, 2014

(54) METHOD AND APPARATUS FOR ENABLING PURCHASERS OF PRODUCTS TO OBTAIN RETURN INFORMATION AND TO INITIATE PRODUCT RETURNS VIA AN ON-LINE NETWORK CONNECTION

(75) Inventors: Peter J. Junger, Redmond, WA (US); Cassandra B. Shoecraft, Redmond, WA (US); David G. Koon, Redmond, WA (US)

(73) Assignee: Nintendo of America Inc., Redmond, WA (US)

( * ) Notice: Subject to any disclaimer, the term of this patent is extended or adjusted under 35 U.S.C. 154(b) by 0 days.

(21) Appl. No.: 13/418,812

(22) Filed: Mar. 13, 2012
(Under 37 CFR 1.47)

(65) Prior Publication Data
US 2012/0226620 A1 Sep. 6, 2012

Related U.S. Application Data

(60) Division of application No. 12/801,118, filed on May 24, 2010, now Pat. No. 8,156,026, which is a
(Continued)

(51) Int. Cl.
*G06Q 30/00* (2012.01)
*G06Q 10/00* (2012.01)

(52) U.S. Cl.
USPC ............ 705/340; 705/302; 705/303; 705/304

(58) Field of Classification Search
USPC ................. 705/1–40, 302–304, 340; 235/380
See application file for complete search history.

(56) References Cited

U.S. PATENT DOCUMENTS

| 789,106 A | 5/1905 | Seymour |
| 1,330,368 A | 2/1920 | Boos |

(Continued)

FOREIGN PATENT DOCUMENTS

| BR | PI 9813567-8 | 10/2000 |
| BR | 0101819-1 | 2/2003 |

(Continued)

OTHER PUBLICATIONS

Jan. 6, 2005 Blog (Message 4 of 17) about Schuman article "Bar-Code Scam at Wal-Mart: A Matter of Priorities".

(Continued)

*Primary Examiner* — Gregory Johnson
(74) *Attorney, Agent, or Firm* — Nixon & Vanderhye PC

(57) ABSTRACT

An electronic registration system facilitates authorized product returns. A retailer sales associate is prompted to enter individual product identification information such as an individual serial number. This individual product identification information is stored in a database, along with the date on which the product was sold and an appropriate UPC code, SKU number, or manufacturer code. A check digit algorithm may be used to verify the serial number prior to storage. A sales receipt may be imprinted with at least the date of the transaction and the serial number. When a product is returned, the retailer may cross-reference the serial number on the product with that on the receipt to verify the sales receipt. Otherwise, the database may be searched for sales information. A customer may also access a return authorization engine via the Internet to obtain return approval, an authorization number, return instructions, etc.

20 Claims, 59 Drawing Sheets

Related U.S. Application Data

(60) continuation of application No. 10/275,548, filed as application No. PCT/US01/14694 on May 8, 2001, now Pat. No. 7,797,164, which is a continuation-in-part of application No. PCT/US99/26460, filed on Nov. 10, 1999, and a continuation-in-part of application No. 09/065,552, filed on Apr. 24, 1998, now Pat. No. 6,085,172, which is a continuation-in-part of application No. 08/725,259, filed on Oct. 2, 1996, now Pat. No. 6,018,719, said application No. PCT/01/14694 is a continuation-in-part of application No. 09/362,187, filed on Jul. 28, 1999, now Pat. No. 6,757,663, which is a continuation of application No. 08/725,259, filed on Oct. 2, 1996, now Pat. No. 6,018,719, which is a continuation of application No. 09/314,023, filed on May 19, 1999, now Pat. No. 5,978,774.

(60) Provisional application No. 60/203,933, filed on May 12, 2000, provisional application No. 60/108,170, filed on Nov. 13, 1998, provisional application No. 60/119,631, filed on Feb. 11, 1999.

(56) References Cited

U.S. PATENT DOCUMENTS

| | | | |
|---|---|---|---|
| 1,393,489 | A | 10/1921 | Boos |
| 1,476,819 | A | 12/1923 | Hope |
| 4,312,037 | A | 1/1982 | Yamakita |
| 4,414,467 | A | 11/1983 | Gould et al. |
| 4,458,802 | A | 7/1984 | Maciver et al. |
| 4,563,739 | A | 1/1986 | Gerpheide et al. |
| 4,598,810 | A | 7/1986 | Shore et al. |
| 4,668,150 | A | 5/1987 | Blumberg |
| 4,734,005 | A | 3/1988 | Blumberg |
| 4,750,119 | A | 6/1988 | Cohen et al. |
| 4,789,054 | A | 12/1988 | Shore et al. |
| 4,792,018 | A | 12/1988 | Humble et al. |
| 4,803,348 | A | 2/1989 | Lohrey et al. |
| 4,812,629 | A | 3/1989 | O'Neil et al. |
| 4,814,592 | A | 3/1989 | Bradt et al. |
| 4,839,505 | A | 6/1989 | Bradt et al. |
| 4,858,743 | A | 8/1989 | Paraskevakos et al. |
| 4,866,661 | A | 9/1989 | De Prins |
| 4,871,054 | A | 10/1989 | Murray |
| 4,884,212 | A | 11/1989 | Stutsman |
| 4,893,705 | A | 1/1990 | Brown |
| 4,896,024 | A | 1/1990 | Morello et al. |
| 4,903,815 | A | 2/1990 | Hirschfeld et al. |
| 4,967,906 | A | 11/1990 | Morello et al. |
| 4,984,155 | A | 1/1991 | Geier et al. |
| 4,997,076 | A | 3/1991 | Hirschfeld et al. |
| 5,007,518 | A | 4/1991 | Crooks et al. |
| 5,020,958 | A | 6/1991 | Tuttobene |
| 5,028,766 | A | 7/1991 | Shah |
| 5,042,686 | A | 8/1991 | Stucki |
| 5,128,520 | A | 7/1992 | Rando et al. |
| 5,128,527 | A | 7/1992 | Kawai et al. |
| 5,133,441 | A | 7/1992 | Brown |
| 5,139,384 | A | 8/1992 | Tuttobene |
| 5,143,193 | A | 9/1992 | Geraci |
| 5,159,560 | A | 10/1992 | Newell et al. |
| 5,216,612 | A | 6/1993 | Cornett et al. |
| 5,231,569 | A | 7/1993 | Myatt et al. |
| 5,256,863 | A | 10/1993 | Ferguson et al. |
| 5,257,741 | A | 11/1993 | Rode et al. |
| 5,273,183 | A | 12/1993 | Tuttobene |
| 5,311,424 | A | 5/1994 | Mukherjee et al. |
| 5,367,148 | A | 11/1994 | Storch et al. |
| 5,372,386 | A | 12/1994 | Mills |
| 5,375,240 | A | 12/1994 | Grundy |
| 5,414,252 | A | 5/1995 | Shinoda et al. |
| 5,416,306 | A | 5/1995 | Imahata |
| 5,478,990 | A | 12/1995 | Montanari et al. |
| 5,520,990 | A | 5/1996 | Rotermund |
| 5,521,815 | A | 5/1996 | Rose, Jr. |
| 5,537,314 | A | 7/1996 | Kanter |
| 5,541,394 | A | 7/1996 | Kouchi et al. |
| 5,581,064 | A | 12/1996 | Riley et al. |
| 5,602,377 | A | 2/1997 | Beller et al. |
| 5,671,279 | A | 9/1997 | Elgamal |
| 5,712,989 | A | 1/1998 | Johnson et al. |
| 5,721,832 | A | 2/1998 | Westrope et al. |
| 5,737,726 | A | 4/1998 | Cameron et al. |
| 5,745,036 | A | 4/1998 | Clare |
| 5,799,285 | A | 8/1998 | Klingman |
| 5,804,803 | A | 9/1998 | Cragun et al. |
| 5,857,175 | A | 1/1999 | Day et al. |
| 5,889,270 | A | 3/1999 | Van Haagen et al. |
| 5,890,138 | A | 3/1999 | Godin |
| 5,895,453 | A | 4/1999 | Cook |
| 5,913,210 | A | 6/1999 | Call |
| 5,918,213 | A | 6/1999 | Bernard et al. |
| 5,918,214 | A | 6/1999 | Perkowski |
| 5,949,335 | A | 9/1999 | Maynard |
| 5,950,173 | A | 9/1999 | Perkowski |
| 5,966,450 | A | 10/1999 | Hosford et al. |
| 5,968,110 | A | 10/1999 | Westrope et al. |
| 5,978,774 | A | 11/1999 | Rogers et al. |
| 5,984,508 | A | 11/1999 | Hurley |
| 6,014,635 | A | 1/2000 | Harris et al. |
| 6,016,480 | A | 1/2000 | Houvener et al. |
| 6,018,719 | A * | 1/2000 | Rogers et al. .................. 705/24 |
| 6,025,780 | A | 2/2000 | Bowers et al. |
| 6,029,139 | A | 2/2000 | Cunningham et al. |
| 6,029,141 | A | 2/2000 | Bezos et al. |
| 6,039,244 | A | 3/2000 | Finsterwald |
| 6,049,778 | A | 4/2000 | Walker et al. |
| 6,055,511 | A | 4/2000 | Luebbering et al. |
| 6,064,979 | A | 5/2000 | Perkowski |
| 6,085,167 | A | 7/2000 | Iguchi |
| 6,085,172 | A | 7/2000 | Junger |
| 6,105,001 | A | 8/2000 | Masi et al. |
| 6,115,690 | A * | 9/2000 | Wong .......................... 705/7.27 |
| 6,119,099 | A | 9/2000 | Walker et al. |
| 6,119,164 | A | 9/2000 | Basche |
| 6,125,352 | A | 9/2000 | Franklin et al. |
| 6,131,088 | A | 10/2000 | Hill |
| 6,134,533 | A | 10/2000 | Shell |
| 6,148,249 | A | 11/2000 | Newman |
| 6,154,738 | A | 11/2000 | Call |
| 6,219,652 | B1 | 4/2001 | Carter et al. |
| 6,222,914 | B1 | 4/2001 | McMullin |
| 6,269,344 | B1 | 7/2001 | Junger |
| 6,317,028 | B1 | 11/2001 | Valiulis |
| 6,463,421 | B2 | 10/2002 | Junger |
| 6,536,659 | B1 | 3/2003 | Hauser |
| 6,542,933 | B1 | 4/2003 | Durst et al. |
| 6,550,685 | B1 | 4/2003 | Kindberg |
| 6,554,187 | B2 | 4/2003 | Otto |
| 6,606,608 | B1 | 8/2003 | Bezos |
| 6,697,812 | B1 | 2/2004 | Martin |
| 6,746,053 | B1 | 6/2004 | Afzali-Ardakani et al. |
| 6,757,663 | B1 | 6/2004 | Rogers et al. |
| 6,834,268 | B2 | 12/2004 | Junger |
| 6,933,848 | B1 | 8/2005 | Stewart et al. |
| 6,947,941 | B1 | 9/2005 | Koon |
| 6,965,866 | B2 | 11/2005 | Klein |
| 7,000,834 | B2 | 2/2006 | Hind et al. |
| 7,117,227 | B2 | 10/2006 | Call |
| 7,118,478 | B2 | 10/2006 | Fayter et al. |
| 7,143,055 | B1 | 11/2006 | Perkowski |
| 7,162,440 | B2 | 1/2007 | Koons |
| 7,376,572 | B2 | 5/2008 | Siegel |
| 7,379,899 | B1 | 5/2008 | Junger |
| 7,415,617 | B2 | 8/2008 | Ginter et al. |
| 7,455,230 | B2 | 11/2008 | Junger et al. |
| 7,580,860 | B2 | 8/2009 | Junger |
| 7,693,731 | B1 | 4/2010 | Weber et al. |
| 7,729,923 | B2 | 6/2010 | O'Connor |
| 7,797,164 | B2 | 9/2010 | Junger et al. |
| 7,840,439 | B2 | 11/2010 | Junger |

(56) References Cited

U.S. PATENT DOCUMENTS

| | | |
|---|---|---|
| 7,850,081 B2 | 12/2010 | Swan et al. |
| 7,890,373 B2 | 2/2011 | Junger |
| 2002/0010627 A1 | 1/2002 | Lerat |
| 2002/0032612 A1 | 3/2002 | Williams et al. |
| 2002/0116274 A1 | 8/2002 | Hind et al. |
| 2002/0133425 A1 | 9/2002 | Pederson et al. |
| 2002/0143671 A1 | 10/2002 | Afzali-Ardakani et al. |
| 2003/0050891 A1 | 3/2003 | Cohen |
| 2003/0094494 A1 | 5/2003 | Blanford et al. |
| 2003/0126034 A1 | 7/2003 | Cheney et al. |
| 2003/0141358 A1 | 7/2003 | Hudson et al. |
| 2004/0006514 A1 | 1/2004 | Rogers |
| 2004/0054900 A1 | 3/2004 | He |
| 2004/0153344 A1 | 8/2004 | Bui et al. |
| 2004/0172260 A1 | 9/2004 | Junger et al. |
| 2004/0195341 A1 | 10/2004 | Lapstun et al. |
| 2005/0097054 A1 | 5/2005 | Dillon |
| 2005/0100144 A1 | 5/2005 | O'Connor |
| 2005/0137882 A1 | 6/2005 | Cameron et al. |
| 2006/0175401 A1 | 8/2006 | Roberts |
| 2007/0100761 A1 | 5/2007 | Dillon |
| 2007/0185788 A1 | 8/2007 | Dillon |
| 2008/0008348 A1 | 1/2008 | Metois |
| 2008/0052184 A1 | 2/2008 | Junger et al. |
| 2008/0059226 A1 | 3/2008 | Melker |
| 2008/0262948 A1 | 10/2008 | Grady et al. |
| 2009/0150170 A1 | 6/2009 | Junger et al. |
| 2009/0281935 A1 | 11/2009 | Junger |
| 2010/0185533 A1 | 7/2010 | O'Connor |
| 2010/0235290 A1 | 9/2010 | Junger et al. |
| 2010/0257486 A1 | 10/2010 | Smith |
| 2010/0325020 A1 | 12/2010 | Junger et al. |
| 2011/0016008 A1 | 1/2011 | Maraz et al. |
| 2011/0029397 A1 | 2/2011 | Junger |
| 2011/0066514 A1 | 3/2011 | Maraz |

FOREIGN PATENT DOCUMENTS

| | | |
|---|---|---|
| BR | PI 0503016-1 | 10/2005 |
| BR | PI 0505846-5 | 9/2007 |
| CA | 2374623 | 4/2001 |
| CA | 2408553 | 11/2001 |
| CA | 2404814 | 9/2002 |
| CN | 1177408 | 3/1998 |
| CN | 1289972 | 4/2001 |
| CN | 101068731 | 11/2007 |
| CN | 101089871 | 12/2007 |
| DE | 3 315 724 | 10/1984 |
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| EP | 1028386 | 8/2000 |
| EP | 1841195 | 11/2000 |
| EP | 1195704 | 4/2002 |
| EP | 1246109 | 10/2002 |
| EP | 1571541 | 3/2005 |
| EP | 1667018 | 10/2005 |
| EP | 2036015 | 12/2007 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| GT | 200000127 | 10/2000 |
| GT | 200000061 | 11/2000 |
| GT | 200300100 | 3/2006 |
| GT | 200200141 | 7/2007 |
| IN | 1072/CHENP/2003 | 7/2005 |
| IN | 1763/CHENP/2003 | 3/2007 |
| IN | 2137/CHENP/2005 | 7/2007 |
| IN | 538/MUM/2008 | 4/2008 |
| IN | 8258/DELNP/2007 | 4/2008 |
| IN | 8266/DELNP/2007 | 7/2008 |
| IN | 303/KOLNP/2008 | 12/2008 |
| IN | 53/KOL/2008 | 4/2009 |
| IN | 1421/KOLNP/2009 | 6/2009 |
| JP | 02-139698 | 5/1990 |
| JP | 04-347793 | 12/1992 |
| JP | 405178422 A | 7/1993 |
| JP | 405342482 A | 12/1993 |
| JP | 08-124033 | 5/1996 |
| JP | 10-188141 | 7/1998 |
| JP | 10-340301 | 12/1998 |
| JP | 11066176 | 3/1999 |
| JP | 11-143954 | 5/1999 |
| JP | 2000-123078 | 4/2000 |
| JP | 2002-279090 | 9/2002 |
| JP | 2002-133080 | 10/2002 |
| JP | 2003-316871 | 11/2003 |
| JP | 2005-141374 | 6/2005 |
| JP | 2005-234981 | 9/2005 |
| JP | 2007-226516 | 9/2007 |
| JP | 2007-257561 | 10/2007 |
| JP | 2008-197768 | 8/2008 |
| JP | 2009-032171 | 2/2009 |
| MX | 218248 | 3/1998 |
| MX | PA/a/2000/002497 | 3/1999 |
| MX | 221246 | 7/1999 |
| MX | PA/a/2002/000636 | 11/2001 |
| MX | MX/a/2007/014520 | 11/2006 |
| WO | 87/00948 | 2/1987 |
| WO | 88/02524 | 4/1988 |
| WO | 88/06771 | 9/1988 |
| WO | 89/09460 | 10/1989 |
| WO | 92/01273 | 1/1992 |
| WO | 99/33016 | 7/1999 |

OTHER PUBLICATIONS

Jan. 13, 2005 Blog (Message 14 of 17) about Schuman article"Bar-Code Scam at Wal-Mart: A Matter of Priorities".

Canadian Search Report for CA Patent Application No. 2,350,551, dated Jan. 21, 2004.

Deposition of Peter J. Junger, vol. 1 & 2 (Nov. 8-9, 2001) and Exhibits 1-4 & 8-19.

Deposition of Philip M. Rogers (Nov. 7, 2001) and Exhibits 1-19.

Emigh, Jacqueline, "Item-Level RFID Is Years Away for Retailers", eWeek, Jan. 5, 2005.

Hughes Network Systems, LLC, "HughesNet Terms & Conditions", http://www.nationwidesatellite.com/HughesNet/service/HughesNet_terms.asp, available online Sep. 2, 2008.

Information Disclosure Statement filed in U.S. Appl. No. 09/362,187 on Oct. 26, 2001.

Information Disclosure Statement filed in U.S. Appl. No. 09/494,540 on Jan. 31, 2000.

Information Disclosure Statement filed in U.S. Appl. No. 09/809,072 on Oct. 26, 2001.

Scala, Betsy Video Business, "Distributors seek 30-day returns" , v 13 , n. 3 , p. I + Jan. 22, 1993.

Scala, Betsy Video Business, "Distributors seek 30-day returns" , v 15 , n 39 , p. I + Oct. 6, 1995.

Schuman, Evan,"Bar-Code Scam at Wal-Mart: A Matter of Priorities", eWeek, Jan. 5, 2005.

Schuman, Evan,"Wal-Mart Stung in $1.5 Million Bar-Code Scam", eWeek, Jan. 5, 2005.

Information Disclosure Statement filed in U.S. Appl. No. 09/509,021, on Oct. 26, 2001.

Information Disclosure Statement filed in U.S. Appl. No. 09/065,552, on Jul. 19, 1999.

Information Disclosure Statement filed in U.S. Appl. No. 08/725,259, on Oct. 5, 1998.

John Longwell, "Robec Links Its 18 Sales Facilities Via Newly Adopted NetWare System", Computer Reseller News, Sep. 6, 1993.

Software Maker Promises Many Happy Returns, Drug Topics, Mar. 4, 1996, vol. 140, No. 5, pp. 124-128.

Direct Return 2000, Software Overview, http://www.directreturn.com/software_overview.htm, Oct. 2, 2000.

(56) References Cited

OTHER PUBLICATIONS

Amazon.com Returns Policy, Our Return Policy is Simple, Jun. 20, 2000, Amazon.com, www.amazon.com/exec/obidos/subst/help/returns-policy.html, pp. 1-2.
Leyden, "Burgled mum finds stolen iPod on eBay," The Register, May 17, 2005, 1 page.
"Man accused in Lego selling scam," http://www.kptv.com/Global/story.asp?S=4137050&nav=munil56_2, Nov. 18, 2005, 1 page.
Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.
PR Newswire, "CompuServe Introduces Electronic Product Registration Software", PR Newswire Association, Inc., Mar. 10, 1994, 2 pages.
Longwell, "Western Digital Wins—Price/performance gives driver maker victory margin", Computer Reseller News, CMP Publications, Inc., Jun. 28, 1993, 3 pages.
Grace, "ABCD Looks to Adopt EDI Transaction Sets", Computer Reseller News, CMP Publications, Inc., Jun. 28, 1993, 2 pages.
Discount Store News, "New Policy System can Par Suspect Returns, Cut Losses", Discount Store News, Lebhar-Friedman Inc., Jan. 1, 1996, 2 pages.
Synchronics® User Manual: Point of Sale, Version 6.5, Apr. 1993 (ON 004464-ON 005116).
Synchronics® User Manual: Inventory Plus, Version 6.5, Apr. 1993 (ON 005117-ON 005892).
Collins, David Jarrett and Nancy Nasuti Whipple, Using Bar Code: Why It's Taking Over, Second Edition (ON 003696-ON 004031).
Birnbaum, Henry, General Information Manual: IBM Circulation Control at Brooklyn College Library, 29pp. (ON 001822-ON 001850.
White, Howard S., Library Technology Reports, Mar.-Apr. 1982, vol. 18,No. 2, pp. 178-184 (ON 001851-ON 001858).
Cooper, Michael D., Design of Library Automation Systems, pp. 83-109 (ON 1859-ON 001873).
Corbin, John, Developing Computer-Based Library Systems, pp. 144-149 (ON 001874-ON 001877).
DataPhase, Inc. Automated Circulation System, 43 pp. (ON 001878-ON 001904).
Dranov, Paula, Automated Library Circulation Systems, 1977-78, pp. 24-47 (ON 001905-ON 001929).
Hoadley, Irene Braden and A. Robert Thorson, An Automated On-Line Circulation System: Evaluation, Development, Use, 1973, 19 pp. (ON 001930-On 001948).
Meyer, James, "NOTIS: The System and Its Features", Library Hi Tech, Issue 10, vol. 3, No. 2, 1985, pp. 81-89 (ON 001949-ON 001959).
Dowlin, Kenneth E., "MAGGIE III: The Prototypical Library System", Library Hi Tech, Issue 16, vol. 4, No. 4, Winter 1986, pp. 7-15 (ON 001960-ON 001970).
Matthews, Joseph R., "Graphical User Interfaces GUI in Library Products", Library Technology Reports, vol. 32, No. 1, Jan. 1996, p. 53 (ON 001972-ON 001976).
Saffady, William, "Integrated Library Systems for Microcomputers and Mainframes: A Vendor Study", Library Techology Reports, vol. 30, No. 1, Jan. 1994, p. 5 (ON 001977-ON 002087).
Saffady, William, "Vendors of Integrated Library Systems for Minicomputers and Mainframes: An Industry Report, part 1", Library Techology Reports, vol. 33, No. 2, Mar. 1997, p. 161 (ON 002088-OB 002096).
Saffady, William, "Vendors of Integrated Library Systems for Microcomputers and Mainframes: An Industry Report, part 2", Library Techology Reports, vol. 33, No. 3, May 1997, p. 277 (ON 002097-ON 002138).
Salton, Gerard, Dynamic Information and Library Processing, pp. 62-69 (ON 002139-ON 002143).
Grosch, Audrey N., Distributed Computing and the Electronic Library: Micros to Superminis, pp. 78-79 (ON 002144-ON 002146).
Reynolds, Dennis, Library Automation: Issues and Applications, pp. 42-49 and pp. 146-149 (ON 002147-ON 002153).
Salmon, Stephen R., Library Automation Systems, p. 239 (ON 002154-ON 002155).
Synchronics Software Product Information guide, 95 pages.
Direct Return 2000, Software Overview, http://www.directreturn.com/software_overview.htm, Copyright © 2000 Pharmacy Software Solutions, Inc.
"Retailing in Cyberspace", Narda News, Apr. 1995, pp. 21-22.
PR Newswire, "Escada Offers A Garden Variety for Spring", PR Newswire Association, Inc., Mar. 10, 1994, 2 pages.
Automotive News, "Reynolds, ADP differ on superhighway progress", Crain Communications, Inc., Apr. 11, 1994, 3 pages.
Computer Reseller News, "Case Study; Tapping the Channel's 'Best in Class' ", CMP Publications, Inc., Jan. 30, 1995, 2 pages.
Rigney, "User Migrates to Windows NT", InternetWeek, CMP Publications, Inc., Jan. 10, 1994, 2 pages.
Business Wire, "Multimillion-dollar Health-care Products", Business Wire, Inc., Dec. 15, 1993, 2 pages.
Margulis, "Reclaim: an efficient way to handle damaged products", U.S. Distribution Journal, BMT Publications Inc., Mar. 15, 1992, 7 pages.
Jiji Press Ticker Service, "MITI Working Out Business Practice Guidelines", JiJi Press Ltd., Apr. 20, 1990, 1 page.
Jiji Press Ticker Service, "JCCI Issues Booklet to Explain Distribution", JiJi Press Ltd., Jul. 20, 1989, 1 page.
Business Wire, "Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.
LaPlante, "Rugby Darby; From proprietary host to a distributed LAN-based architecture in 2 years", InfoWorld, InfoWorld Media Group, Nov. 15, 1993, 4 pages.
Witt et al., "Distribution: a differentiator in 2000", Material Handling Engineering, Penton Publishing Inc., Oct. 1995, 15 pages.
Grotta, "Return to vendor: the right way to make mail-order returns", PC Sources, Information Access Company, a Thomson Corporation Company, ASAP Coastal Associates Publishing L.P., Feb. 1992, 10 pages.
Consumer Electronics, Warren Publishing, Inc., Consumer Electronics Personals, vol. 35, No. 6, p. 18.
Business Wire, "DataTrend receives award from AT&T Global Information Solutions", Business Wire, Inc., Nov. 7, 1995, 2 pages.
Quinn, "Why Wang took the third-party route", Information Access Company, a Thomson Corporation Company, ASAP Reed Publishing USA, vol. 30, No. 2, p. 30, Feb. 1991.
Rogers et al., "Going Backwards: Reverse Logistics Trends and Practices", Reverse Logistics Executive Council, 1998 (entire book).
IBM Systems Journal, vol. 14, No. 1, 1975, pp. 1-101.
CollegeTermPapers web page printout, "History of Fed Ex", www.collegetermpaper . . . rmPapers/Aviation/history_of_fed_ex.html (Aug. 24, 2001), 7 pages.
Rosenbloom, "Midnight Express", Inc., Jul. 2001, 4 pages.
Sleeper, "FedEx Pushes The Right Buttons to Remain No. 1 In Fast Shipping", Investor's Business Daily, May 25, 2001, 2 pages.
Brewin et al., "Follow That Package!", Computer World, vol. 35, No. 12, Mar. 19, 2001, 4 pages.
Joachim, "FedEx Delivers on CEO's IT Vision", InternetWeek, Oct. 25, 1999, 4 pages.
Federal Express Information Packet, 56 pages (incl. cover and table of contents).
Sigafoos et al., "Absolutely Positively Overnight!: The Unofficial Corporate History of Federal Express", St. Luke Press, 1988, pp. 1-22.
Witt, "How To Master The Art of Returns: Automation Is the Key", Material Handling Engineering, Jun. 1994, pp. 58-60.
Fox, "Return Parts Policy," Aug. 5, 2003, www.foxmacon.com, online, pp. 1-3.
Heller, "High cost of returns prompts industry cooperation," Discount Store News, Oct. 1998, 3 pages.

(56) References Cited

OTHER PUBLICATIONS

"No more scamming Super Mario," Automatic I.D. News, vol. 12, p. 15, Sep. 1996, 3 pages.
"Computer City moves to consolidate returns," Computer Retail Week, v. 6, n. 125, p. 1+, Jan. 22, 1996, 2 pages.
Dreamcom web page print out, www.dreamcomdirect.com/RMA.htm, May 25, 1997, 3 pages.
Dilger, "The other direction," Manufacturing Systems, v. 15, n. 10, pp. 12-13, Oct. 1997, 2 pages.
Nintendo Point of Purchase Mail-In Card.
1994 Nintendo Product Returns Policies and Procedures, 4 pages.
1995 Nintendo Product Returns Policies and Procedures, 4 pages.
1996 Nintendo Product Returns Policies and Procedures, 4 pages.
1992 Nintendo Product Returns Policy, 4 pages.

* cited by examiner

STORE•MART

SUPERCENTER
WE SELL for LESS
STORE # 100
ARLINGTON, VA

ST# 0100 OP# 00000104 TE# 30 TR# 05900

| SERIAL # | G739775156 |

VIDEO SYSTEM 004549671003 W    42.96 J
SUBTOTAL    42.96
SALES TAX 1    3.01
TOTAL    45.97
CASH TEND    50.00
CHANGE DUE    4.03

TC # 6117107432167
* SAVE RECEIPT FOR REFUNDS / EXCHANGES *
*    OF WARRANTY ITEMS PURCHASED    *
THANK YOU FOR SHOPPING WITH US

| 12 / 14 / 95    13 : 37 : 25 |

*Fig. 3*

Customer Service Desk
Product Returns

Fig. 14 Application Overview

*Fig. 15*

Consumer Post-Sale Registration

① Validation

- Brand Name: Sony —1501
- Store Purchased At: Circuit City —1502
- Date Purchased: 1-5-99 —1503
- Serial No.: 1234 —1504
- Product Description: Game Boy —1505

② Registration

- Name:
- Address:
- Phone No.:

Consumer Protection Information

- Privacy Policy
- Intent of Use

*Fig. 16G*

UPC Number: 454-967-1032
Serial Number: G1234567890
Customer's Zip Code: 55432

Game Boy Pocket -- Red

Date Sold: Dec.-15-98
Sold By: Target # 347
Return Status: Mar.-15-99

Payment: $69.99+Tax $3.50 TOTAL $73.49
VISA   Check   Cash   Other

Customer's options:
- Free Warranty repair
- Exchange product for same item
- In-store credit
- Refund Retail Store System

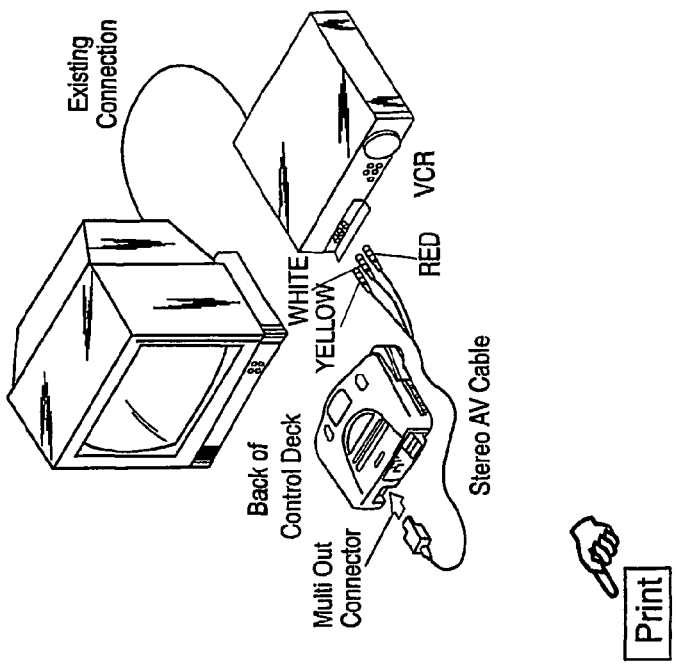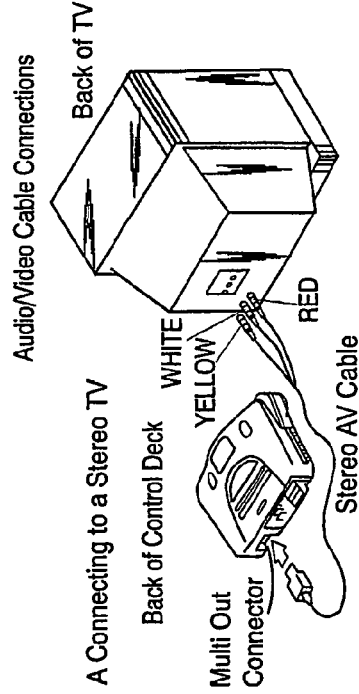
Fig. 17F

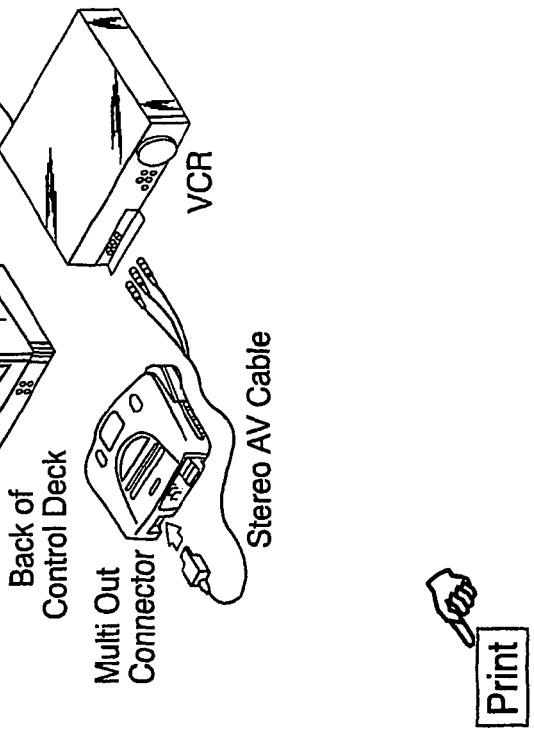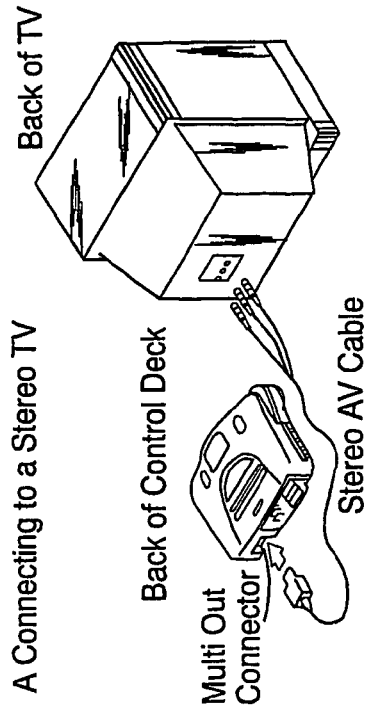
Fig. 17H

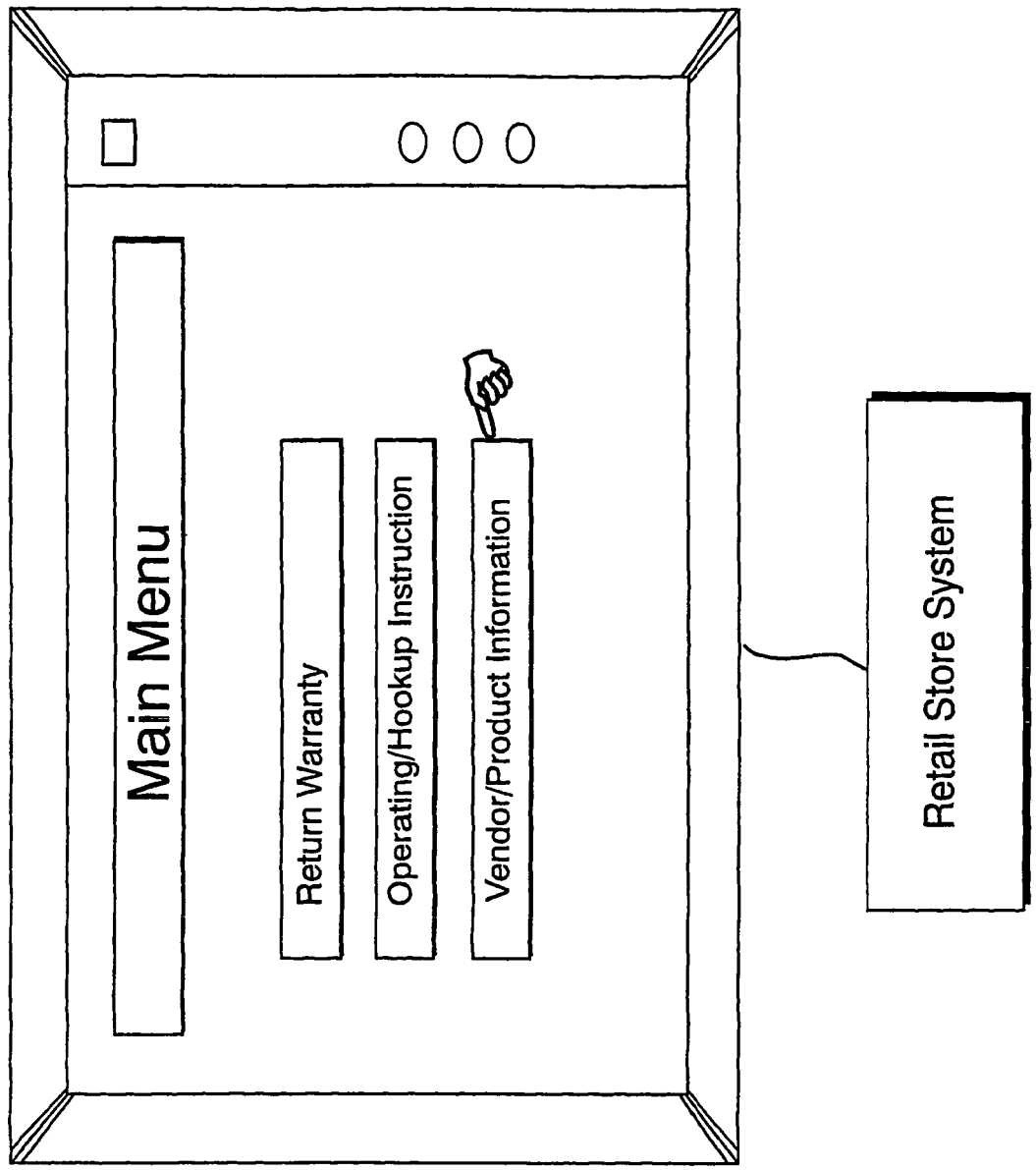

Enter the product's serial number:

Select or enter the retailer name:
Amazon.com
etoys
Wal-Mart
Etc...

Customer enters additional information...such as Name, Address, Invoice number, product number, etc...)

Serial Number Lookup v1.0

1. Scan UPC or Select Brand name
2. Scan Serial Number

Account: Philips
User: Joe Smith
Department: Customer Service
SiRAs ID: 123456

*Contact Information* (?)

| Serial Number | KT00002212801 6 | Brand Name | Philips | Sold By | Best Buy |
|---|---|---|---|---|---|
| UPC | 3784989106 | Item Description | Portable CD Player | Sold Date | December 28, 2001 |

RETURNS INFORMATION

| Return Period has Expired | March 28, 2001 |
|---|---|

Mandatory Return Accessories

| Stereo Headphones | |
| AC/DC Adapter | |

WARRANTY REPAIR INFORMATION

| Good for Parts and Labor Repair | Lookup service Centers |
|---|---|
| Parts and Labor Combined Expiration Date | December 28, 2001 |

Notes

DONE

2. Not good for return with manager override

Not good for return with manager override

 .com   Copyright SiRAS.com This system is for use by SiRAS authorized agents only. SiRAS' technology is protected by one or more of U.S. Patent Nos. 5,978,774; 6,018,719; and 6,085,172. Additional patents pending.

Retailer interface options with SiRAS include : Internet, direct connect, host-to-host, and other customized solutions.

Fig. 24

Serial Number Lookup v1.0

Not good for return with manager override

Account: Philips
User: Joe Smith
Department: Customer Service
SiRAs ID: 123456

Contact Information ?

| Serial Number | KT000022128016 | Brand Name | Philips |
| UPC | 3784989106 | Item Description | Portable CD Player |

| Sold By | Best Buy |
| Sold Date | December 28, 2001 |

RETURNS INFORMATION

| Approved for Return | |
| Mandatory Return Accessories | |
| Stereo Headphones | AC/DC Adapter |

WARRANTY REPAIR INFORMATION

| Good for Parts and Labor Repair | Lookup service Centers |
| Parts and Labor Combined Expiration Date | December 28, 2001 |

Notes

DONE

2. Not good for return with manager override

SiRAS.com Copyright SiRAS.com This system is for use by SiRAS authorized agents only. SiRAS' technology is protected by one or more of U.S. Patent Nos. 5,978,774; 6,018719; and 6,085,172. Additional patents pending.

Fig. 25 Not good for return (less than extended period), good for warranty repair

Serial Number Lookup v1.0

Account: Philips
User: Joe Smith
Department: Customer Service
SiRAs ID: 123456

Contact Information (?)

| Serial Number | KT00022128016 | Brand Name | Philips |
| --- | --- | --- | --- |
| UPC | 3784989106 | Item Description | Portable CD Player |

| | Sold By | Best Buy |
| --- | --- | --- |
| | Sold Date | September 20, 2000 |

RETURNS INFORMATION

Return period has Expired

Mandatory Return Accessories

Stereo Headphones

AC/DC Adapter

WARRANTY REPAIR INFORMATION

Good for Parts and Labor Repair

Parts and Labor Combined Expiration Date — September 14, 2002

Lookup service Centers

Notes

DONE

3. Not good for return(less than extended period), good for warranty repair.

SiRAS.com Copyright SiRAS.com This system is for use by SiRAS authorized agents only. SiRAS' technology is protected by one or more of U.S. Patent Nos. 5,978,774; 6,018719; and 6,085,172. Additional patents pending.

Fig. 26  Not good for return (less than extended period), good for warranty repair

Serial Number Lookup v1.0

Account: Philips
User: Joe Smith
Department: Customer Service
SiRAs ID: 123456

*Contact Information* ?

| Serial Number | KT00022128016 | Brand Name | Philips |
|---|---|---|---|
| UPC | 3784989106 | Item Description | Portable CD Player |
| | | Sold By | Best Buy |
| | | Sold Date | September 20, 2000 |

RETURNS INFORMATION

| Approved for return | |
|---|---|
| Mandatory Return Accessories | |
| Stereo Headphones | AC/DC Adapter |
| | |

WARRANTY REPAIR INFORMATION

| Good for Parts and Labor Repair | |
|---|---|
| Parts and Labor Combined Expiration Date | September 14, 2002 |

Lookup service Centers

Notes

DONE

3. Not good for return (less than extended period), good for warranty repair.

SiRAs.com  Copyright SiRAs.com This system is for use by SiRAS authorized agents only. SiRAS' technology is protected by one or more of U.S. Patent Nos. 5,978,774; 6,018,719; and 6,085,172. Additional patents pending.

*Fig. 27* Not good for return (greater than extended period), good for warranty repair

Serial Number Lookup v1.0

Account: Philips
User: Joe Smith
Department: Customer Service
SiRAs ID: 123456

Contact Information ?

| Serial Number | KT000022128016 | Brand Name | Philips | Sold By | Best Buy |
|---|---|---|---|---|---|
| UPC | 3784989106 | Item Description | Portable CD Player | Sold Date | September 20, 2000 |

RETURNS INFORMATION

Return period has Expired

Mandatory Return Accessories

| Stereo Headphones |
| AC/DC Adapter |

WARRANTY REPAIR INFORMATION

| Good for Parts and Labor Repair | Lookup service Centers |
|---|---|
| Parts and Labor Combined Expiration Date | September 14, 2002 |

Notes

DONE

4. Not good for return (greater than extended period), good for warranty repair.

SiRAS.com  Copyright SiRAS.com This system is for use by SiRAS authorized agents only. SiRAS' technology is protected by one or more of U.S. Patent Nos. 5,978,774; 6,018719; and 6,085,172. Additional patents pending.

Fig. 28

Not good for return (greater than extended period), good for warranty repair

Serial Number Lookup v1.0

Account: Philips
User: Joe Smith
Department: Customer Service
SiRAs ID: 123456

*Contact Information* (?)

| Serial Number | KT000022128016 | Brand Name | Philips |
| --- | --- | --- | --- |
| UPC | 3784989106 | Item Description | Portable CD Player |

RETURNS INFORMATION

| | | Sold By | Best Buy |
| --- | --- | --- | --- |
| Approved for Return | | Sold Date | September 20, 2000 |

Mandatory Return Accessories

| Stereo Headphones | |
| --- | --- |
| AC/DC Adapter | |

WARRANTY REPAIR INFORMATION

| Good for Parts and Labor Repair | Lookup service Centers |
| --- | --- |
| Parts and Labor Combined Expiration Date | September 14, 2002 |

Notes 🗒

DONE

4. Not good for return(greater than extended period), good for warranty repair.

SiRAS.com Copyright SiRAS.com This system is for use by SiRAS authorized agents only. SiRAS' technology is protected by one or more of U.S. Patent Nos. 5,978,774; 6,018,719; and 6,085,172. Additional patents pending.

Fig. 29  Not good for return (no override), not good for warranty repair with manager override

Serial Number Lookup v1.0

| | | Account: | Philips |
| | | User: | Joe Smith |
| | | Department: | Customer Service |
| | | SiRAs ID: | 123456 |

*Contact Information* ❓

| Serial Number | KT00022128016 | Brand Name | Philips | Sold By | Best Buy |
|---|---|---|---|---|---|
| UPC | 3784989106 | Item Description | Portable CD Player | Sold Date | March 14, 2000 |

RETURNS INFORMATION

| Warranty period has Expired | |
| --- | --- |
| Mandatory Return Accessories | |
| Stereo Headphones | AC/DC Adapter |
| | |

WARRANTY REPAIR INFORMATION

| Good for Parts and Labor Repair | Lookup service Centers |
| --- | --- |
| Parts and Labor Combined Expiration Date | March 14, 2001 |

Notes 📄

DONE

5. Not good for return (no override), not good for warranty repair with manager override.

SiRAS.com  Copyright SiRAS.com This system is for use by SiRAS authorized agents only. SiRAS' technology is protected by one or more of U.S. Patent Nos. 5,978,774; 6,018,719; and 6,085,172. Additional patents pending.

Fig. 30 Not good for return (no override), not good for warranty repair with manager override

Serial Number Lookup v1.0

Account: Philips
User: Joe Smith
Department: Customer Service
SiRAs ID: 123456

*Contact Information* ?

| Serial Number | KT000022128016 | Brand Name | Philips | Sold By | Best Buy |
| UPC | 3784989106 | Item Description | Portable CD Player | Sold Date | March 14, 2000 |

RETURNS INFORMATION

| Warranty period has Expired | |
| Mandatory Return Accessories | |
| Stereo Headphones | AC/DC Adapter |
| | |

WARRANTY REPAIR INFORMATION

| Good for Parts and Labor Repair | Lookup service Centers |
| Parts and Labor Combined Expiration Date | June 14, 2001 |

Notes 

DONE

5. Not Good for return (no override), not good for warranty repair with manager override.

SiRAS.com Copyright SiRAS.com This system is for use by SiRAS authorized agents only. SiRAS' technology is protected by one or more of U.S. Patent Nos. 5,978,774; 6,018719; and 6,085,172. Additional patents pending.

Fig. 31 All expired (no override), repair center lookup

Serial Number Lookup v1.0

Account: Philips
User: Joe Smith
Department: Customer Service
SiRAs ID: 123456

Contact Information ?

| Serial Number | KT000022128016 | Brand Name | Philips | Sold By | Best Buy |
| --- | --- | --- | --- | --- | --- |
| UPC | 3784989106 | Item Description | Portable CD Player | Sold Date | March 14, 2000 |

RETURNS INFORMATION

Return period has Expired

Mandatory Return Accessories

Stereo Headphones | AC/DC Adapter

WARRANTY REPAIR INFORMATION

Good for Parts and Labor Repair

Parts and Labor Combined Expiration Date

Lookup service Centers

Notes

DONE

6. All expired (no override), repair center lookup

SiRAS.com Copyright SiRAS.com This system is for use by SiRAS authorized agents only. SiRAS' technology is protected by one or more of U.S. Patent Nos. 5,978,774; 6,018719; and 6,085,172. Additional patents pending.

Fig. 32  All expired (no override), repair center lookup

Serial Number Lookup v1.0   Contact Information (?)

Account: Philips
User: Joe Smith
Department: Customer Service
SiRAs ID: 123456

| Serial Number | KT000022128016 | Brand Name | Philips | Sold By | Best Buy |
| --- | --- | --- | --- | --- | --- |
| UPC | 3784989106 | Item Description | Portable CD Player | Sold Date | March 14, 2000 |

Service Centers in Zip Code 98052

| Name | Address | Distance |
| --- | --- | --- |
| Game Hut | 1324 NW Northrup Way, Redmond, WA 98052 | 2.5 miles |
| 24-hr Gaming Zone | 1234 Snodgrass Lane, Bellevue, WA 98007 | 5 miles |
| Dan's Computer Repair Haus | 845 Pennsylvania Ave., Redmond, WA 98053 | 7.8 miles |

<< PREVIOUS      DONE

SiRAS.com  Copyright SiRAS.com  This system is for use by SiRAS authorized agents only. SiRAS' technology is protected by one or more of U.S. Patent Nos. 5,978,774; 6,018719; and 6,085,172. Additional patents pending.

6. All expired (no override), repair center lookup

Fig. 33  All expired (no override), repair center lookup

Fig. 34 Non-participating manufacturer

Serial Number Lookup v1.0

Account: Philips
User: Joe Smith
Department: Customer Service

*Contact Information* (?)

Non-participating manufacturer

| Name | Game World Inc. |
| Address | 12345 Main Street, San Francisco CA 12345 |
| Phone Number | (800) 123-4567 |
| Additional Information | |

[ DONE ]

7. Non-participating manufacturer

SiRAS.com Copyright SiRAS.com This system is for use by SiRAS authorized agents only. SiRAS' technology is protected by one or more of U.S. Patent Nos. 5,978,774; 6,018719; 6,085,172. Additional patents pending.

Fig. 35 UPC/Serial Number mismatch

METHOD AND APPARATUS FOR ENABLING PURCHASERS OF PRODUCTS TO OBTAIN RETURN INFORMATION AND TO INITIATE PRODUCT RETURNS VIA AN ON-LINE NETWORK CONNECTION

CROSS-REFERENCES TO RELATED APPLICATIONS

This application is a divisional of application Ser. No. 12/801,118, filed May 24, 2010, now U.S. Pat. No. 8,156,026, which is a continuation of application Ser. No. 10/275,548, filed Jul. 7, 2003, now U.S. Pat. No. 7,797,164, which is a National Stage of International Application No. PCT/US01/14694, filed May 8, 2001, which claims the benefit of Provisional Application No. 60/203,933, filed May 12, 2000, PCT/US01/14694 also is a continuation-in-part of PCT/US99/26460, filed Nov. 10, 1999, which claims the benefit of Provisional Application Nos. 60/108,170, filed Nov. 13, 1998 and 60/119,631, filed Feb. 11, 1999, PCT/US01/14694 also is a continuation-in-part of application Ser. No. 09/065,552, filed Apr. 24, 1998, now U.S. Pat. No. 6,085,172, which is a continuation-in-part of application Ser. No. 08/725,259, filed Oct. 2, 1996, now U.S. Pat. No. 6,018,719, PCT/US01/14694 also is a continuation-in-part application Ser. No. 09/362,187, filed Jul. 28, 1999, now U.S. Pat. No. 6,757,663, which is a continuation of application Ser. No. 09/314,023, filed May 19, 1999, now U.S. Pat. No. 5,978,774, which is a continuation of application Ser. No. 08/725,259, filed Oct. 2, 1996, now U.S. Pat. No. 6,018,719, the entire contents of each of which are hereby incorporated by reference in their entirety.

BACKGROUND OF THE INVENTION

1. Field of the Invention

The present invention relates to a computer based system that provides a method for real time data storage and retrieval for the purpose of verifying and validating sales transactions and product return/warranty repair eligibility. Additionally, the present invention relates to an electronic system for registering product transactions and to a method for efficient handling of product return transactions. More particularly, the present invention relates to an electronic registration system which facilitates compliance with return policies and is useful in reducing improper or fraudulent product returns under warranty. In addition, the instant invention provides a system which enables purchasers of products, from retailers, e-tailers and the like, to access product return information through a network, such as the Internet, for the purpose of obtaining information on the return/repair of a purchased product and/or initiating a product return process via the network.

2. Related Art

Product returns are a market reality faced by virtually every manufacturer, distributor, supplier, retailer and e-tailer (on-line retailer or "cyberstore") of commercial products. Unfortunately, handling product returns often requires a significant expenditure of resources. For example, it may be necessary to employ one or more individuals to verify that product returns satisfy the requirements of a company's return policy. This process can be complicated due to the fact that a particular retailer often carries numerous different type of products from different manufacturers, each of which often has their own return and warranty policies and procedures. As a result, the personnel responsible for processing the product return transactions at, for example, a retail store, must know or manually look-up the applicable return policies and procedures for the particular product that a person is attempting to return. This is a difficult, time-consuming, and error-prone process that often results in improper acceptance or rejection of product returns and/or warranty claims at the retail level. The problems associated with product returns have been compounded in recent years due to the large number a products that are purchased from Web sites on the Internet, i.e. from electronic retailers or e-tailers. A significant portion of the products purchased from e-tailers are returned by the purchaser. It is noted that the term "retailer" as used herein is generally meant to include e-tailers, which have now become a major supplier of products to consumers.

Once a product is accepted for return by the retailer, the retailer then typically returns the product to the manufacturer for credit. However, when the retail store accepts a product return that does not comply with the manufacturer's return policy, problems result between the retailer and the manufacturer because the manufacturer will refuse or be reluctant to accept the returned product from the retailer. Moreover, significant time and expense is wasted when a retailer improperly accepts products for return that do not comply with the manufacturer's return policy. Often times the improperly returned products are shipped to the manufacturer and then are simply returned to the retailer after being rejected for return by the manufacturer. This results in significant wasted shipping charges and employee time in attempting to resolve such matters. This situation can also result in significant tension between the retailer and the manufacturer. In other words, when returns are not properly handled at the retail level, numerous problems result for the retailer and the manufacturer.

Alternatively, a company might choose to avoid the increased overhead associated with additional employees and be somewhat less diligent about verifying compliance with the return policy prior to accepting a return. However, this alternative can increase costs due to the higher number of improper or fraudulent product returns. Either way, additional costs must either by borne by the company or passed along to the consumer.

In addition to the costs associated with verifying compliance with a return policy, even proper product returns incur additional administrative costs. Examples of such costs include shipping and handling of the returned product, repackaging and redistribution of the returned product (if appropriate), disposal of certain returned products, and the like. These costs must also be borne either by the company or by the consumer in the form of higher prices.

It is, of course, desirable to minimize costs associated with product returns to permit reduced prices to the customer and/or provide improved operating margins for the manufacturer and/or the retailer. There are two major areas in which savings may be realized: (1) reducing the number of improper or fraudulent returns; and (2) improving efficiency and reducing overhead in handling proper returns.

Manufacturers, retailers, e-tailers and other vendors of consumer products often have a standard or default return policy. For example, a retailer return policy might allow a consumer to return a purchased product for any reason within a certain number of days (e.g., 10 days) after purchase. Additionally, a manufacturer's warranty may permit return of defective products within a particular time period (e.g., 90 days) after purchase, and provide for repairs of defective products within a different time period (e.g., 180 days). Repairs of products after that date would be the responsibility of the consumer. Such return policies are intended to ensure consumer satisfaction while protecting the manufacturer and/or the retailer from improper returns. As a result, a delicate balance must be maintained between protection of the retailer or manufacturer and consumer satisfaction.

Unfortunately, it is often difficult to monitor product returns to ensure proper compliance with a return policy. For example, a consumer who received a product as a gift usually will not have a sales receipt. In such a situation, an uninformed decision must often be made to accept the return or not. If the return is not accepted, the consumer might unfairly be denied a proper return, and the retailer and the manufacturer risk suffering a loss of goodwill. On the other hand, if the return is accepted, the retailer and/or the manufacturer will incur expenses or losses which might be unwarranted. Some retailers seek to minimize the effect of possible improper returns by limiting a consumer to store credit (rather than a refund) or exchanges on items returned without a receipt. This alternative, however, may be unacceptable to a consumer and does not completely eliminate the retailers' exposure to improper returns.

Difficulties associated with returns made without a receipt stem primarily from the inability of the retailer to obtain purchase information (such as sales date, place of purchase, etc.) concerning the individual item for which a return is sought. Without such information, it is usually impossible for the retailer to determine whether the return is in compliance with the return policy.

In addition to the foregoing, fraudulent returns can cost product retailers and manufacturers significant sums of money. As an example, upon release of the Super Nintendo Entertainment System (Super NES), Nintendo experienced a high volume of returns of basic NES hardware. When the returned products were evaluated, it was discovered that a high percentage of the products were not defective and, in fact, were several years old. Thus, customers were abusing the retailer's return policy to exchange old products and upgrade to the new system. Such abuses increase costs to the retailers and manufacturers. These costs are often passed on to purchasers without any attendant benefit to legitimate consumers.

While companies generally try to prevent fraudulent returns, the personnel responsible for processing such returns do not have the suitable resources and/or information needed to assure that only proper returns are accepted. This problem is compounded when the consumer does not have a receipt because it has been lost or because the product was received as a gift from another person. While many of these situations represent legitimate return requests, a significant percentage of such return requests are fraudulently made by consumers. Unscrupulous consumers have in recent years become increasingly creative in their attempts to return merchandise which does not in fact qualify for return under the purchase agreement. For example, a customer may purchase a product at a reduced price at one store and then attempt to return the product to another store for a profit. Customers have also been known to purchase a new product and then return an older or defective product (which no longer qualifies for return or warranty repair) in the new product packaging, thereby obtaining the new product at no cost. Under current practice, retailers are at a significant disadvantage in connection with product return requests, because they typically do not know whether a product has been purchased from their store or another store, or even how much was originally paid for the product even if the product was purchased at its store. Return audits have shown that a significant number of consumers use this disadvantage to their personal benefit and at the cost of the retailer and manufacturer.

The problems associated with product returns are compounded when the product has been purchased on-line from an e-tailer. In this situation, the e-tailer must make decisions about the acceptance or rejection of a return and request little information about the specific product sought to be returned or the particular individual attempting to return the product. The handling of product returns for on-line purchasers can be quite time consuming and costly. Moreover, due to inadequate control mechanisms, many improper returns are accepted by e-tailers. In addition, there are high costs associated with handling proper and improper product returns originating from on-line purchasers.

In the past several years, retailers and the industry have shown renewed interest in curbing the volume of unwarranted and fraudulent product returns. This interest is largely due to diminishing profit margins and the competitive nature of the retailing business. Because of thin profit margins, retailers and manufacturers can no longer absorb the cost of unjustified product returns. Unless product returns are significantly reduced, retailers and/or manufacturers will have little choice but to pass these costs on to the consumer in the form of price increases.

Prompt and efficient handling of returns and proper enforcement of return policies helps to keep down costs while maintaining consumer confidence and satisfaction. However, efforts to speed handling or improve enforcement lose their value if the expense of those efforts outweighs the accompanying benefit. Accordingly, such efforts must be efficient to benefit the manufacturers, retailer, e-tailer and the consumer.

Another problem confronted by retailers stems from the fact that different manufacturers may have different return policies. For example, one manufacturer may require returns to take place within 90 days of the original purchase, whereas others may permit returns up to 120 days or 180 days after the original purchase. Similarly, some manufacturers may have strict limitations on product returns without original packaging or returns of products wherein relatively minor parts (e.g., instruction manuals, connecting cables, etc.) are missing. Because of the variety of manufacturer return policies, it is often difficult for a retailer to ensure proper compliance. As a practical matter, it may be extremely difficult or even impossible to educate the retailer or e-tailer staff with regard to each return policy. This problem is compounded by the fact that manufacturers and/or retailers may have returns policies that vary between products. Moreover, a retailer often carries products for many different manufacturers. Manufacturers or retailers may also have special return or warranty policies for products which are sold at reduced prices, for example. Some manufacturers may also only allow returns that are within a specified period of time starting from the date of shipment to the retailer, rather than from the date the product is purchased by a consumer. In fact, in today's market it is not uncommon for a single manufacturer or retailer to have numerous different return and/or warranty policies that apply depending on the particular product and the particular conditions under which the product was purchased.

Thus, retailers and e-tailers may be placed in a position where improper returns are inadvertently accepted or where proper returns are rejected. Accepting improper returns increases costs which must either be absorbed or passed on to customers in the form of higher prices or restocking fees, for example. Of course, rejecting proper returns may damage goodwill between the vendor and the customer.

There are also costs in terms of time, expense and inconvenience which are incurred by the purchaser or consumer in connection with product returns. For example, consumers often must take the product back to a retail location to return the product and obtain credit therefore. However, in many instances the consumer does not even know if the product will be accepted for return prior to taking the product back to the store. As a result, consumers often waste significant time and expense in returning a product to a store simply to find out that the store will not accept the product for return as a result of, for example, the applicable warranty period having expired. Such situations also cause significant inconvenience and annoyance for the consumer and the retailer which can harm the reputation of the retailer in the eyes of its potential customers.

Accordingly, there is a need for a system which facilitates authorized product returns for a number of different manufacturers and/or products while also reducing the incidence of unauthorized returns. Additionally, there is a need for a product purchase registration system which minimizes costs associated with returns, improves retailer and e-tailer efficiency in handling product returns, increases overall customer satisfaction, and provides retailers and consumers with immediate access to purchase data information for products of various manufacturers. Further, there is a need to simplify and streamline the return process for consumers, retailers, e-tailers and manufacturers, as well as any third party service provider associated therewith.

It is a primary object of the present invention to satisfy these needs. A further object of the present invention is to enable retailers to more efficiently and effectively enforce applicable product return/warranty policies, even in situations in which the person seeking the return no longer has the sales receipt. Another object of the invention to reduce fraudulent product returns, and to protect the retailer and manufacturer from the cost and inconvenience associated therewith. A further object of the invention is to provide a method and system available at the return location, such as a retail store check-out counter or customer service counter, which is operable to quickly and accurately verify whether the particular product sought to be returned does or does not qualify for return under the applicable return criteria for that particular product, prior to accepting the product for return. Another object of the invention is to provide the customer with useful information regarding the product even if the product does not qualify for return, thereby improving customer satisfaction even when returns are not accepted. Yet another object of the invention is to reduce the need to return products by providing technical information regarding set-up or operation of the product to the consumer for the purpose of solving a problem the consumer is having with the product, thereby reducing the need to return products. Still another object of the invention is to provide the store personnel with information on the particular product being returned, which information enables verification of whether or not the product being returned includes all of the original parts or components prior to accepting the product for return. Yet another object of the invention is to provide a system which enables the consumer to directly access product purchase and return information for products they have purchased and to electronically initiate the return process from a convenient location, such as their home, via an on-line network connection.

SUMMARY OF THE INVENTION

The present invention achieves these and other objects by providing an electronic registration and verification system which uses individual product identification information for purchased products, gathered, for example, at the point of a sales transaction or during the fulfillment of an on-line purchase from an e-tailer, and storing the information in one or more transaction databases. In an example embodiment of the present invention, individual product identification information (such as a unique serial number) is stored in a local transaction database along with additional information including at least the date of the transaction. A transaction receipt such as a customer sales receipt may be created and includes at least the unique product identification information and the date of the transaction. Additionally, the individual product identification information and the transaction date may be communicated to a separate location for inclusion in a general transaction database. The local transaction database may include, for example, sales made by a particular store or sales made by several affiliated stores and is not necessarily co-located with the point of sale or the e-tailer. The local transaction database may also organize the data by individual manufacturer for ease of access.

The instant invention enables a store clerk or the like to obtain real-time electronic verification of a particular product sale transaction as well as the currently available return/warranty options for a particular product presented for return.

In accordance with an important aspect of the invention, the invention also enables the consumer or the purchaser of the product to access the stored information, via a Web site or the like, to obtain information about a return of the product and/or to initiate a return procedure. The initiation of the return procedure may include, for example, providing the consumer with a return authorization and return instructions upon request and upon verifying that the return meets the applicable return criteria. The consumer can then use the return authorization (RA) and the return instructions to send the product back to the appropriate location (which may be, for example, the retailer, e-tailer, manufacturer or third party service provider). If the product does not qualify for return, the invention enables the consumer to obtain other useful information regarding the product via the Web site, such as operating or hook-up instructions for the product, as well as information on locations for warranty or non-warranty service for the product. In other words, the invention enables the consumer to directly access the transaction information and determine if the product qualifies for return simply by accessing a Web site or other similar on-line service, or by using an automated 800 (toll-free) telephone number or the like. In addition, if the product qualifies for return, the consumer is automatically provided with a pre-return authorization and instructions for completing the return process. This enables the consumer to return the product with little or no front-end involvement by the retailer, e-tailer or manufacturer.

Prior to obtaining individual product identification information, the electronic registration system may identify the type of product by evaluating, for example, the product SKU number derived from a universal product code (UPC). In this example, the individual product identification information is obtained only if the product is of a type for which electronic registration is desired. If the product is not of a type where electronic registration is desired, the product is not registered (i.e. a non-serialized purchase). In this case, the instant invention can still be used to help automate and streamline the return process for such non-serialized items. For example, the system may provide the consumer with information on return or repair of the non-serialized product via the same Web site used to handle consumer returns for serialized products (i.e. products that have been registered using the serial number or other unique identifier).

The transaction information including the individual product identification information and the transaction date may be communicated for use in a general database in a number of different ways. For instance, an electronic link to the location of the general database may be established or information may be recorded and physically transferred to that location. The communications may occur periodically, on an item-by-item basis, or otherwise.

In a physical retail store environment, when a customer returns a product with a receipt to the retail location, a retailer may look at the serial number on the receipt and compare it to the returned product. If the serial numbers match and if all other return conditions for the particular product are met, the return may be accepted. When a customer returns a product with no receipt, or a receipt that does not have a correct serial number, the retailer may search the local database for sale information concerning the specific item being returned. If no sale information is located (for instance if another retailer sold the product), the general database may be accessed and searched for sales information, and the return handled accordingly. Additionally, if the retail clerk is unfamiliar with the applicable return policy, the clerk may submit the product for return approval to obtain the necessary information on the product and make an appropriate determination as to whether the return should be accepted. If the product does not qualify for return, the invention enables the sales clerk to provide other useful information or assistance to the person seeking the return, such as operating or hook-up instructions for the product, as well as information on locations for warranty or non-warranty service for the product.

In accordance with yet another aspect of the present invention, a computer system at a product return center location obtains identifying information for a product which is to be returned from a retailer to a manufacturer. In the disclosed example implementation, this identifying information is then submitted to a remote return approval computer system through the internet or the like. The return approval computer system may then utilize the identifying information to determine whether the returned product satisfies applicable return criteria. If so, the product is pre-approved for return. The product return location preferably obtains identifying information for a plurality of returned products at a time. In response to the product identifying information submitted by the product return location, the return approval location may provide a list of approved returns and unapproved returns, along with a return authorization number for a batch of approved returns. The product return location may then assemble the approved product returns and ship the batch to the return approval location (such as the manufacturer). Shipping costs can be saved by omitting rejected product returns from the shipment. The return approval location can handle the approved product returns from the regional return center as a batch, thereby reducing costs.

BRIEF DESCRIPTION OF THE DRAWINGS

Other objects, features, advantages and characteristics of the present invention will become apparent from the following detailed description of exemplary embodiments, when read in view of the accompanying drawings, in which:

FIG. 3 illustrates an example transaction receipt which reflects a unique product serial number and a transaction date;

FIG. 15 is a flow chart illustrating steps that may be taken to ensure customer protection and verification during submission of additional product registration information as part of a consumer post-sale product registration;

FIGS. 16A through 16G are example user interface screen displays which may be used during a customer service request for return/warranty information;

FIGS. 17A through 17H are example user interface screen displays which may be used during a customer service request for operating instructions or hook-up information for a product;

FIGS. 18A through 18F are example user interface screen displays which may be used during a customer service request for vendor/product information;

FIGS. 21-35 shows additional exemplary screens of the Web site of FIG. 19.

DETAILED DESCRIPTION OF PREFERRED EMBODIMENTS

The present invention is described in the context of particular exemplary embodiments. However, it will be recognized by those of ordinary skill that modification, extensions and changes to the disclosed exemplary embodiments may be made without departing from the true scope and spirit of the instant invention. In short, the following descriptions are provided by way of example only, and the present invention is not limited to the particular preferred embodiments disclosed herein.

Figure 1:
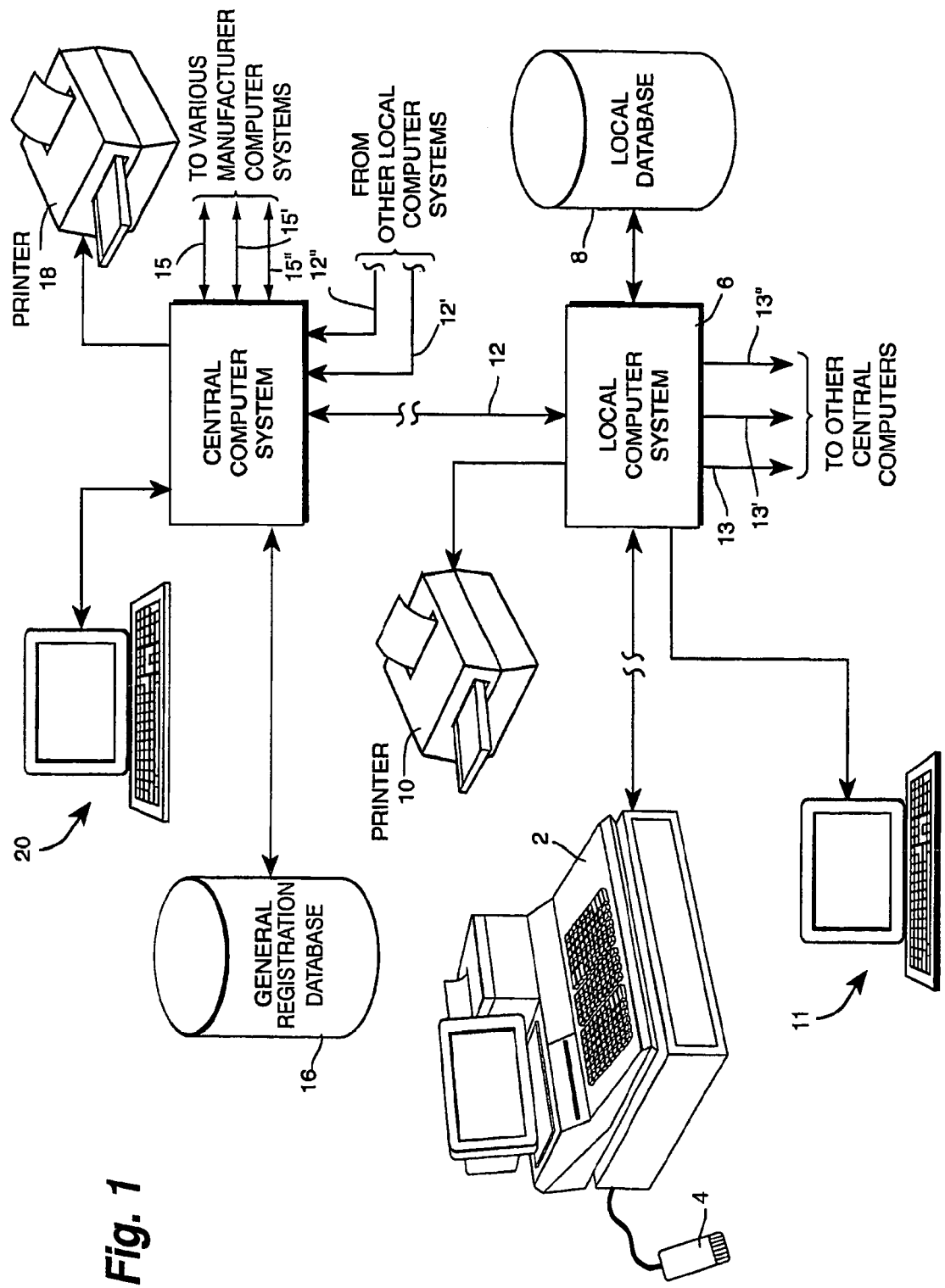
FIG. 1 is a schematic block diagram illustrating an example of an overall electronic registration system which may be used in connection with one aspect of the present invention.

An example of one type of electronic product registration system that is preferably used in connection with the instant invention is illustrated in FIG. 1. This exemplary electronic registration system is the subject of the two commonly owned patents identified above (U.S. Pat. Nos. 6,018,719 and 5,978, 774). Briefly, this example system includes a point of sale register 2 and an associated bar code scanner 4. The register 2 is preferably connected with a local computer system 6 in any suitable manner. For example, the register 2 may be "hardwired" to the local computer system 6. Alternatively, the register 2 and the local computer system 6 may communicate, for example, through modems and telephone lines, or over radio communication channels. Any suitable communication channel may be used.

In certain situations (e.g., single store retailers), it may be advantageous to have the local computer system 6 located in proximity to the register 2. For large chain stores, however, it may be advantageous to situate the local retailer computer 6 at a central location with links to the registers 2 at individual stores. The particular arrangement will depend on the preferences and circumstances of the specific retailer and may vary in accordance therewith.

The local retailer computer system includes an associated local database 8 for storing registration information. Additionally, a local printer 10 and an operator terminal 11 may be provided. The operator terminal may be used, for example, by a store clerk upon return of merchandise to locate pertinent sales information in the local database 8. The printer 10 may be used to produce hard copies of, for example, end-of-day sales reports and/or the like.

In the exemplary embodiment, a communication channel 12 is provided between the retailer computer system 6 and a central computer system 14. The central registration computer system may, for example, be an independent registration center computer system which electronically registers product transactions for a number of different retailers. In other words, the central computer system may be operated by a third-party service provider.

It is noted that the term "communication channel" or "channel" is used herein in its broadest sense, and includes any suitable technique for passing electronic information between systems. Such suitable techniques include, for example, electronic links via modem, radio links, or even communications established by physically transporting a recording medium, such as a magnetic disk, magnetic tape or optical disk, from one system to the other. In the preferred arrangement, an electronic link may be established by modem over available commercial telephone lines.

A general registration database 16 is associated with the central registration computer system 14 for storing transaction information from a plurality of retailer computer systems 6. Additionally, a printer 18 and an operator terminal 20 may be included with the central registration computer system 14. As discussed below in greater detail, the central registration computer system may maintain a number of data files pertaining to individual retailers, e-tailers, manufacturers and the like. These data files include information applicable to the particular individual retailer, e-tailer, distributor, manufacturer or the like and are preferably maintained by that particular individual or entity. For example, a data file may contain specific return/warranty policy information applicable to that particular individual or entity.

It should be appreciated that the central computer system 14 is preferably intended to handle product registrations for a number of different manufacturers and/or other vendors. Accordingly, the general registration database may employ a structure wherein the product registrations for each participating vendor is maintained in separate areas. Alternatively, separate databases may be employed for each participating vendor. Of course, other data structures may be employed so long as the registration center is able to properly keep track of the product transaction information.

As illustrated in FIG. 1, the central registration computer system 14 may have a number of additional communications links 12', 12", etc. for receiving information from other local computer systems. Thus, for example, a registration center may receive information from a number of different retailers. Additionally, the local computer system 6 may include a number of additional communication channels 13, 13', 13", etc. for connecting with other central computer systems. Accordingly, an individual retailer can electronically register products with a number of different registration databases, if desired. Furthermore, a number of communication channels 15, 15', 15", etc. can be provided for communications between the central registration computer system 14 and individual manufacturer computer systems and computer systems of third party service providers, law enforcement agencies and/or the like. Of course, a general access channel such as an interne connection may also be made available for authorized access to the central computer system 14.

For convenience, the multiple communication channels in FIG. 1 are illustrated with separate lines. It should be noted, however, that separate lines are not necessary. For example, the local computer system 6 more likely would have a single communications line, and connection with the particular central computer system 14 would be made through a modem by dialing the appropriate telephone number or through an interne connection.

In the e-tailer environment, the information on the product and transaction (e.g. serial number) may be collected at any suitable point during fulfillment of the on-line purchase, and the transaction information may be communicated to a local and/or central database by any suitable method, such as by an interne connection to the database.

Figure 2:
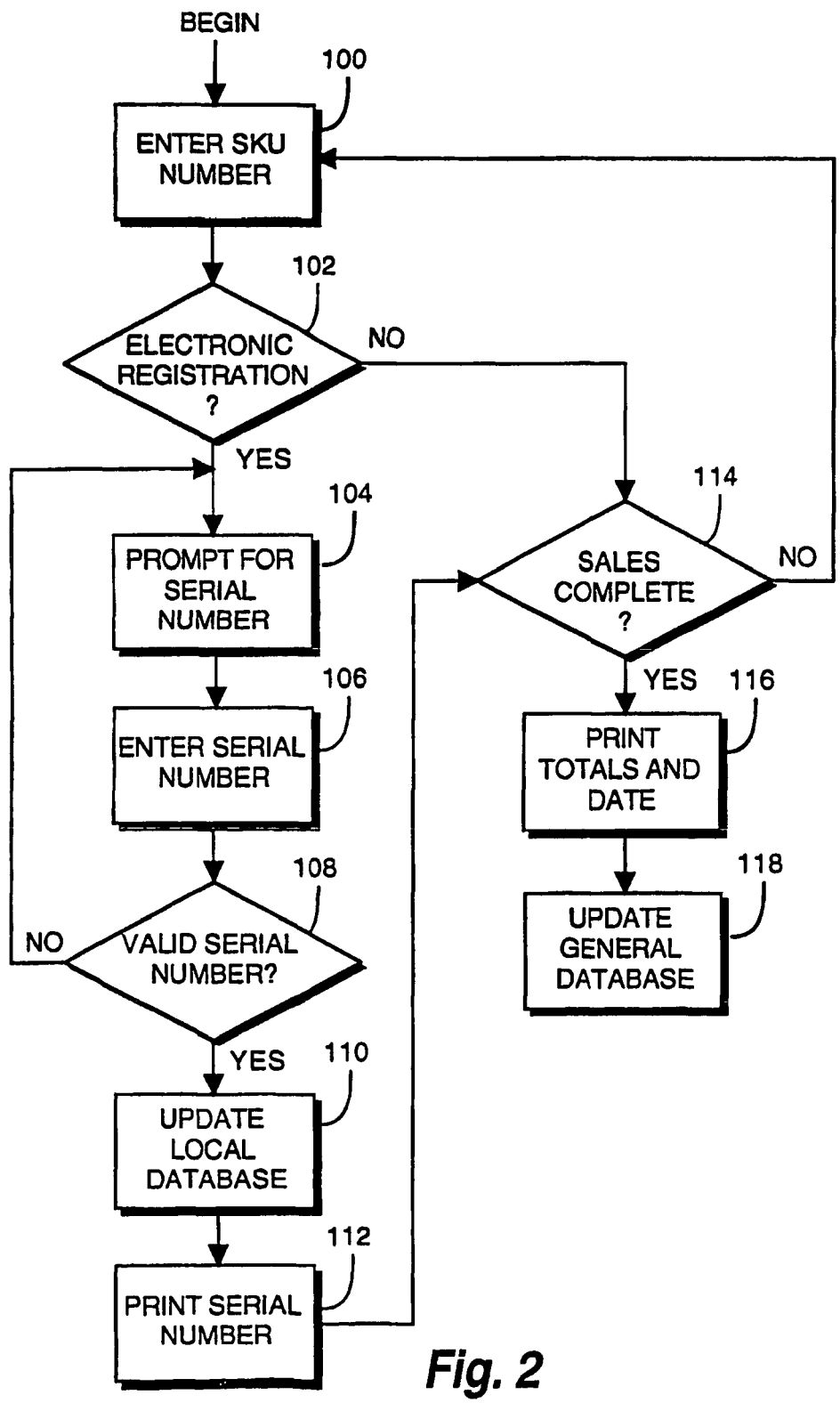
FIG. 2 is an example flowchart illustrating a series of exemplary steps that may be performed at a point of sale for registering a product transaction.

An example of the operation of the system illustrated in FIG. 1 is now described in connection with FIGS. 2-6. Referring now to FIG. 2, the electronic registration process begins, in this exemplary physical retailer embodiment, when a customer brings merchandise to the register 2 for check-out. The sales clerk enters the SKU number which identifies the type of product involved in the transaction (e.g., Super Nintendo Entertainment System, Nintendo Game Boy, Nintendo N64, etc.) by, for example, scanning a UPC product code included on the product packaging (block 100). Of course, key entry or another technique for entering the SKU number, such as reading of an RF-ID tag on the product, may be used.

Electronic registration might not be necessary or desired for a substantial number of small commodity products (e.g., batteries, candy, diapers, etc.) that are commonly sold by retailers. Accordingly, a check may be made, based on the type of product as identified by the UPC code, to determine whether this is a product for which electronic registration is desired (block 102). If so, the store associate is prompted to enter the serial number of the individual item (block 104).

The serial number may be entered (block 106), for example, by scanning a serial number printed on the packaging. Alternatively, the serial number as it appears on the product may be scanned through a window in the packaging. This alternative ensures that the individual product is identified even if it is mispackaged. Also, repackaging of returned merchandise would be simplified. Other techniques, such as key entry or RF-ID tag reading, may also be used. Because the serial number is unique to each individual product, it acts as individual production identification information.

Once the serial number is entered, a check may be made to ensure that the serial number is valid (block 108). If not, control returns to block 104, and the store associate is again prompted to enter the serial number. This is repeated until a valid serial number is obtained. It may be desirable to provide store managers with the ability to override the requirement to enter a serial number in a limited number of situations. If such an ability is given, however, the overrides should be monitored to ensure the ability is not abused. This may be done, for example, by generating a periodic report listing all overrides by individual managers.

Several different techniques may be used to evaluate and verify the validity of the serial number. Of course, to safeguard against fraud, individual manufacturers will likely each use its own confidential technique for verifying the validity of the serial number. Accordingly, the retailer system preferably includes the ability to select and apply an appropriate verification technique in accordance with the particular manufacturer, product line, or the like. In one preferred technique, a check digit is added to the serial number. Such a check digit technique may utilize a predetermined mathematical operation which is performed on the digits of the serial number. If the result of the predetermined mathematical operation is equal to the check digit, the validity of the serial number is verified. An example of a preferred check digit technique that can be used in connection with the instant invention is provided in the above-referenced PCT application This feature of the instant invention provides an advantageous method of enabling participating manufacturers to assign a serial number mask for each UPC, while also enabling the serial numbers used to be easily captured during a product transaction for input to an electronic registration system (ERS) or the like. The POS system would then have access to information which would enable it to know what mask to use for each UPC, thereby enabling the correct serial number to be obtained and verified during the product purchase transaction, whether originating from retailers or e-tailers.

In accordance with another aspect of the invention, the mask may be defined in a manner which enables the system (ERS system, POS system, or other related system) to determine if the mask is a packaging mask or a product mask. A packaging mask is defined as a mask for serial numbers used only on packaging for products, while a product mask is defined as a mask for serial numbers used only on actual products. One example embodiment of this feature of the invention is to define certain elements (such as certain constants) in the mask to be used only with serial numbers on product packaging, and to define different constants for use only with serial numbers on actual products. In this manner, the POS or ERS system could determine upon reading the serial number whether the actual product or only the product packaging has been scanned or otherwise obtained.

One benefit of this optional feature of the invention, is that fraudulent returns can be minimized or prevented. More particularly, by using this technique the fraudulent return situation can be avoided where a person purchases a new product with new packaging and then returns the new packaging with an old or different product therein for credit or refund. The invention reduces this type of fraud by requiring that an actual product be scanned, rather than only the packaging returned with the product. In other words the POS or ERS system could be programmed to recognize during a product return transaction whether only the packaging serial number has been scanned, and prevent acceptance of the return until the actual product is scanned, thereby assuring that the actual product, not just the packaging, qualifies for return.

Once the serial number is verified (block 108), a local database may be updated with the serial number information and any other necessary or desired information (block 110). At minimum, however, the local database should include an indication of the date on which the transaction took place. Other information might include the price paid, the store associate responsible for the sale, and the like.

The serial number of the individual product is printed (block 112) as part of a written customer transaction receipt when in the retailer environment. As shown in the sample sales receipt 30 of FIG. 3, the serial number may be printed adjacent the description and SKU number of the registered product. Thus, it will be a simple matter to correlate serial numbers with associated products, particularly when several registered products appear on a single customer sales receipt. Of course, additional information may be printed as well.

The date of the transaction will typically be printed at either the beginning or the end of the sales receipt, but may appear anywhere on the receipt. In the example operation illustrated in FIG. 2 and the sample sales receipt of FIG. 3, the date is printed at the end of the sales receipt 30 (block 116). For ease of viewing, the serial number and date on the sample receipt 30 are indicated by boxes. If desired, an actual printed receipt may also have such information highlighted, for example, by a different color ink.

Turning back to the example operation illustrated in FIG. 2, after the serial number is printed, a check is made to determine whether sales are complete (block 114). Ordinarily, this will be based on the store associate hitting a TOTAL button on the cash register. If sales are not complete, control returns to block 100 for entry of a SKU number for the next product. Otherwise, sales totals are calculated and printed on the receipt along with the current date (block 116). Thereafter, the central registration computer system 14 is contacted and the general registration database 16 is updated.

It should be emphasized that the operation illustrated in FIG. 2 is merely exemplary, and that the steps need not be performed in the particular order shown. For example, all print operations and database updates can take place after sales are completed. Additionally, it is not necessary to update the databases on an item-by-item basis. Indeed, efficiency and speed in updating the general database may be increased by batching transactions in groups of, for example, fifteen transactions.

Figure 4:
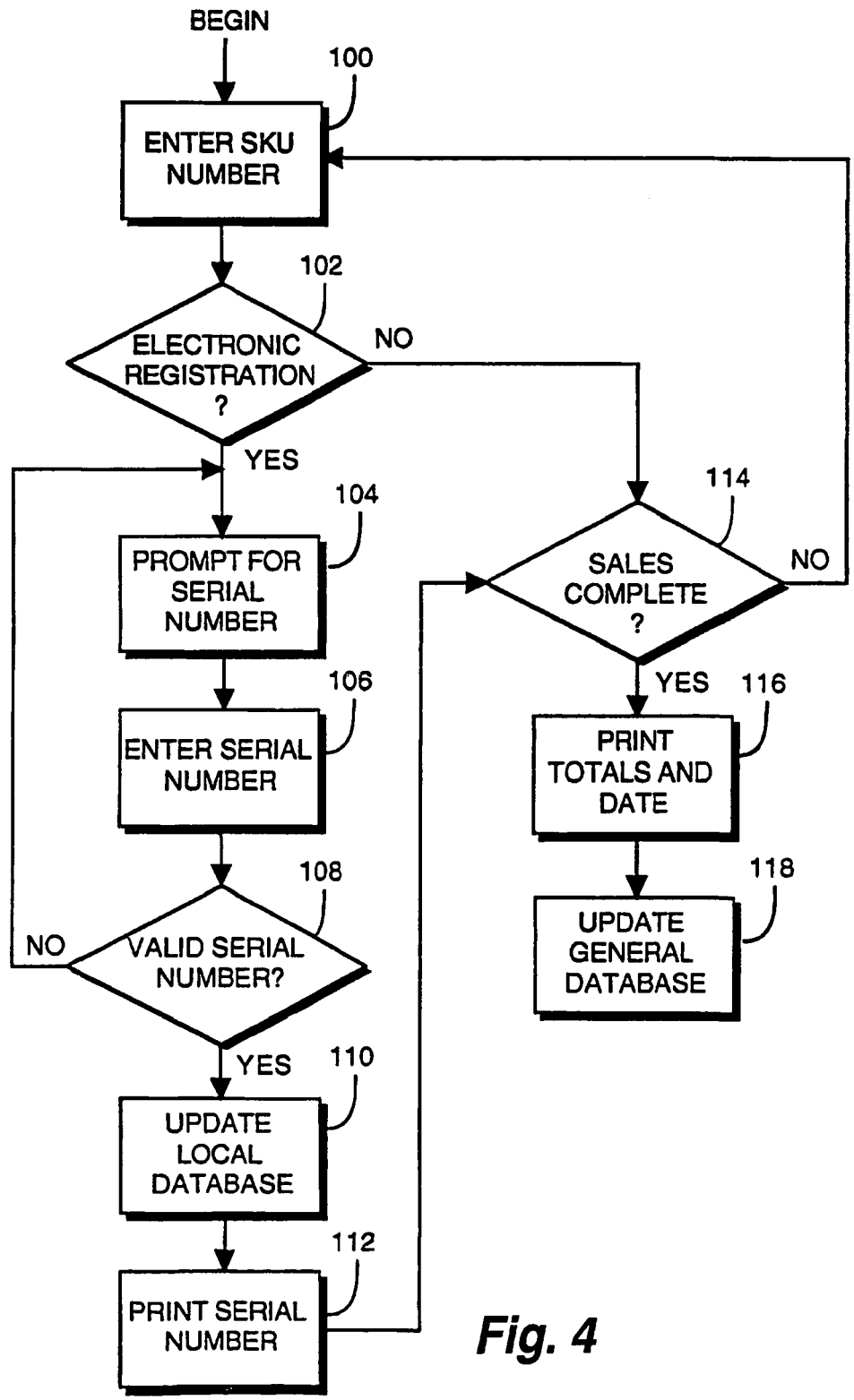
FIG. 4 illustrates an example flow chart for an electronic data interface between a product retailer and a registration center during electronic product registration.

An example technique for interfacing the local computer system 6 to the central registration computer system 14 is illustrated in FIG. 4. Product serial numbers are scanned or keyed in by a store associate (block 200) and stored with associated information in the local database (block 202) using an operation such as discussed in connection with FIG. 2. Thereafter, the local computer system 6 extracts the serial number information from the database (block 204) and batches the information in blocks of fifteen (block 206). The information may also be batched by manufacturer in the local computer system 6. The operations represented by blocks 204 and 206 are preferably performed periodically, for example, daily.

Once the serial number information is properly batched (block 206), the local computer system 6, in this case a retailer system, dials the general registration computer system 14, to make an electronic link to an electronic mailbox set up for that particular retailer (block 208). A separate electronic mailbox may be set up for each registration center account. The connection is tested (block 210) and, if the connection is not properly established, the retailer computer system 6 redials (block 212) until a proper connection is established. At that point, data is transmitted (block 214) to the electronic mailbox. Batching the information increases transmission speed and, therefore, reduces data transmission times.

Data communications between the retailer or e-tailer system and the registration center system may use a conventional communications format. For example, the computer systems may be equipped with an EDI Translator capable of using the Standard 140 file format established by the EIA. The Standard 140 file format is specifically designed to extract product registration information. A typical transmission would begin with a Transaction Set Header to indicate the start of a transaction and to assign a control number. This would be followed by a Beginning Segment for Product Registration which indicates the beginning of a product registration transaction set and transmits identifying numbers, dates and times. The identifying numbers may include a Purpose Code to identify the type of registration (e.g., original sale or return to stock) and a Reference Number assigned by the user for the particular transaction. Next, a Name segment is transmitted to identify the user by type of organization, name and identifier code. The identifier code may indicate an organizational entity, a physical location, or an individual.

If desired, additional identifying segments such as an Address Information segment and a Geographic Location segment may be transmitted. The address information would include, for example, a street number and name for the individual store. The geographic location information would include the city name, a state or province code as defined by an appropriate Government agency, a postal code (e.g., a zip code in the United States), and a country code.

Following any desired additional identifying segments, specific item identification information (e.g., serial numbers) may be transmitted along with a textual description of the product if desired. Information identifying the individual store or e-tailer that sold the particular item may be associated with the information for that item. Appropriate dividers would be provided to separate the information for the respective individual items. After the individual item information has been transmitted completely, a Transaction Set Trailer segment may be transmitted to indicate the end of the transaction set and provide the count of transmitted segments.

Returning now to FIG. 4, the registration center computer system 14 decodes the serial number information received from the retailer or e-tailer (block 216). The decoded serial number information is preferably sorted by manufacturer (if not already sorted) and initially stored in a temporary database (block 218). Separate temporary databases may be employed for individual manufacturers. The serial number information is preferably encoded along with the retailer's name, the registration date, the sale date, the last date on which returns will be accepted, and the last date for warranty repairs (block 220).

The applicable return and warranty dates may be stored in the registration center computer system or, alternatively, could be obtained from the particular manufacturer by way of communication channels 15, 15', 15", etc. Of course, other ways of determining the appropriate dates may also be utilized. In accordance with the preferred embodiment, however, the central computer system has access to information providing the manufacturer's return and warranty policy for each product registered, and the participating manufacturer or other vender provides and updates this information for each of its products.

The individual serial numbers may next be validated using the check digit technique discussed above, and the data is transferred to the registration center's general database (block 222). Following validation of the serial numbers, an on-line summary report may be generated which lists all accepted and rejected serial numbers (block 224). The valid data is then stored in the manufacturer's national serial number database for later access as described in detail below.

The summary report provided in block 224 provides a tool for the registration center to locate trouble spots caused, for instance, by malfunctioning retailer systems or attempted fraud. Additional monitoring reports may also be generated as desired. For example, the serial number pass/fail ratio for all returns by a particular retailer over a given time period may be reported, duplicate serial numbers may be located and listed, previously registered serial numbers may be flagged, and cross-references may be made between the registration date and the date the product was returned to the manufacturer. Such reports can be used by the registration center to monitor retailer returns for possible problems or abuse. Reports may also be generated for individual manufacturers for separate monitoring or other uses.

Figure 5A:
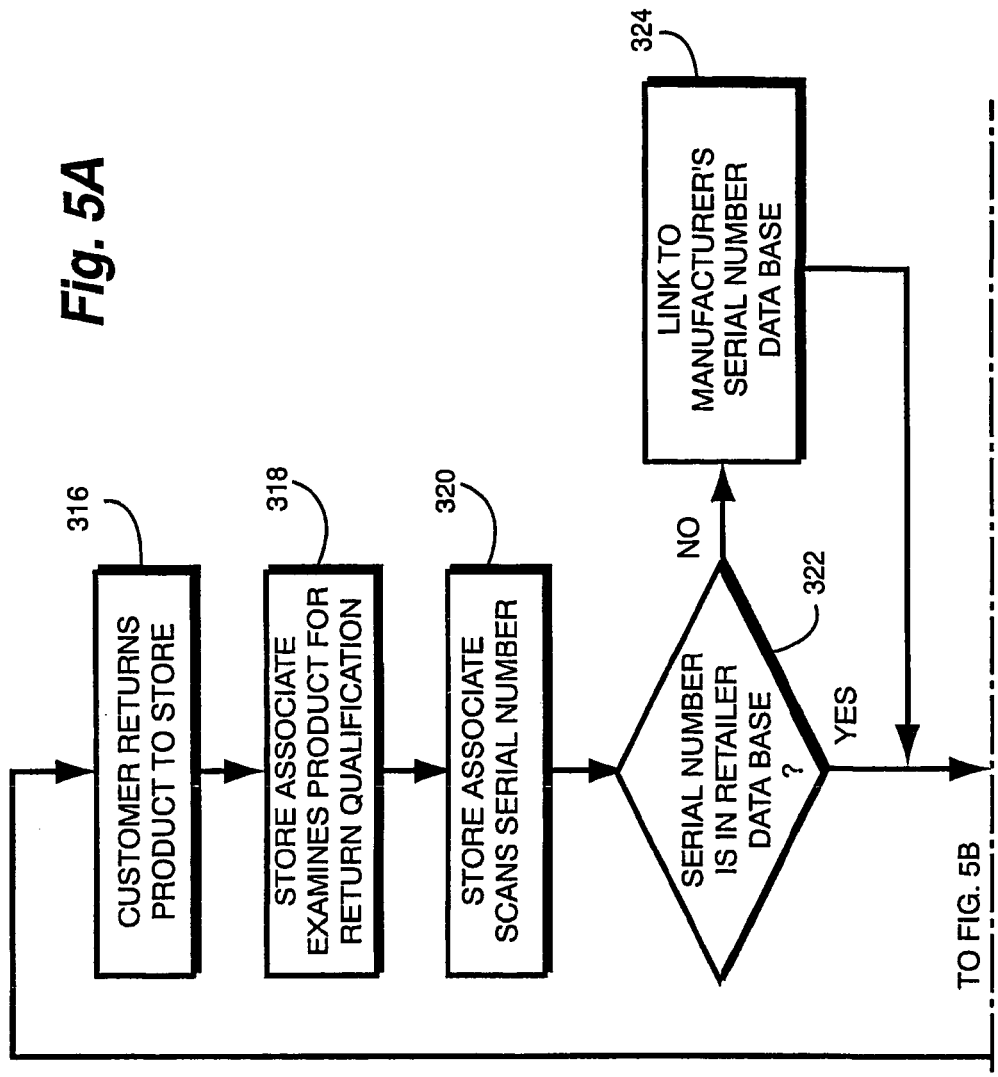
FIGS. 5A and 5B illustrate an example flow chart generally illustrating steps which may be taken in connection with product registration and return.
Figure 5B:
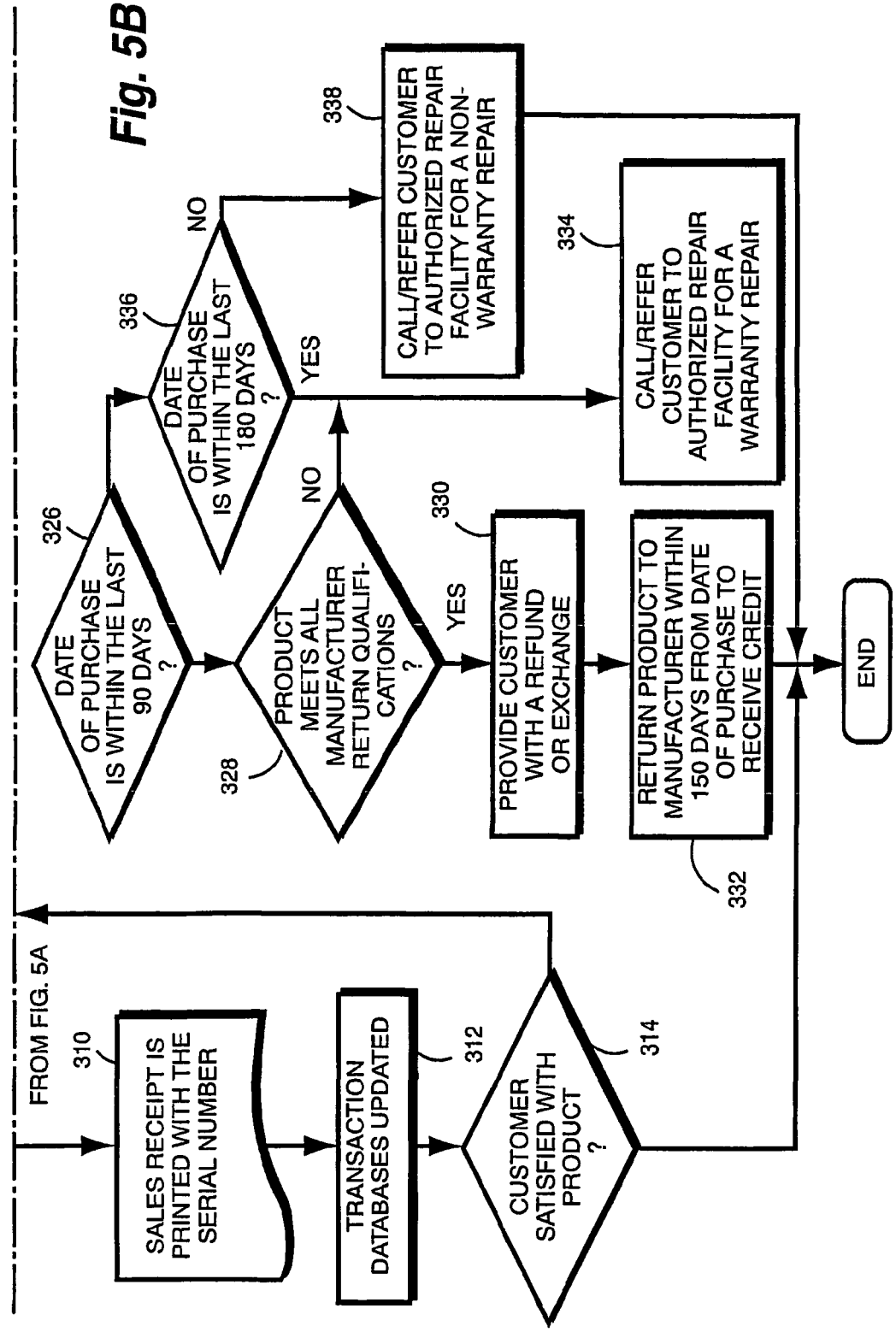

FIGS. 5A and 5B illustrate in flow chart form an example purchase and return process made possible by the electronic registration system (ERS) described above in accordance with the present invention. A store customer first picks out a store product for purchase (block 300) and brings it to the check out station (block 302). The store associate then scans the UPC code to enter the product SKU number (block 304) and, if it is a product for which electronic registration is sought, the store clerk is prompted to enter the unique serial number (block 306).

After the store clerk scans the serial number (block 308), the customer sales receipt is printed with the serial number (block 310) and the transaction databases are updated (block 312). The process ends if the customer is satisfied with the product (block 314). If not, however, the customer returns the product to the store (block 316).

As noted previously, if the customer presents the sales receipt at the time of a return, the store associate may compare the serial number on the product with that on the sales receipt. The associate should compare the printed serial number with that on the product itself, rather than the serial number on the packaging, to guard against repackaging of an old product in a box for a recently purchased product. If the serial numbers match, the return is within an applicable allowable time period, and all other return qualifications are met (e.g., no major parts are missing, etc.) the return may be accepted, assuming that the store clerk handling the return is aware of the applicable return policy associated with that particular product.

However, if the store clerk is uncertain of the applicable allowable return period, the clerk may submit the product for electronic return verification as described below.

If there is no receipt, or if the product serial number does not match that printed on the receipt, the store associate examines the products to ensure all return qualifications are met (block 318). If so, the store associate scans the serial number on the product (block 320) and the retailer computer system 6 checks the retailer database for the serial number (block 322). A link to the registration center's serial number database may be made to search for serial numbers which do not appear in the retailer database (block 324).

Assuming the serial number information is found in either the retailer database or the registration center database, the date of purchase is checked to see if then return has been presented within the applicable return period (e.g., 90 days) (block 326). Purchases within the applicable return period which meet all other manufacturer return qualifications (block 328) may be refunded or exchanged (block 330). The retailer may then return the product to the manufacturer within an applicable time period (e.g., 150 days) from the date of purchase to receive credit for the return (block 332).

For products which do not meet all manufacturer return qualifications (block 328), but were purchased within the applicable return period (block 326), the consumer may be referred to an authorized repair facility for a warranty repair (block 334). Similarly, if the purchase was made outside the applicable return period (block 326), but within the applicable warranty repair period (e.g., 180 days) (block 336), the customer will be referred to an authorized repair facility for a warranty repair (block 334). Consumers seeking to return products purchased beyond the applicable warranty repair period (block 336) will be directed to an authorized repair facility for a non-warranty repair (block 338).

The example return and warranty repair deadlines noted in the example of FIG. 5 are fairly typical for actual return policies. However, these particular deadlines are merely examples, and other appropriate deadlines may be used without departing from the invention. Because different manufactures may utilize different return and warranty deadlines, it is preferred that the deadlines applicable to a particular manufacturer be stored in the retailer computer system. Of course, if the applicable deadlines are encoded along with the serial number information at the time of initial registration, that information should be available from the registration data without the need to again check the applicable return criteria.

Figure 6:
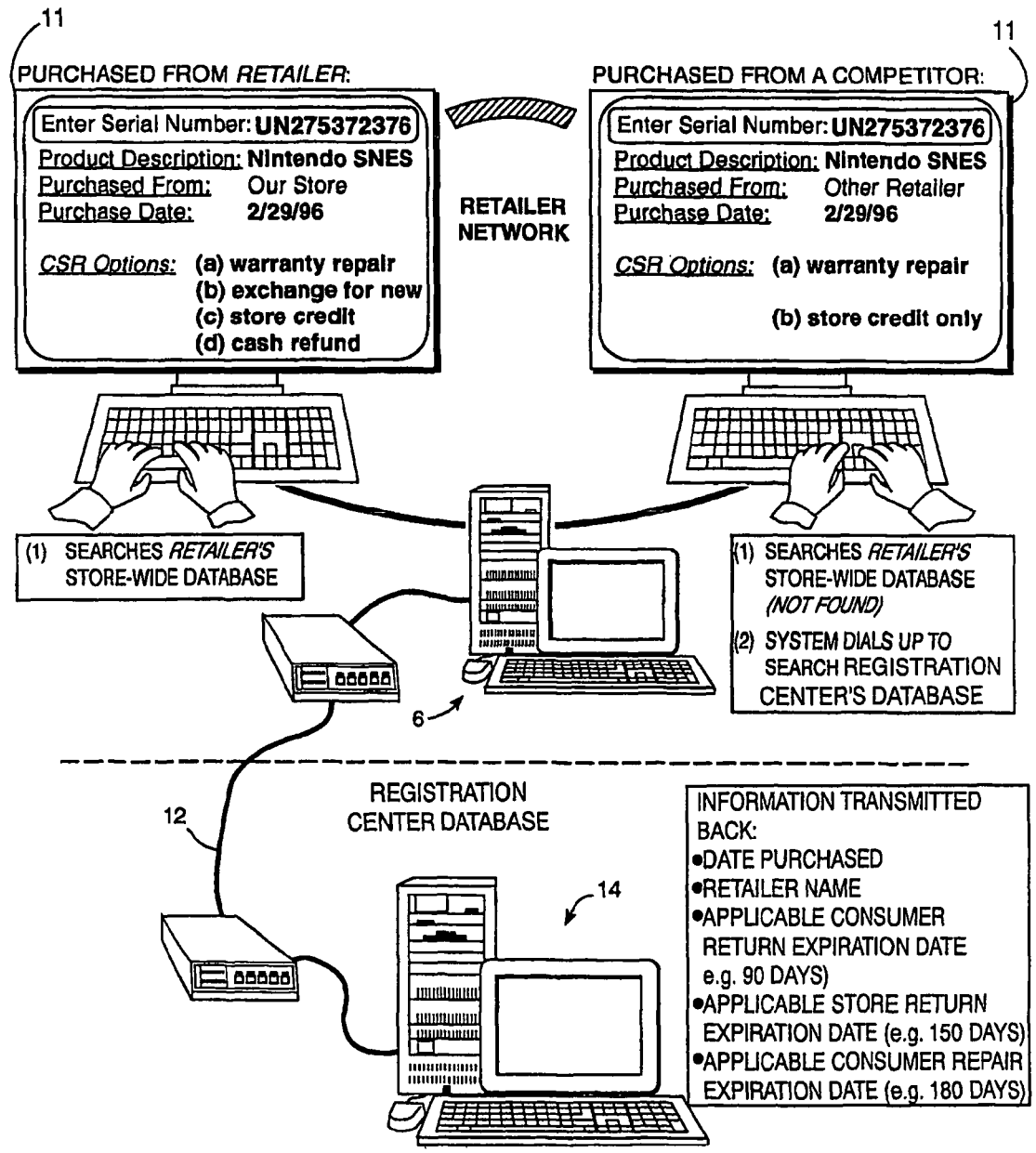
FIG. 6 illustrates an example of a procedure at a retailer for determining whether a product return is properly under warranty.

FIG. 6 provides a graphic illustration of a return process which utilizes the features of an electronic registration system in accordance with the instant invention. As illustrated at the left hand portion of FIG. 6, when a customer seeks to return a product, the store associate searches the retailer's store-wide database by entering the product serial number. If the transaction is located in the store-wide database, the operator terminal 11 of the retailer computer system 6 displays the product description, the purchase location, and purchase date. Additionally, the consumer's return options for the particular manufacturer (e.g., warranty repair, exchange, store credit, or cash refund) may be displayed. The display of consumer options is particularly advantageous where electronic registration is used for multiple manufacturers. By displaying the options, the need for the store clerk to remember or look up the options is avoided. Also, the likelihood of the store associate making a mistake is reduced.

The right hand portion of FIG. 6 illustrates a situation where the product was purchased from a competitor retailer and, thus, does not appear in the store-wide database. After unsuccessfully searching the store-wide database, the retailer computer system 6 dials up to search the registration center database. The registration center computer system 14 returns the date purchased, the name of the retailer that sold the product, the applicable deadline for consumer returns, the applicable deadline for the retailer to return the product to the manufacturer for credit, and the applicable deadline for warranty repairs. Based on this information from the registration center, the operator terminal 11 of the retailer computer system 6 displays the product description, the purchase location and date, and available consumer options.

Figure 7:
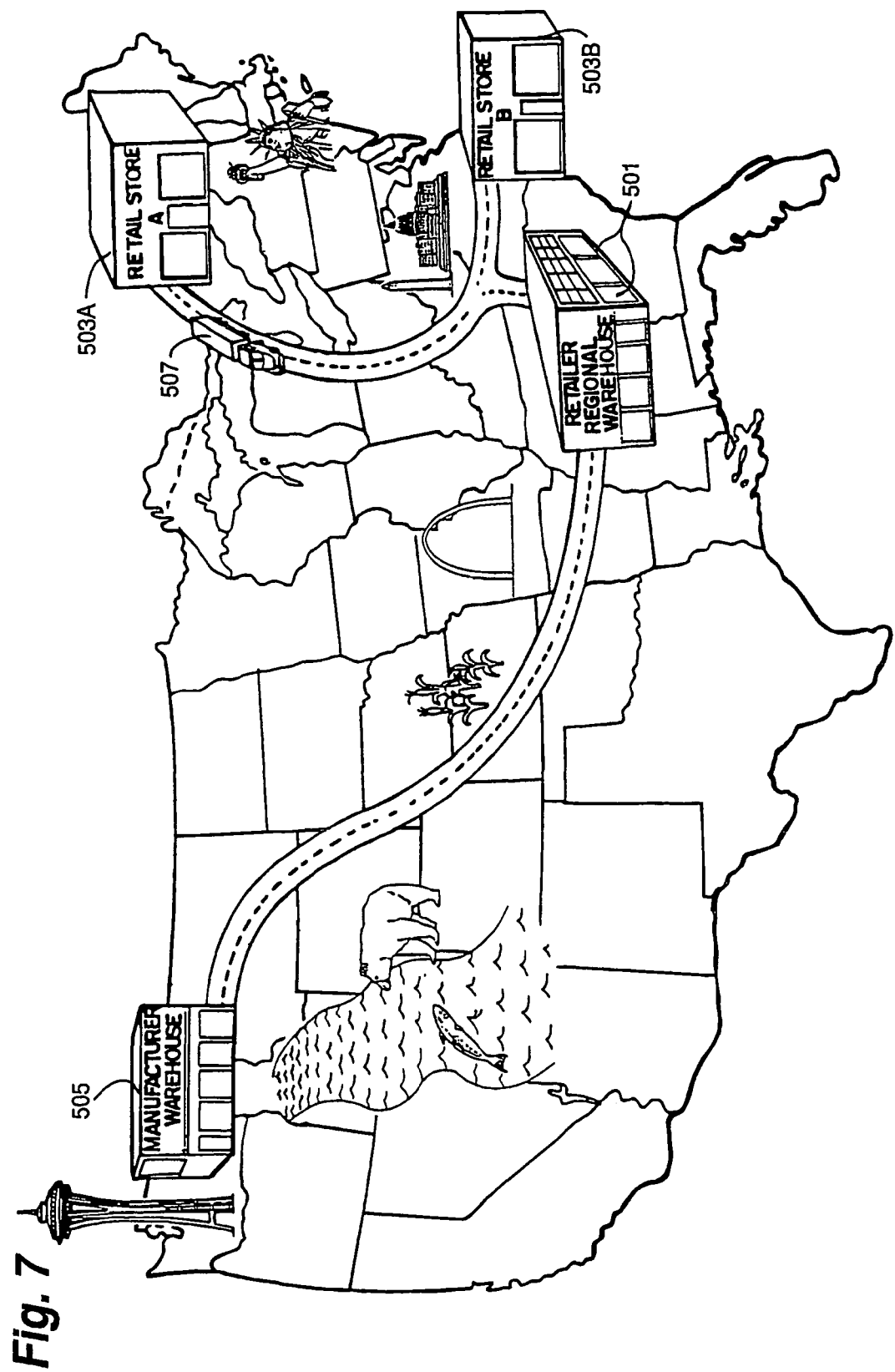
FIG. 7 schematically illustrates a typical arrangement which may be utilized in handling product returns.

Referring now to FIG. 7, an example of a typical arrangement which may be used for handling product returns is illustrated. The present invention, of course, is applicable to other arrangements as well. In the example arrangement of FIG. 7, a regional warehouse 501 operated by a large retail chain collects product returns from local retail stores 503A and 503B. In the illustrated example, retail store 503A is located in the Northeast United States and retail store 503B serves the Mid-Atlantic region; the retailer regional return center warehouse 501 is located in the South; and the manufacturer warehouse 505 is in the Pacific Northwest. Of course, this example is for illustrative purposes only, and it should be appreciated that other local retail stores, regional return centers, etc. would be present in an actual return network. Also, it should be understood that a product return network typically would be operated in conjunction with a product distribution network.

After the returned products arrive at the regional warehouse 501, they are sorted by manufacturer and/or product, and are shipped from the regional warehouse 501 to the manufacturer warehouse 505 for credit or replacement. The manufacturer then inspects the returned products to ensure that they comply with necessary return conditions and, if appropriate, issues a credit or replacement product.

Each step of the foregoing example return process involves various processing and handling requirements. For example, personnel at the local retail store must first review the product for compliance with applicable return requirements (e.g., ensure that the product is returned within the specified return period and verify that all parts have been returned), and then arrange for shipment to the appropriate regional warehouse by way of a truck 507 or other suitable means of transportation.

Employees at the regional warehouse must unload the products received from the local retail stores, sort them by manufacturer and/or product, prepare them for shipment (e.g., place the returned products on shipping pallets), and arrange for the shipment to the manufacturer. Finally, the manufacturer must receive the returned product shipment, verify that the returns are proper, repackage the returned products if appropriate, and conduct necessary bookkeeping to ensure that the retailer receives proper credit for the return. It is noted that the foregoing is not an exhaustive list of the costs and efforts associated with processing product returns by the retail stores, the regional return center warehouses, and the manufacturers.

The electronic registration system (ERS) described above may be utilized, for example, in connection with operations at the retailer regional return center warehouse 501 to reduce costs incurred by both the return center and the manufacturer. In accordance with one aspect of the present invention, significant cost savings can be realized by reducing or eliminating unnecessary shipping costs by making a relatively early determination whether a product return will ultimately be accepted by the manufacturer or the like. If not, the returned product need not be handled further, thereby reducing costs.

Thus, ERS can be used to reduce costs and improve efficiency of returns between the retailer and manufacturer and also, as described in greater detail below, between the consumer and the retailer and/or the manufacturer. As explained herein, the user interface as well as the operation of the ERS system is significantly different in the retail/manufacturer application as compared to the consumer/retailer application, as a result of the particular needs in each of these return situations. It is noted that commonly owned and co-pending application Ser. No. 09/065,552 identified above, includes, as one example, a method and apparatus for efficiently handling product return transactions between a retailer and a manufacturer. In order to provide a complete understanding of the preferred ERS system used in the present invention, a further description of this retailer/manufacturer returns system is described below.

In accordance with this feature of the ERS system, advance return authorization (RA) for shipment of returned products between the retailer and the manufacturer can be obtained for a plurality of products at one time to establish an approved product return batch. The approved batch may be properly labeled prior to return to the manufacturer. In this way, product returns may be easily and efficiently handled in batches rather than as individual units, thereby improving efficiency and reducing costs.

Figure 8:
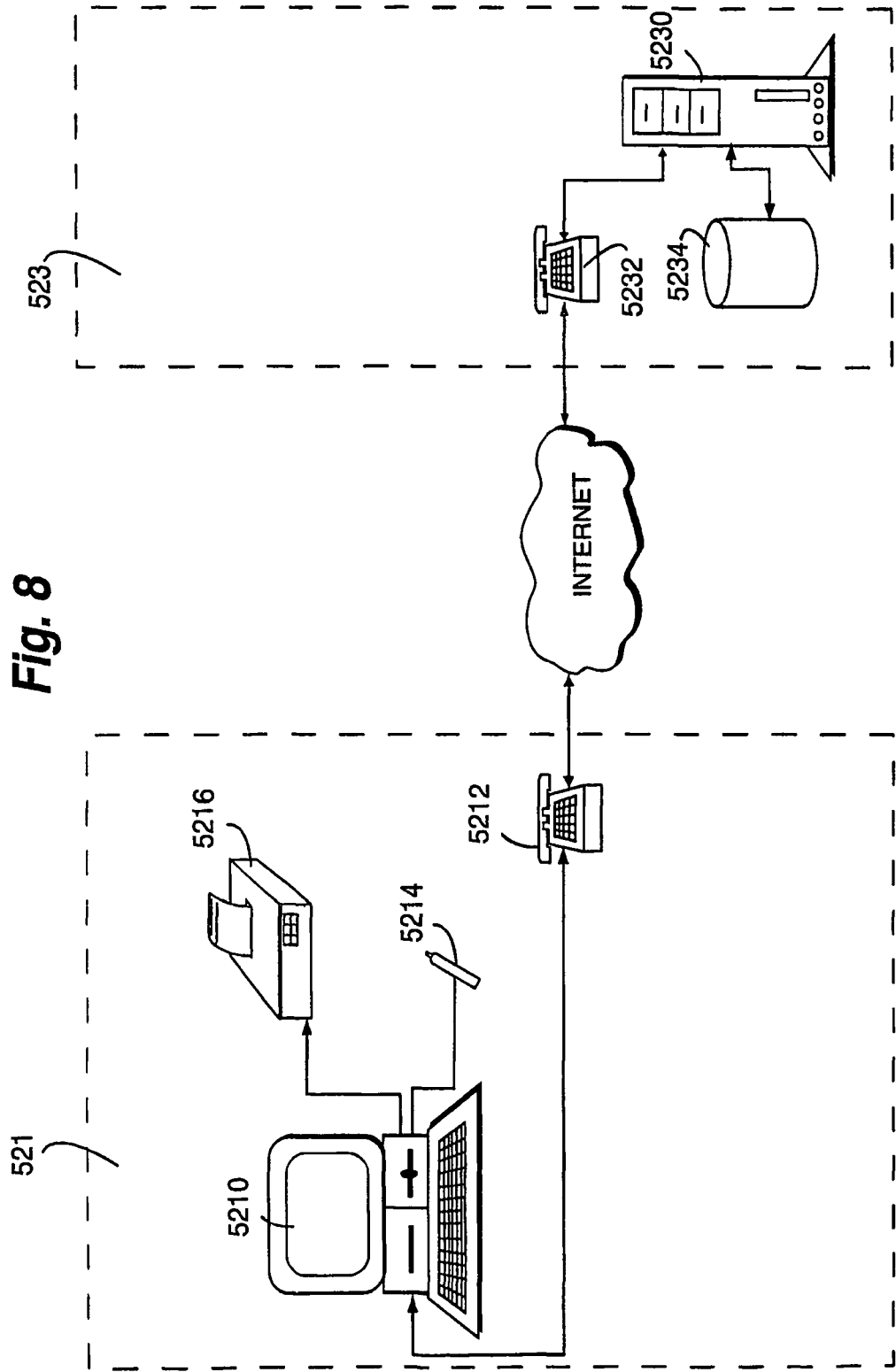
FIG. 8 is a schematic diagram illustrating components which may be used in connection with a preferred example implementation of one aspect of the present invention.

Referring now to FIG. 8, an example implementation of this system includes a return side portion 521 and a manufacturer side portion 523 which are operable to communicate over, for example, an internet connection 525. Briefly, the return side portion 521 may include a personal computer 5210 that includes, for example, an Intel 486 processor or higher with at least 16 MB of RAM, a Microsoft Windows 95 or Windows NT operating system, and browser software such as Netscape Navigator 4.0 or higher. The personal computer 5210 may also include a modem for direct connection to an internet provider through a dedicated telephone connection 5212. Alternatively, an internet connection may be made by the personal computer 5210 over a corporate network. Also, it may be possible to utilize a direct telephone link by modem between the return side portion 521 and the manufacturer side portion 523 or even a hardwired connection.

A bar code scanner 5214 is provided for scanning bar coded SKU and, preferably, serial numbers for returned products. Additionally, a printer 5216 is provided for printing transaction records and, if desired, printed versions of return authorizations from the manufacturer. As will be discussed below in greater detail, manually prepared return authorization forms may be used as an alternative to printed return authorizations.

The manufacturer side portion 521 includes a computer system 5230 utilizing, for example, an IBM AS/400 computer and having an associated data storage unit 5234 for storing an electronic product registration database. The manufacturer side computer system 5230 is capable of communicating with the return side portion 521 over an internet connection though telephone connection 5232. As noted previously, other communication techniques between the manufacturer side portion 523 and the return side portion 521 may also be utilized.

After the regional retailer return facility receives products for return to the manufacturer, the return side portion 521 may access the manufacturer side portion 523 to screen the products for compliance with return requirements and to obtain pre-authorization of the returns. In particular, the return side computer 5210 connects to the manufacturer side computer 5230 by way of the internet or through other appropriate communication techniques. In the present example embodiment, the manufacturer side computer maintains a world wide web page for access by the regional return center. Password protection may be provided to ensure only authorized retailers are able to access return pre-authorization features in accordance with the present invention. For example, each return center location that is permitted access to the pre-authorization features may be assigned a location identification code and a password. In such a case, both the location identification code and the password would be required before access is granted to the product return screening program.

Figure 9:
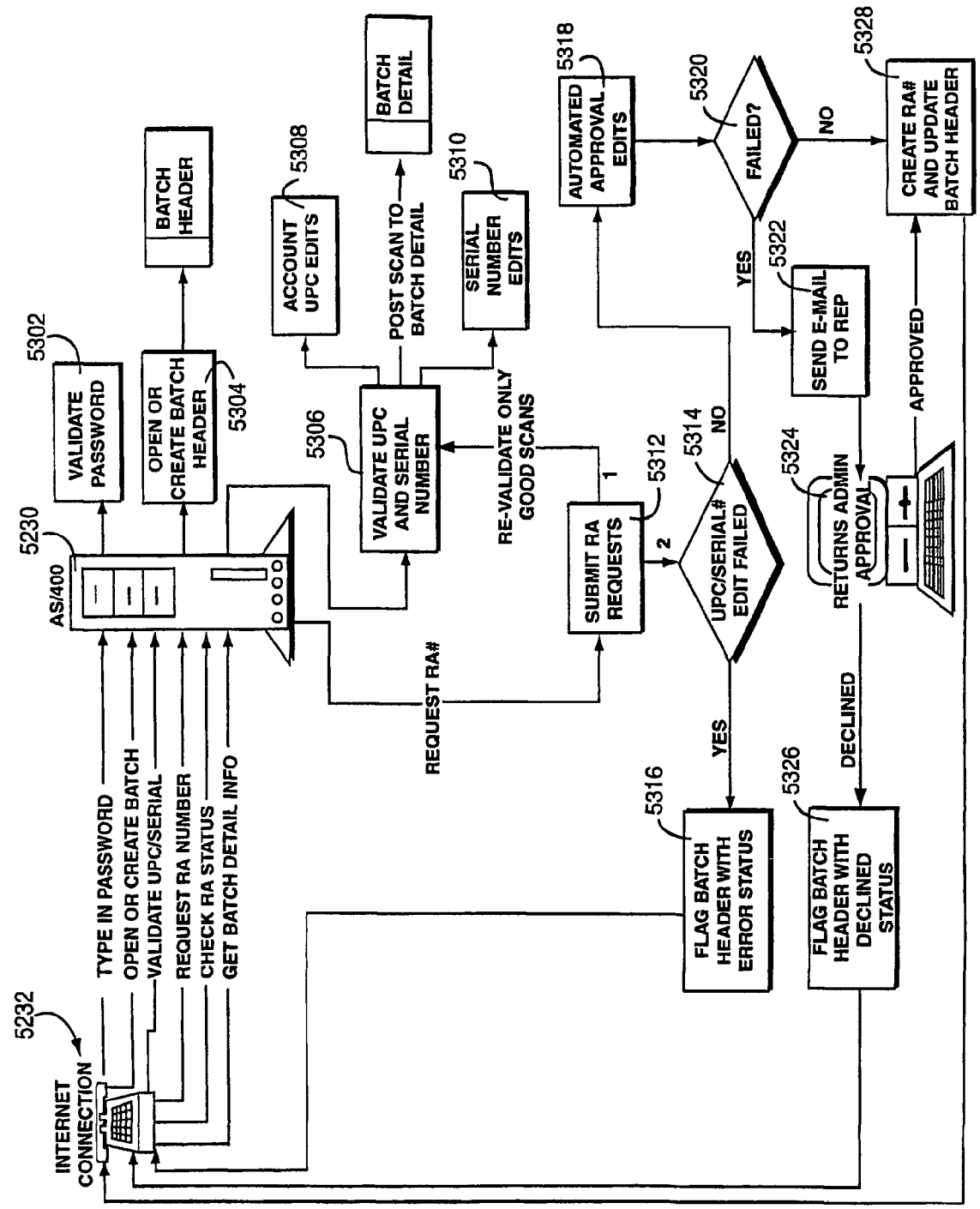
FIG. 9 is a data flow diagram illustrating operation of the system of FIG. 8.
Figure 10A:
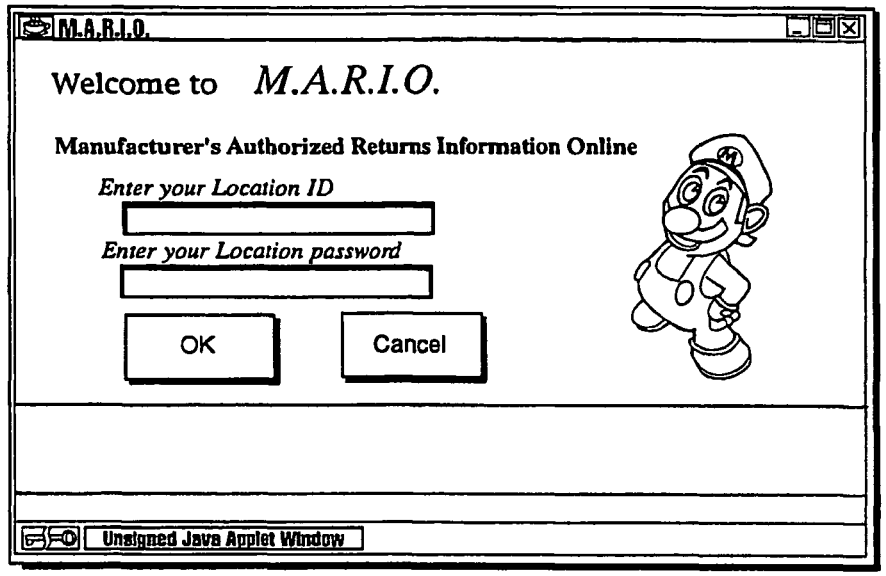
FIGS. 10A through 10H illustrate various user interface screen displays which may be used in connection with an example implementation of one aspect of the present invention.

FIG. 9 is a logic flow chart for the manufacturer side computer 5230 in screening returned products and processing pre-authorization requests from the regional return center. As indicated in the top portion of FIG. 9, the user first enters the appropriate location identification code and password. FIG. 10A illustrates a screen which may be displayed at the return side computer to prompt the user to enter the location identification and password. Once this information is received by the manufacturer side computer, the password is validated at function block 5302. If desired, appropriate application maintenance procedures may be implemented upon validation of the password.

Figure 10B:
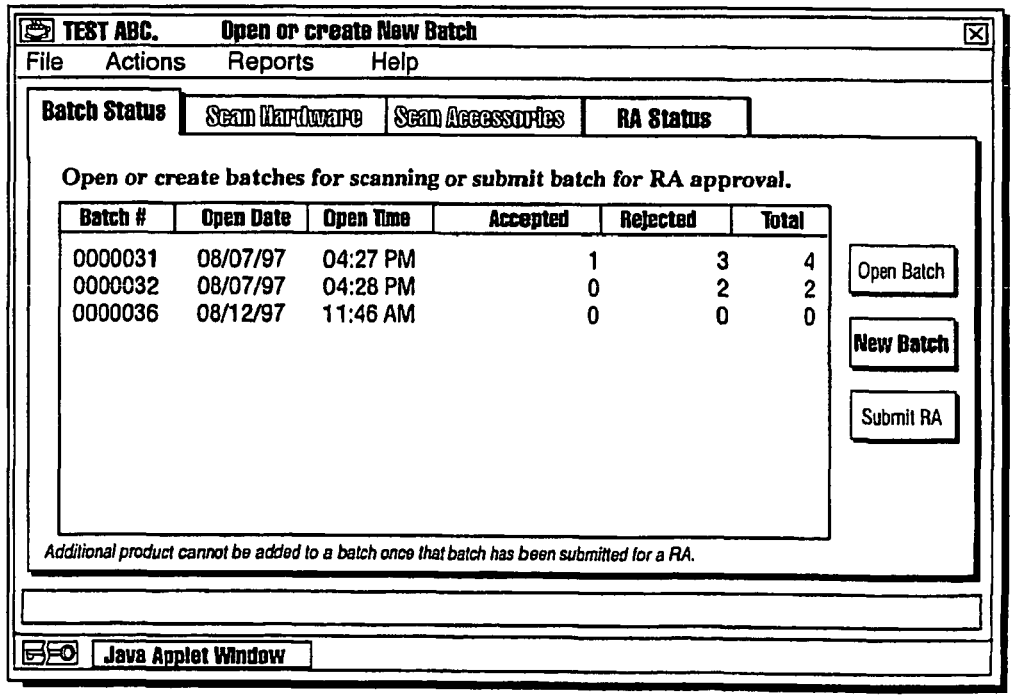

Upon verification of the location identification code and the password, the manufacturer side computer 5230 may cause a screen such as is illustrated in FIG. 10B to be displayed at the return side computer 5210. As shown in FIG. 10B, existing batches saved in memory at the manufacturer side computer 5230 are listed. Existing batches are those for which return products have been scanned, but which have not yet been submitted for return authorization. Preferably, items can only be added or deleted from a batch up to the time that the batch is submitted for return authorization. In the present example implementation of the invention, once the batch is submitted for return authorization, it will no longer be displayed on the batch status screen, but can be viewed from the RA Status screen described below in connection with FIG. 10H.

It is possible to display a number of information items on the batch status screen in addition to the batch number. For example, the batch status screen shown in FIG. 10B displays the date and time the batch was opened, the total number of products that have been screened for return validation, the number of accepted items, and the number of rejected items. Of course, additional information could be displayed if desired.

A number of options are offered to the return center operator on the batch status screen illustrated in FIG. 10B. In particular, the return center operator may open an existing batch, create a new batch, or submit a batch to the manufacturer for return authorization. To open an existing batch, the desired batch may be selected in a conventional fashion by using a mouse to highlight the batch number and then clicking on the "Open Batch" button. Similarly, a highlighted batch may be submitted for return authorization by clicking the "Submit RA" button. A new batch can be created by clicking the "New Batch" button.

Preferably, a batch must be set up prior to screening returned products for return authorization. Depending on user preference, the return center operator may establish a new batch for each pallet of returned products that is screened for return authorization, each bill of lading, or based on the date that the products are scanned. It is not necessary to limit the number of products that can be scanned for each batch.

Referring again to FIG. 9, when the return center operator either opens an existing batch or creates a new batch, control passes to function block 5304. For a new batch, the manufacturer side computer 5230 creates a batch header which includes information identifying the assigned batch number, any customer reference numbers, the return center address, the name and telephone number of a customer contact person, and the status of the batch (e.g., product entry stage, pending approval, approved, declined, RA assigned, etc.). A new batch number will be assigned each time "New Batch" is selected. If an existing batch is opened, the header information is retrieved from memory associated with the manufacturer side computer 5230.

Once a batch is opened, the system is now ready to screen returned products. Depending on the type of product for which return authorization is sought, the return center operator selects either "Scan Hardware" or "Scan Accessories" by clicking the appropriate button (FIG. 10B).

Figure 10C:
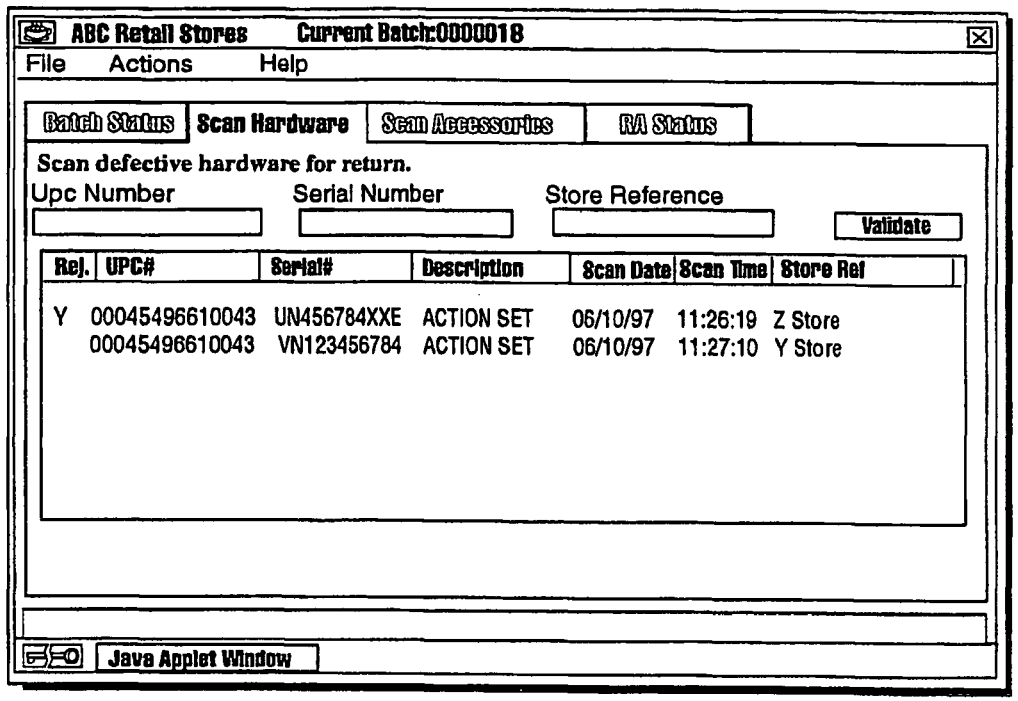

Referring now to FIG. 10C, to screen hardware product returns for compliance with return criteria, the return center operator is prompted to enter the UPC number for the product, the product serial number, and a store reference code (if desired). This information may be entered by scanning bar codes on the product with wedge scanner 5214 (FIG. 8), or alternatively by typing the information on the keyboard associated with return side computer 5210. Other appropriate techniques may be employed as well. The user may then click the "Validate" button to instruct the manufacturer side computer 5230 to screen the product for return approval.

As shown in FIG. 10C, the Scan Hardware screen then displays the submitted information including the UPC code, the serial number, a description of the product, the date and time it was entered, and the store reference if any. Again, other items could be displayed if desired.

Although various techniques may be used for validating the screened products for compliance with return criteria, the system preferably uses data collected by an ERS as described above. In other words, while the above description of this retailer/manufacturer return system indicates that the manufacturer has a product registration database, this database may be based on information collected by the central database of multi-vendor ERS system as described above. Briefly, such an electronic registration system establishes a database which then may be accessed at the time of product return to determine the date of original sale and other information pertinent to determining whether return requirements are met. It is noted that, for a return to be properly accepted by a manufacturer, the product must not only be returned by the customer to the retailer within the specified return period, but it also must be returned by the retailer to the manufacturer within this specified period. Thus, this retailer/manufacturer feature of the ERS system is used to verify the latter.

When the manufacturer side computer 5230 receives UPC and serial number information for return validation, control passes to function block 5306 of FIG. 9. The manufacturer side computer 5230 then checks the electronic registration database to ensure that the identified product meets product return criteria, and posts the scanned information to a batch detail file. The batch detail file preferably includes the UPC number, the serial number, an indication of product quantity, and status (e.g., pending approval, approval good, error, or approval declined). The electronic registration database may then be edited to indicate that the product identified by the UPC code (function block 5308) and serial number (function block 5310) has been screened for return. Accordingly, the manufacturer side computer 5230 can keep track of products that have already been screened to avoid multiple submissions of a single product for return.

There may be a number of reasons a product will not qualify for return credit or replacement. For example, the warranty period may have expired, the serial number might not have been registered, an invalid serial number may have been received, the packaging may be missing, a major component of the product may be missing, or the item might be non-returnable as part of the conditions of sale. If the product does not qualify for return, the return center, such as the retailer regional warehouse, can retain the rejected product rather than ship it to the manufacturer, thereby saving the cost of freight for shipping a product that does not qualify for credit.

Figure 10D:
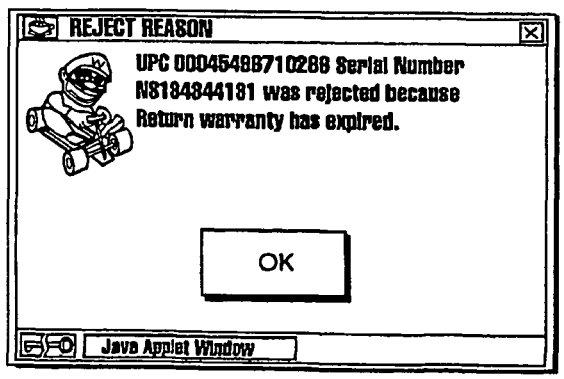

A note is displayed across the bottom of the screen of the Scan Hardware screen when a hardware unit does not qualify for return. The displayed message is preferably for the last item scanned. If the return center operator would like to review the reason a previously scanned item did not qualify for return credit, the operator may select "Actions" from the screen menu to see a list of available options. The operator may then select "Reasons" to see a description of the reason the unit was rejected. An example of a displayed reject reason is shown in FIG. 10D. Scanning may be resumed by pressing the <Esc> key on the return side computer keyboard to close the menu screen. The scanning process is repeated for each hardware item for which screening is sought.

Figure 11A:
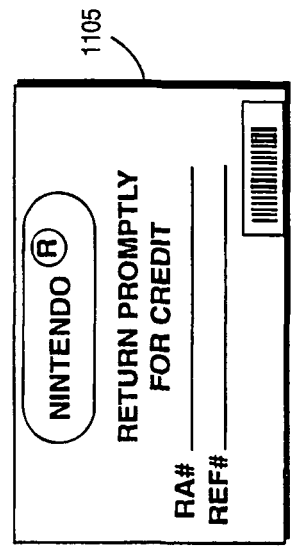
FIG. 11A further illustrates the batch return authorization label of FIG. 11.
Figure 11:
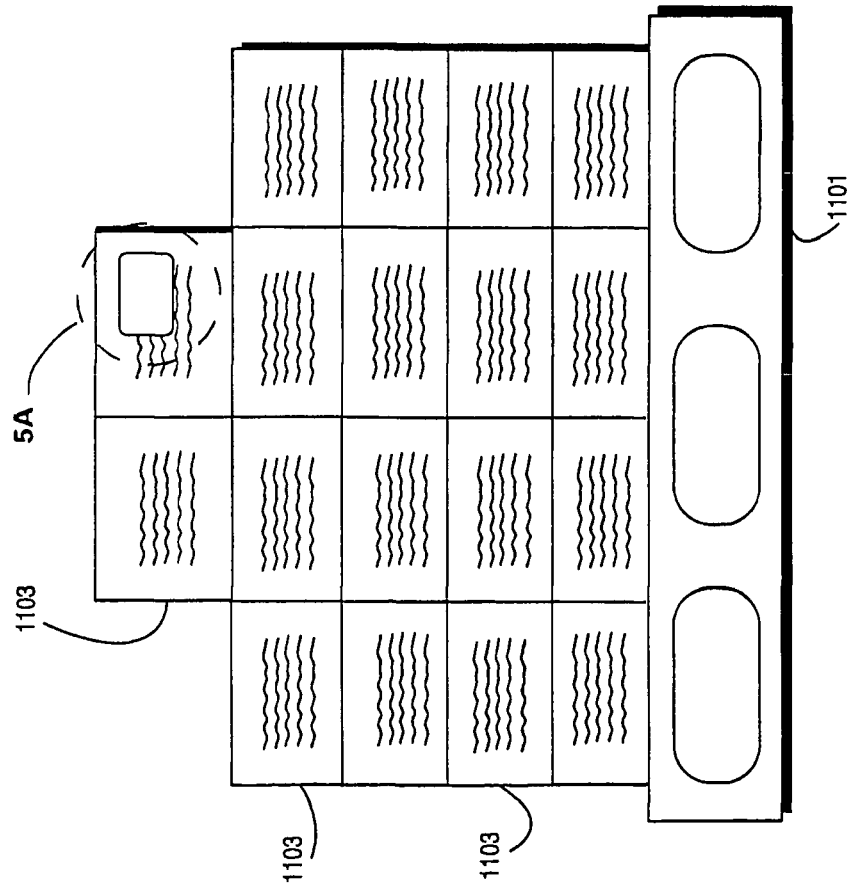
FIG. 11 is a plan view of a pallet on which a plurality of returned goods is stacked for return to a manufacturer, including a batch return authorization label which may be placed on the pallet.

Ideally, the return center operator stacks returnable items 1103 qualifying for return on a shipping pallet 1101 or the like (see FIG. 11). Non-qualifying items should be stacked on a separate pallet. It will then be unnecessary for return center personnel to later sort through the products a second time to separate qualifying products from non-qualifying products.

Figure 10E:
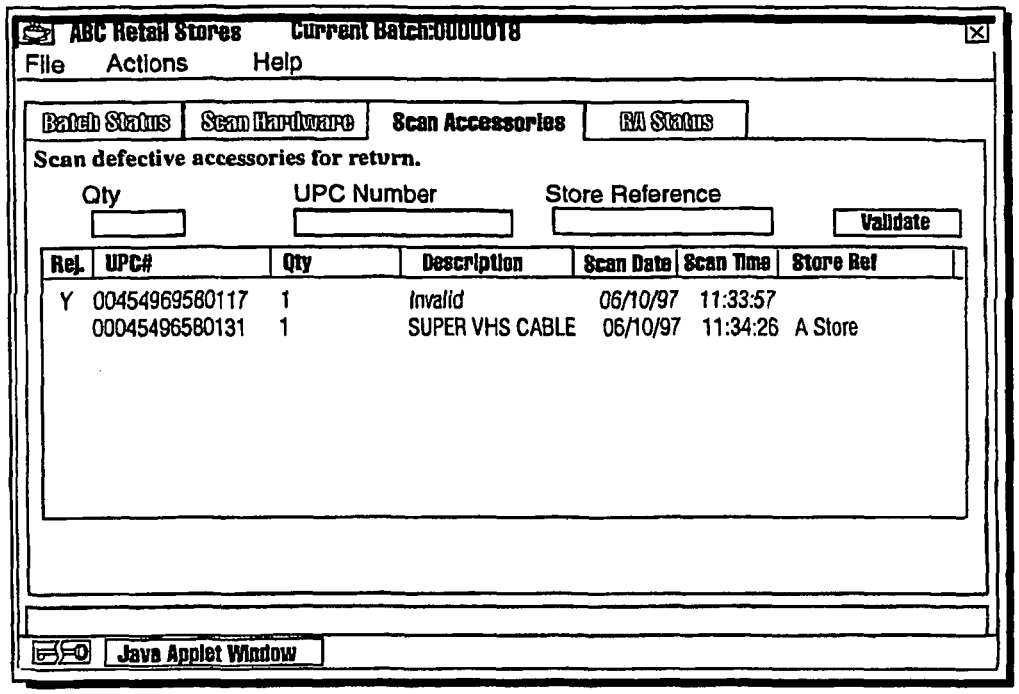

The Scan Accessories display screen is illustrated in FIG. 10E. The return center operator is prompted to enter the quantity of the accessory that is to be scanned. For example, if return authorization is to be requested for three VHS cables, the operator will input "3" and then use the <TAB> button on the return side computer keyboard to advance the cursor to the UPC Number field. The UPC number may then be scanned or entered manually on the keyboard. If a Store Reference code is used it may be entered prior to clicking the "Validate" button.

Figure 10F:
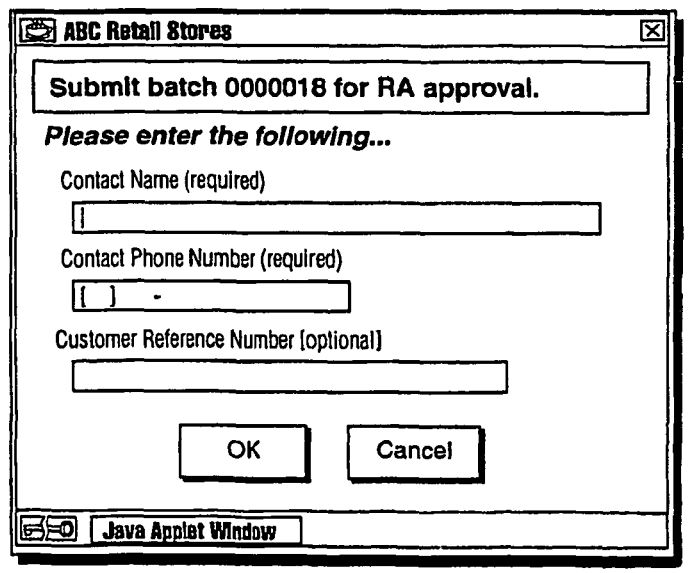

Once pre-screening is completed for the hardware and accessories, the return center operator may move back to the "Batch Status" screen. The batch may then be submitted for return authorization by clicking the "Submit RA" button. Referring now to FIG. 10F, the return center operator is preferably prompted to enter the name and phone number of the person who should be contacted with information or questions concerning the return authorization request. If desired, a customer reference number (e.g., a bill of lading number, file number, invoice number, etc.) may be entered for an internal reference to identify the return authorization. If the information on the screen is not filled in or "Cancel" is selected, the batch will not be submitted for return authorization. However, the batch will continue to be visible from the "Batch Status" screen.

Figure 10G:
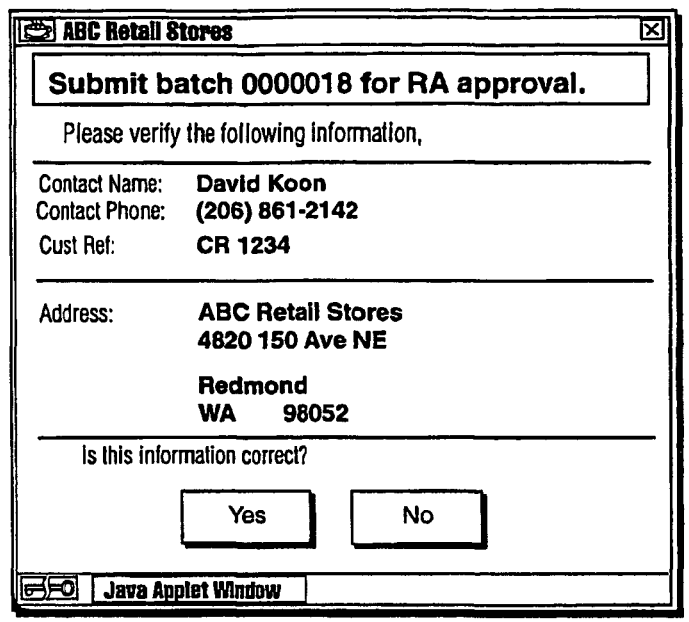

Referring again to FIG. 9, control goes to function block 5312 upon submission of a return authorization request. First, the return center operator is asked to verify the contact information. An example of an appropriate contact verification screen for display on the return side computer 5210 is shown in FIG. 10G. If the contact information is verified, the manufacturer side computer 5230 re-validates the good scans included in the submitted batch. Control then proceeds to function block 5314. If the good scans fail re-validation, control proceeds to function block 5316, which flags the batch header with an error indication, and notifies the return center operator of the failure. Otherwise, control proceeds to function block 5318 for automated approval.

Function block 5320 checks to determine whether the automated approval process was successful. If not, an e-mail message may be sent to a manufacturer's representative for the particular return center (function block 5322). The return authorization request may then be reviewed manually to determine whether the request should be approved (function block 5324). If the manual review shows that the request was properly rejected, the batch is flagged with an indication that the request was rejected, and the return center is notified of the rejection (function block 5326). However, if the request is approved, control passes to function block 5328 to create a return authorization number and update the batch header to indicate the approved status. As indicated in FIG. 9, control may also pass to function block 5328 by way of function block 5320 if the automated approval process is successful.

Figure 10H:
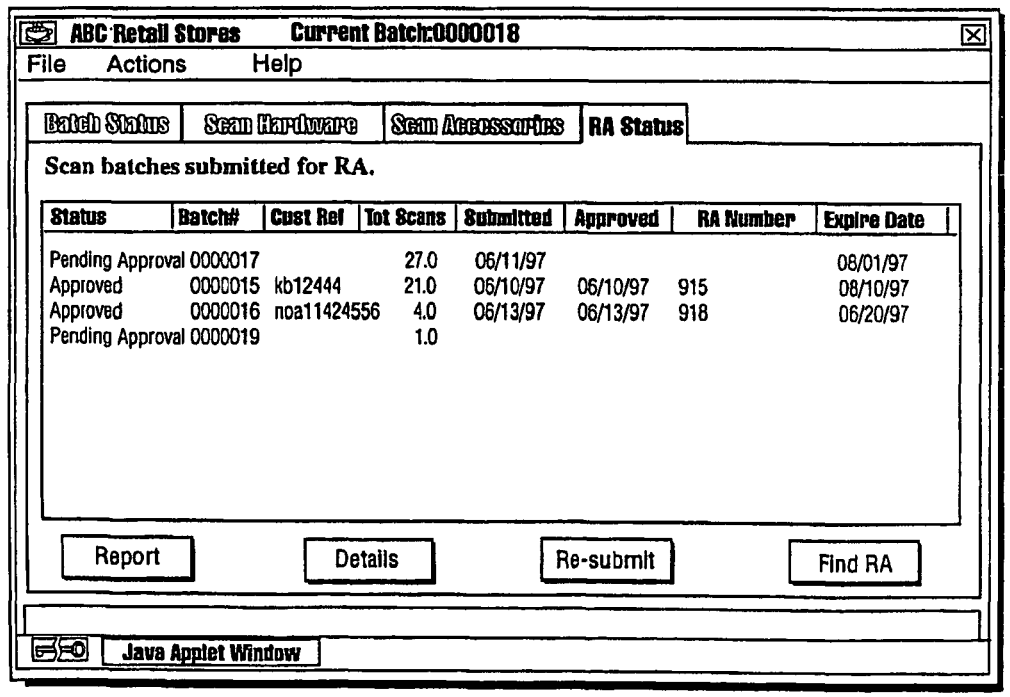

FIG. 10H illustrates an example of an RA Status display screen which may be used to inform the return center operator of the status of an RA request. As shown, the RA Status screen lists the authorization status (e.g., pending, approved, rejected), the batch number, the customer reference number if any, the number of scans in the batch, the submission date, the approval date if applicable, the RA number if applicable, and the expiration date by which the return must be completed.

Once the RA has been submitted and approved, the system may also provide the dollar value of the product that is authorized for return. This dollar value may be based on the lower of (1) the gross invoice price paid by the Dealer for the product, less the value of all allowances and incentives given to the Dealer, or (2) the vendor's net product pricing at the time of the return. In most cases, the dealer may deduct the monetary value of authorized returns from any existing or future vendor invoices. Additionally, the system can be configured to comply with a vendor's specific returns policy and guidelines.

The RA number should be placed on the products prior to shipping to the manufacturer for credit. Referring now to FIGS. 11 and 11A, the RA number listed on the RA Status display screen may be written on an adhesive label 1105 supplied by the manufacturer along with the customer reference number (if applicable). Alternatively, the printer 5216 (FIG. 8) may be used to print labels upon receipt of a return authorization number. Such labels are preferably placed on all four sides of the shipping pallet, the pallet is shrink wrapped and shipped to the manufacturer. The pallet should be shipped immediately to guard against expiration of product return dates. Of course, other shipping containers may be used as well.

The return authorization labels 1105 provide an easy reference to personnel at the manufacturer warehouse and permit simple and efficient processing of the returned products. Because the returned products are received in a batch and have been pre-approved for return credit, less work is required in reviewing the returned products to verify compliance with return criteria. As a result, the resources required to process the shipment are reduced, and the manufacturer is able to more quickly credit the return center for the returned products.

As explained above, this exemplary retailer/manufacturer returns feature of the ERS system simplifies and improves the returns process between a retailer and a manufacturer. The instant invention, however, is particularly advantageous when used at the consumer/retail level to prevent acceptance of unauthorized returns to retailers by consumers. This retailer/consumer feature of the instant invention will now be described in greater detail below.

Referring now to FIGS. 12, 12A, 12B and 13, in accordance with one aspect of the present invention, a computer based system provides a method for real-time data storage and retrieval for the purpose of verifying and validating specific sales transaction data and product returns/warranty repair eligibility at the point of sale (POS) or retail location at which the consumer brings the product for return. Sales transaction information provided by this system may include SKU or UPC number, product serial number, date of purchase, place of purchase, register transaction number, payment information, return-to-vendor status, repair warranty status, authorized repair center location and phone number, estimated distance from consumer to repair location, repair prices, and any other suitable information as desired by the retailer and/or vendor.

The sales and returns verification system illustrated in FIGS. 12, 12A, 12B and 13, preferably makes use of and incorporates POS electronic registration technology at the point of sale register, where the product's SKU or UPC is linked to the product's serial number, forming a unique identifier. Additional point of sale data (as determined by the retailer and/or vendor) can now be attached to this unique identifier and stored and/or transmitted and stored in a central database for future reference. Once the connection is made between the retailer and the vendor or third party service provider, additional services, such as credit card authorization or check verification, can be provided to the retailer.

In operation, the POS register may capture the UPC or SKU and the product's serial number to establish a unique identifier. Depending on the requirements of the particular retailer and/or vendor, additional data may be linked to the unique identifier and then transmitted. As explained above, the unique identifier may be determined in accordance with a mask and associated decoding information defined, for example, by the third party service provider and manufacturer.

If a transaction is paid by check or credit card, the check or credit card identification number may trigger the system to establish a connection with the third party service provider for credit card authorization or check verification. Once the POS register transaction is closed, the system stores and/or transmits and stores the unique identifier (UPC or SKU and Serial Number) along with the point of sale data as determined by the retailer and/or vendor.

The third party service provider acts as a central registration computer system (see, e.g., FIG. 1) and facilitates the link with the retailer. Credit card authorization or check verification data may be processed directly or through an approved financial institution. The financial institution/third party service provider returns a credit card authorization or check approval number.

The unique identifier (e.g., SKU or UPC and/or the product's serial number) along with the date of purchase and any additional data linked to it is stored in a central database for future access. The central database preferably physically resides with the third party service provider. Alternatively, applicable portions of the central database can reside with the respective vendors as explained above.

When a consumer returns a product to the retailer, the store associate scans or otherwise enters the product's UPC or SKU, the product's serial number and, preferably, the customer's zip code. The system transmits this information to the third party service provider (or manufacturer) where certain data resides in a central database from the initial POS transaction and electronic registration as explained above.

The information is processed in accordance with the retailer and manufacturer's returns policy terms and conditions (each retailer and manufacturer is preferably responsible for updating its own returns policy and product warranties via a remote log in password). The manufacturer's warranty repair policy is also taken into account, as well as repair localities, including the repair center's address, phone number, approximate repair charges, etc. The system can also accommodate multiple (different) returns policies and repair warranties for the same manufacturer. This feature will help to satisfy contractual agreements for specific retailer customers.

Additional POS information (form of payment, price, etc.) as determined by the retailer and manufacturer may also be stored and linked to this product and/or sales transaction. In some instances, where the manufacturer has more stringent returns policies, the manufacturer may populate and store the product serial numbers at the time when products are shipped (sell-in) to the retailer. When the product is sold by the retailer (sell-through) the serial number is retransmitted and the records updated at the third party's database. This feature allows the manufacturer to track specific products with unique warranties and/or returns privileges.

Once the information is processed, it is transmitted back to the retailer (along with a transaction record number RA) and presented in the form of an on-screen menu option(s) with predetermined (canned) text message(s). The retailer associate and/or the customer select the most appropriate option (repair, return/refund or return/exchange, etc.). If the customer selects the return/exchange option, the system prompts the store associate to scan the replacement product's serial number. A hard copy, in the form of a receipt or an expanded version, detailing the transaction (repair information, etc.) may be printed for the customer as well as for the retailer's material move records.

The transaction may then be closed and the final information (customer selection) is retransmitted, linked to the product record and stored for future use by the manufacturer, retailer, and or third party service provider. The system updates the original records according to which option the consumer exercised. If the repair option was selected the system voids the RA transaction number. In case of a return/exchange transaction, the system updates the record with the replacement product serial number. It is noted that with most manufacturers, the replacement product's warranty expiration date coincides with the original warranty expiration date.

Figure 12:
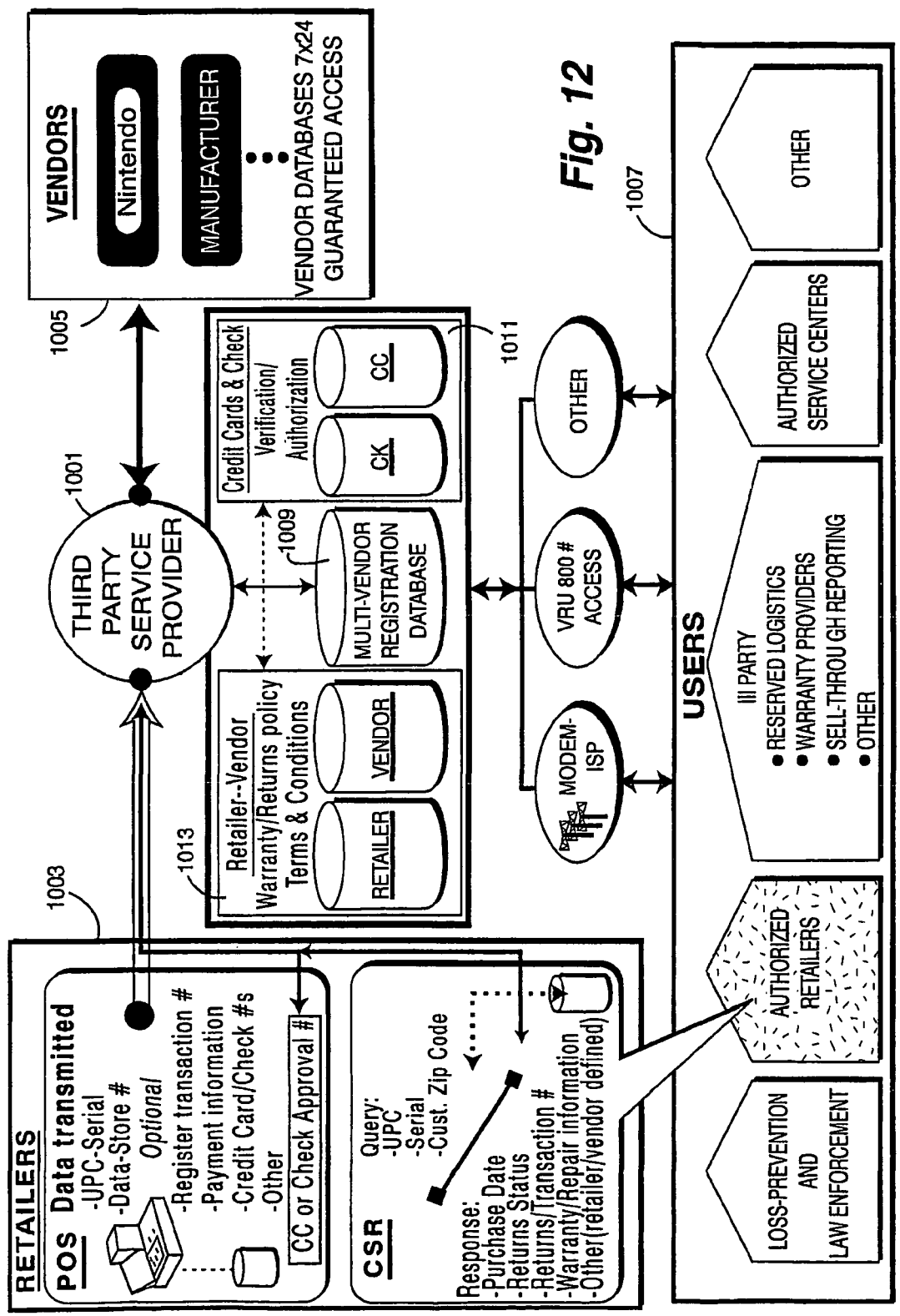
FIGS. 12, 12A and 12B are schematic diagrams illustrating the operation of a general registration/return system in accordance with one aspect of the present invention.

Referring to FIG. 12, a third party service provider 1001 operates a central registration computer system for the benefit of a number of retailers 1003 and vendors 1005. The use of an independent service provider 1001 may be beneficial in encouraging retailers and vendors to utilize the transaction registration services. In addition to the retailers 1003 and vendors 1005, a number of other users 1007 may access the third party service provider system through, for example, a modem or internet connection, by way of a toll free 800 telephone number, or other appropriate means. These other users 1007 may include, for example, law enforcement agencies, loss prevention and insurance groups, third party reverse logistics providers, third party warranty providers, third party groups that provide sell through reporting, authorized service centers and others. In other words, the information stored by third party service providers can be used for other applications in addition to the validation of returns.

Law enforcement agencies may, for example, access the central database to locate information regarding recovered stolen property. Thus, the rightful owner of a recovered property may be readily located. Additionally, locating the rightful owner may provide law enforcement agencies with leads to assist criminal investigations by, for example, helping determine the location from which stolen goods originated. Similarly, insurance carriers and loss prevention groups may be given access to the database to verify sales information and help guard against fraudulent claims.

Customer information such as name, area code and the like is typically not gathered at point of sale. Accordingly, a vendor may include a registration card with the product which may be filled in by the customer and forwarded to the vendor or the third party service provider. The information from the product registration card may then be appended to the transaction record to provide corresponding customer information. Of course, in lieu of a mail-in product registration card, it is also possible to permit on-line registration, telephone registration, or other available forms of registration. Of course, any such form of registration should require a sufficient indication of information that can be used to verify that the transaction is being registered to a rightful purchaser.

FIG. 15 schematically illustrates a process that may be used for on-line consumer post-sale registration. To ensure that the post-sale registration is being made by a proper customer, the process goes through an initial validation stage to verify information that would be known to a proper customer and which is already available to the central registration system by virtue of the previous POS or e-tailer transaction registration. For example, the consumer may be prompted to enter the brand name of the product (step 1501), the store at which the product was purchased (step 1502), the purchase date (step 1503), the product serial number (step 1504), and the product description (step 1505). Correct responses (or at least nearly correct responses) to these inquiries permit the user to proceed to the second stage of the post-sale registration wherein the consumers name, address, phone number and other suitable information is obtained and stored with a link to the product information. Of course, adequate steps should be taken to ensure consumer privacy.

As shown in FIG. 12, at the point of sale (POS), the retailer may transmit applicable information to the third party service provider 1001 to be included in a multi-vendor database 1009. If desired, the central registration computer system may include a database 1011 for use in verifying credit card or check transactions. If this capability is used, the third party service provider may return a credit card or check approval number at the time of the sale. Additionally, a database 1013 may be provided for information pertaining to the return policies of particular retailers and vendors.

The system permits customer service requests (CSR) upon receipt of applicable information such as a UPC number, serial number, or customer zip code. In response to a CSR, the third party service provider will return pertinent information such as the purchase date, return status in view of the applicable return policies, a return authorization number if appropriate, warranty/repair information such as a list of authorized repair centers, or other information. For example, user tips may be downloaded to assist a customer in diagnosing a problem, properly connecting electronic equipment, etc. Such information may be included in a local retailer database, a third party service provider database, or a manufacturer database. The third party service provider and manufacturer databases are preferably available seven days a week, and 24 hours a day.

Figure 12A:
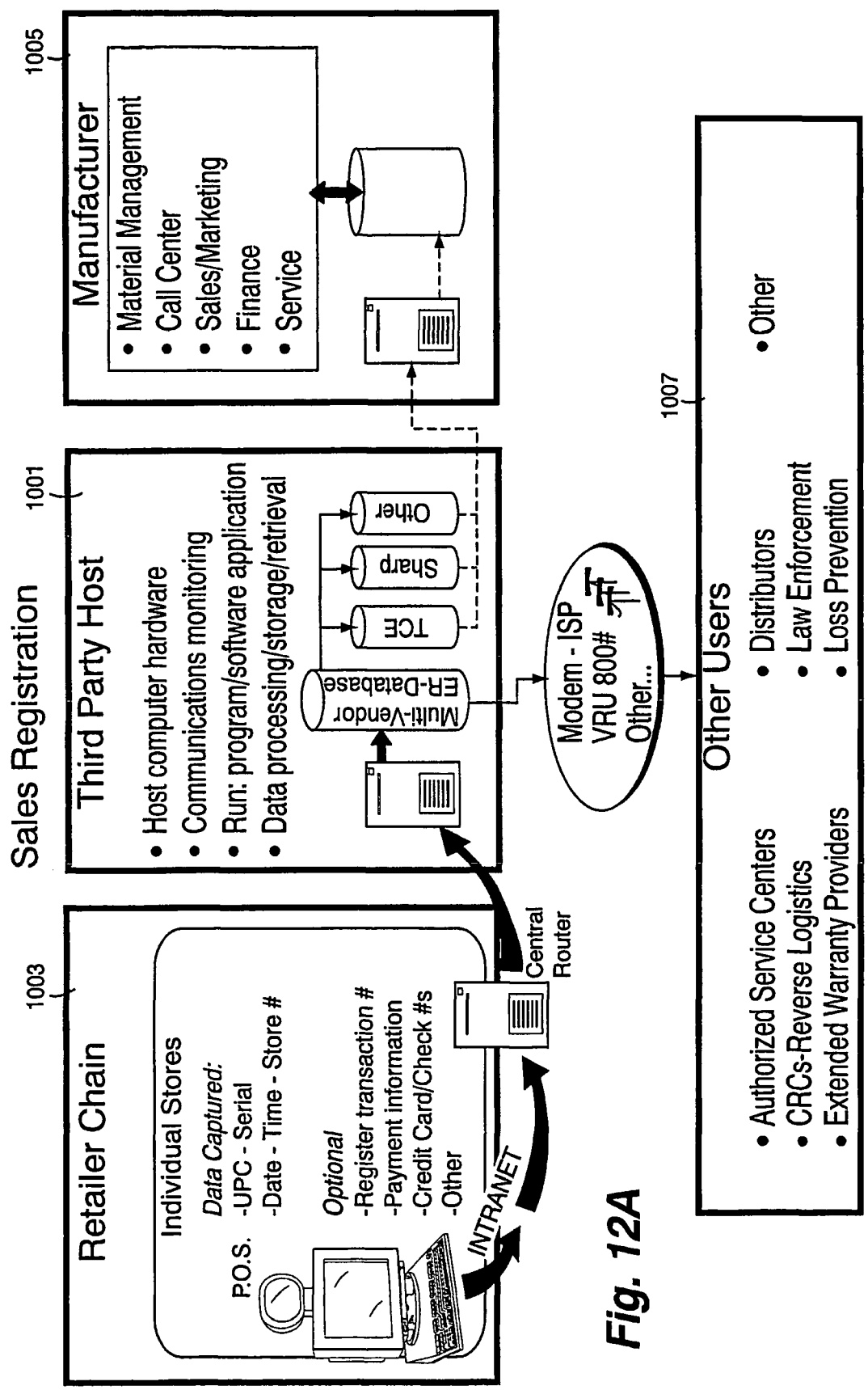
Figure 12B:
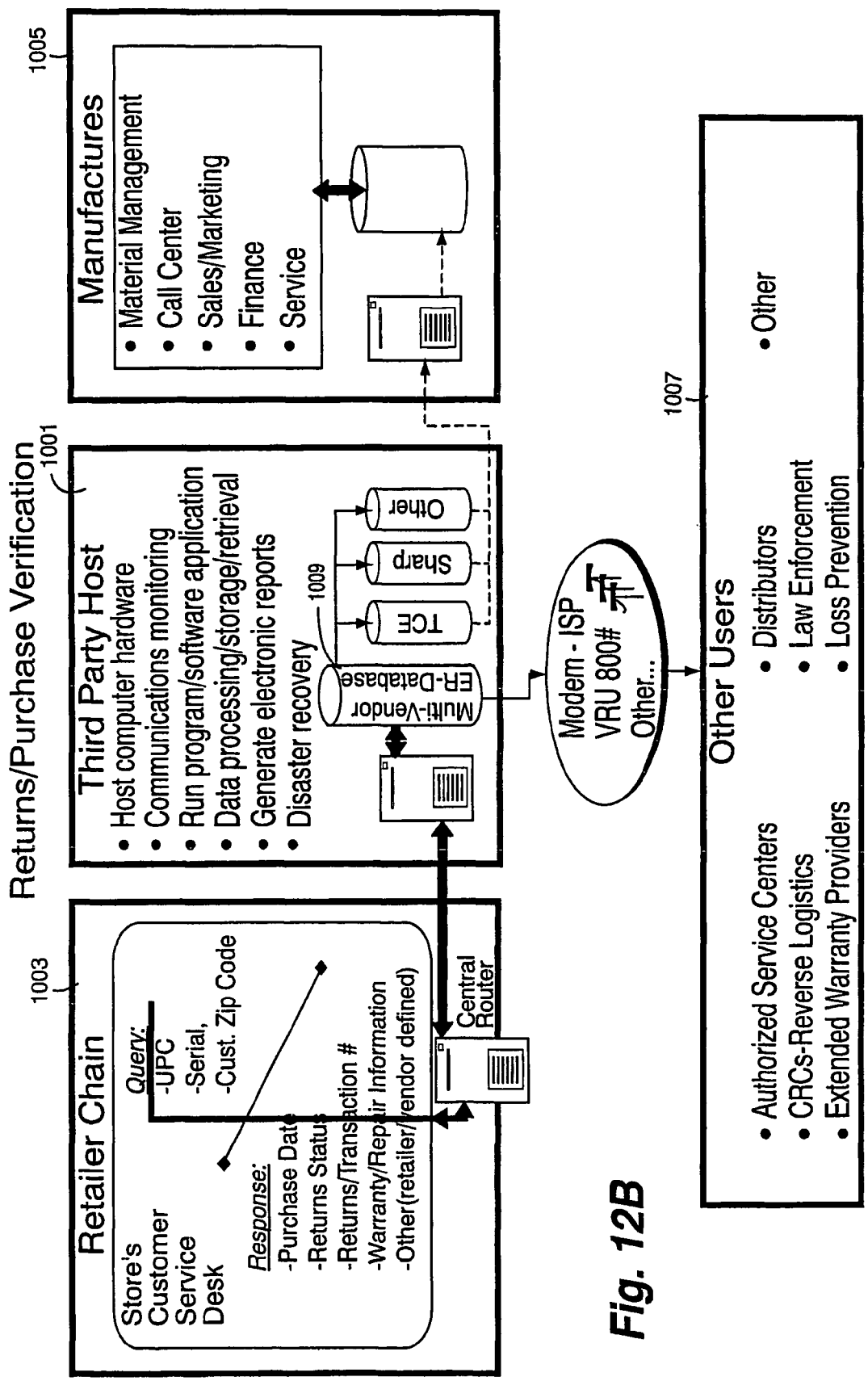

FIG. 12A further illustrates a preferred operation of the system illustrated in FIG. 12 during electronic product registration. FIG. 12B further illustrates a preferred operation of the system illustrated in FIG. 12 during a product return transaction.

Figure 13:
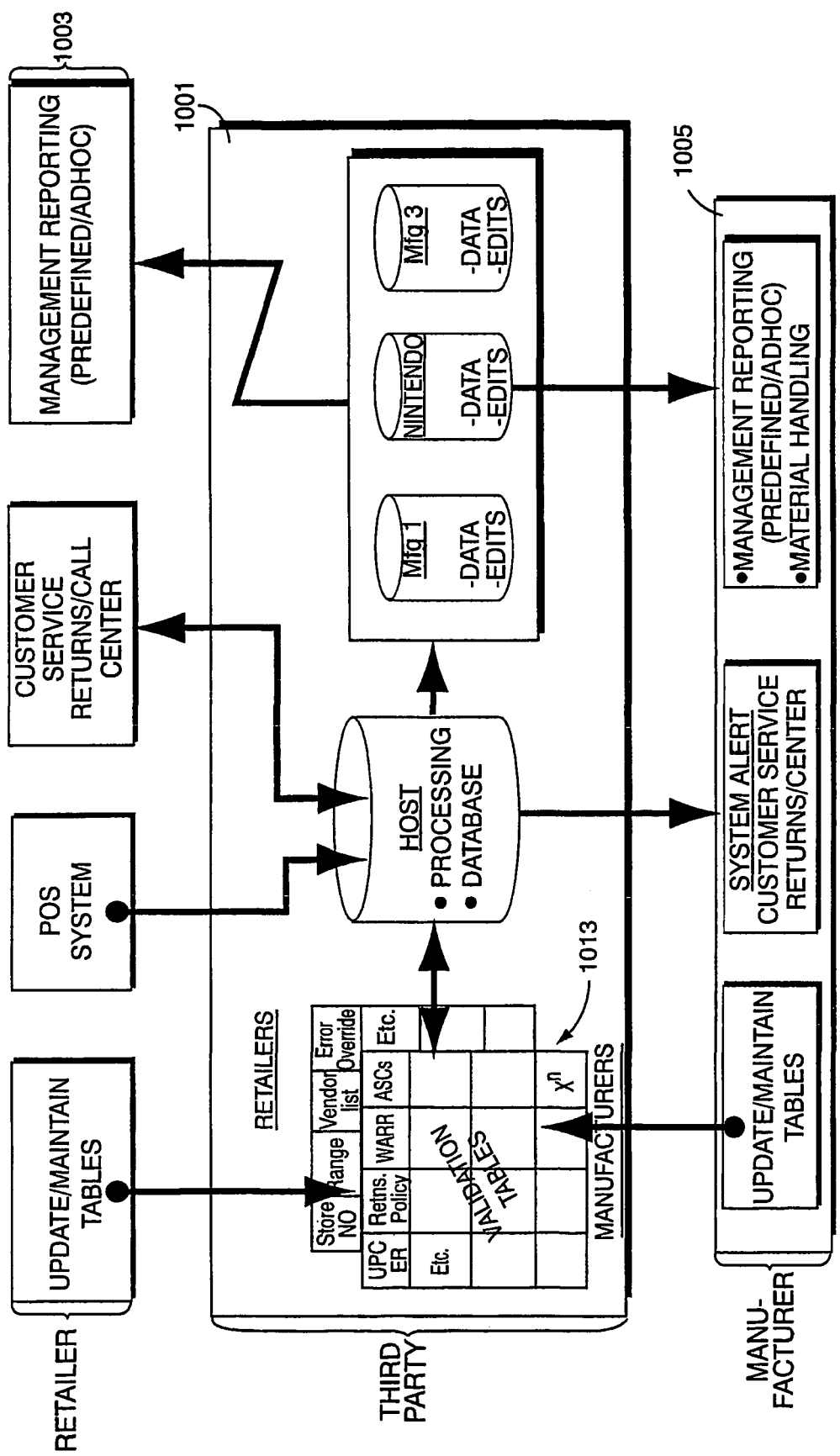
FIG. 13 is a schematic diagram further illustrating the operation of the system of FIG. 12.

Turning now to FIG. 13, the third party service provider system may include retailer and manufacturer validation tables containing specific return policy information. Maintenance of these validation tables is preferably the responsibility of the individual retailer, manufacturer or other party. In other words, the retailers and manufacturers are provided with access to these validation tables so that they may provide and update the applicable return criterias for their products.

In addition, a retailer may access records in separate manufacturer databases at the third party service provider to obtain selected predefined or ad hoc management reporting. For example, a retailer may monitor returns accepted by an individual clerk to determine whether the clerk has an unusually high (and possibly fraudulent) return rate. Of course, the third party service provider should maintain security measures to ensure that the retailer can access only records to which it is entitled access. For example, a retailer would be prevented from running reports on sales by a competitor.

Similarly, the manufacturer may run predefined or ad hoc reports to monitor sales activities. Such reports may be useful, for example, in determining which products are selling well and, therefore, whether production or shipping of these products should be increased. Again, a manufacturer would not be given access to competitors' sales information.

Figure 14:
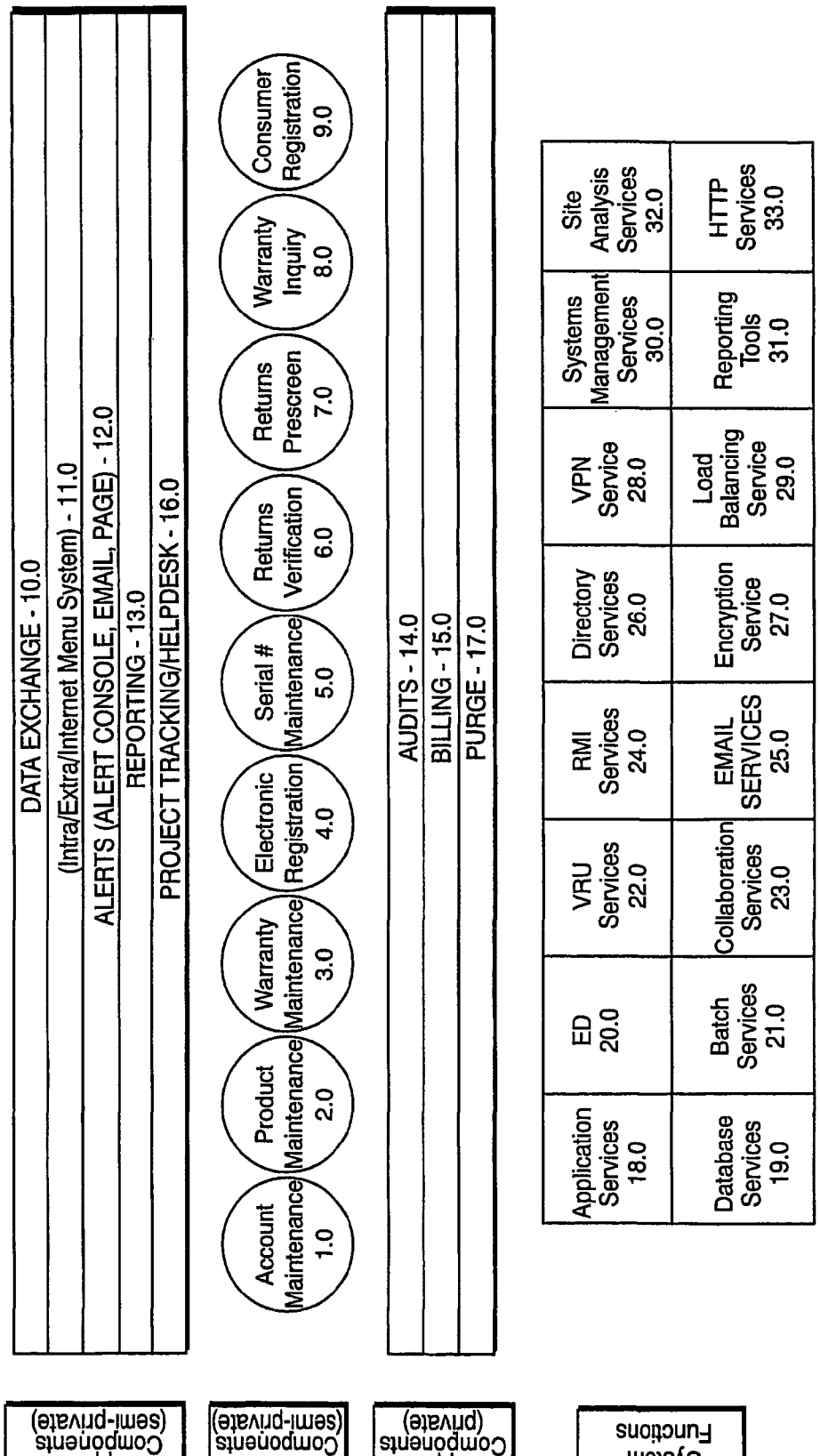
FIG. 14 is an application overview illustrating various components and functions of a preferred implementation of the central registration computer system.

FIG. 14 is an application overview of the components and functions of the central registration computer system. As shown, the central registration computer system may perform a number of system functions. These system functions include application services, database services, electronic data interchange (EDI), batch services, VRU services, collaboration services, RMI/IIOP services, e-mail services, directory services, encryption services, VPN service, load balancing services, systems management services, reporting tools, site analysis services, and HTTP services.

Application services allow the handling of server-side processing on a world wide web server. This is important to meter traffic to the databases. It also allows for fail over if applications are not available. It also allows for session tracking and extra security. Database services handle the storage and retrieval of the central registration computer system data. This can be important for the speed and integrity of data storage and access. It also can allow the synchronization of data across multiple databases and data-centers. EDI is an application that allows the mapping and conversion of data from the central registration computer system database and converts it to the industry standard Electronic Data Interchange (EDI) documents. It also processes EDI documents and will place the results in the database. EDI handles the communications of data to and from value-added-network electronic mail boxes. Batch services support the set of processes that allow the scheduling and logging of jobs that may be run as part of the system. This includes scheduling transfers of data, cleanup processes, database conversions, content updates, alert triggers, audit processes, etc.

VRU services is the set of telephony services that allow the system to implement applications on the database. This can support applications that allow retailers at the point of return to check returns verification status and warranty information. Collaboration services allow accounts and central system personnel to communicate real-time and provides for on-line customer service to help decrease costs, decrease time to handle service requirements, and increase the level of customer satisfaction. RMI service allows for remote execution of transactions between central system applications and its accounts, and can be one of the ways to process data exchange, and execute electronic registration or returns verification transactions. E-mail services can facilitate the processing of e-mail between the central system and the accounts (vendors, retailers, service centers). It can include hosting of e-mail services for those accounts who do not have their own Internet Service Provider (ISP) and can also handle consumer accounts (if needed).

Directory services are the systems services that allow a standard technique for storing, using, and accessing user-centric information. This database can drive the user data for the central system web, e-mail, and collaboration services, and can also serve as the basis of central system security. Encryption services allow the central system to encrypt (secure) data that is transferred over the Internet. This could be important for securing non-private network datafiles. This service also includes management/publishing/serving of the public key associated with the central system. VPN services allow the central system and its retailer accounts to establish a private communications channel on the Internet, and may be implemented at the hardware or software level. It can be very important to maintain security on the Internet, yet allow transactions to perform up to requirements. Load balancing services route transaction traffic to appropriate services, systems, and sites (data center) depending on system availability, performance, and location of the request. This can be important because it allows a transaction to continue if a site or host is down, and ensures that the system is always available.

Systems management services monitor the availability, security, and performance of the central system applications. It also can allow the central system to escalate problems if they are not resolved in a timely manner, and can allow the central system to manage the network and host functions in addition to the data center. Reporting tools allow authorized central system accounts and central system personnel to easily access the database. This will allow ad hoc analysis of data for an account and will allow straightforward deployment of new reports. Site analysis tools allow the central system to analyze its world wide web traffic. This includes the overall amount of traffic to the site or to specific sections of site. It can allow the central system to see where the traffic is coming from and what type of browser is being used. It can also allow the consolidation of log reporting across several hosts. HTTP services is what is typically referred to as a web server. These are the services that allow the central system to handle Internet browser access. It can serve and secure static content and hand off dynamic content requests. It also can allow for intuitive links to FTP services.

The central registration computer system also includes a number of semi-private support components such as data exchange, a communications menu system, alerts, reporting services, and project tracking and user help. Additionally, a number of semi-private core components are provided, including account maintenance, product maintenance, warranty maintenance, electronic registration, serial number maintenance, returns verification, returns prescreening, warranty inquiry and consumer registration. Although these items require authorized access, they may be shared by a number of individual users and are therefore semi-private.

The Account Maintenance core component allows the central system to setup an account for either a retailer or vendor. Account setup covers such areas as contact, relationship and equity, account type, user information and authorities. This preferably includes account profile maintenance to maintain account information for each customer; contact/user maintenance to setup and maintain contacts/users for each account (user default and specific authorities may be assigned here); authority group maintenance to maintain various authority lists which are assigned to various groups or account types; account contract/relationship maintenance to track contracts, equity, correspondence for each account; and retailer location maintenance which allows for the maintenance of each retail store location. The product maintenance component allows the retailer, vendor, and the central system to maintain and distribute product information. Retailer/Vendor UPC maintenance allows maintenance of product information at the UPC level. Kit maintenance cross references to store pre-loaded serial numbers that go together in each "kit" shipped. Product type maintenance allows a vendor to define groupings of their products (e.g., TV, VCR).

The warranty maintenance component allows the vendor to set up return and repair warranty information for each of its products. Policies can be set up at the product or product type levels. Warranty maintenance sets up and maintains return and repair warranties. Reason code maintenance maintains codes by product type to indicate the reason a product is returned. The electronic registration component allows the central system to collect product registration data from the retailer. This may include several interfaces to collect this data-EDI to support legacy implementation, and a real-time interface to support ongoing implementations. Registration transmission is a request from a retailer to the central system to register a product as sold. A registration transmission processor is a processing program at the central system that contains all the edits necessary to process the incoming registration transmission and send back the confirmation transmission when appropriate. An internal registration audit may provide an on-line interface which will display transmission errors that need to be reviewed and fixed before registration is accepted. A registration confirmation may be transmitted from the central system back to retailer to confirm that the registration was received. A pre-sell product registration may be used to register a product that is sold through catalog sales, or to indicate product as sold to a particular retailer for establishing special return policies.

The serial number maintenance component can be used to maintain and view serial number registration information (returns and warranty expiration dates). It can also be used to maintain exceptional situations such as an indication that the serial number was stolen. On-line serial number maintenance may be used to allow an account to view and/or update (depending on authorization) specific information about a registered serial number. Stolen serial number maintenance allows an account to update a specific serial number as stolen. Serial number manual registration allows for registration (pre-sell and POS) of a range of serial numbers without scanning or other electronic interface. Serial number history allows for the inquiry of all activity against a specific serial number. The returns verification component provides the retailer or return center with the ability to verify that a product is eligible for return. A confirmation will be transmitted back which contains a return authorization code or message, return-by date, and repair warranty information if requested. A return verification request may go from a retailer or return center to the central system. A return verification processor may be used to edit and process the data sent in and to send confirmation data back. A return eligibility confirmation can be transmitted from the central system back to the retailer to verify the product is eligible for return.

The returns prescreen component permits verification of whether or not a product is returnable to the vendor just prior to shipping. This system may be required to ensure that the product being sent back to the vendor will qualify for credit when it reaches the vendor. This is particularly important for those retailers who use returns centers to consolidate returns. The warranty inquiry component allows an authorized service center to access information regarding a product's repair warranty. Access to this information is preferably through a web interface or through the VRU. A product warranty inquiry allows access to a product's repair warranty information. The consumer post-sale registration component gives consumers the ability to register a product against the central system account. This will allow consumers to have a record at the central system of the serialized products they have purchased. Also it will allow law enforcement agents a means to contact the purchasing consumer for stolen products. This component includes consumer account setup, consumer serial number registration, law agent access, and provision of a consumer web site.

With regard to the semi-private support components, the data exchange component allows for the exchange of data between the central system and the accounts (vendors or retailers). Data exchange key maintenance maintains multiple user id/password combinations to support different ways of communicating with the account. For each account, data exchange subscription maintenance maintains which types of data will be sent to their systems using the data exchange mechanism. Startup services are the processes used to support the initial loading of the account's data into the central system database. Vendor/Retailer data exchange are the processes that set up and control the exchange of data with accounts. Product maintenance push will allow the movement of the product file information to the retailer with little development on the retailer's part. This will include only information needed to drive POS terminals for each retailer. The data exchange file generator are the programs that generate the different types of files that contain the different types of data. The Internet menu system component is what an individual user (central system employees, accounts, and consumers) will see when they log onto the system. It will be used by the central system personnel (intranet) and the vendors, retailers, and service centers (extranet) that have access to the central system. Account application maintenance defines which applications will appear on each account's "menu" based on user access rights. Application billing structure maintenance defines the pricing structure associated with a particular application/account combination.

The alerts messaging component provides a facility to send alert messages generated from various processes throughout the system. Alert maintenance is a process to set up the type of alerts an account would like to receive. An alert processor may be provided to process and send the alerts. The reporting component provides the account with various standard reports for tracking electronic registrations and return verification data. For example, an electronic registration summary report can be provided to summarize all registration information. An abuse audit report can be used to identify patterns of abuse based on warranty setup. A returns reconciliation report can show the history of registrations including any return request activity. A returns to registration audit report can show percentage of returns compared with registrations. A returns verification request summary report can show total return verification requests by return code. The project tracking/help desk component provides information exchange between the account and the central system regarding new account setup, bug fixes, and other pertinent information. Information exchange/project tracking can provide an ability to track projects and problems, and to exchange other information with the account. Time tracking can provide the ability to track time against projects such as custom reports and other enhancements specific to an account. A help desk facility could incorporate the problem tracking portion of the information exchange.

Private support components include audit maintenance, billing system interface, and purge setup/processing. The audit maintenance component can provide various audits on activity against the central system database. These audits can be used internally by the central system for tracking an account's usage of the system. An audit activity log can track specific types of activity against the serial number database. The billing system interface component provides processes for approving the billing of accounts for the central system services. The actual invoicing and fund collection may be provided by a standard accounts receivable software package. Billing structure maintenance may provide information on how each account will be billed. Billing approval can provide an interface for approval of the billing before actual invoicing. Finally, the purge setup/processing component includes the processes and supporting information that will allow the central system to purge appropriate data from the system. Purge processing may summarize transactional data, save to other media (tape, CD, optical), and purge data based on time defaults set at the account level.

Figure 16A:
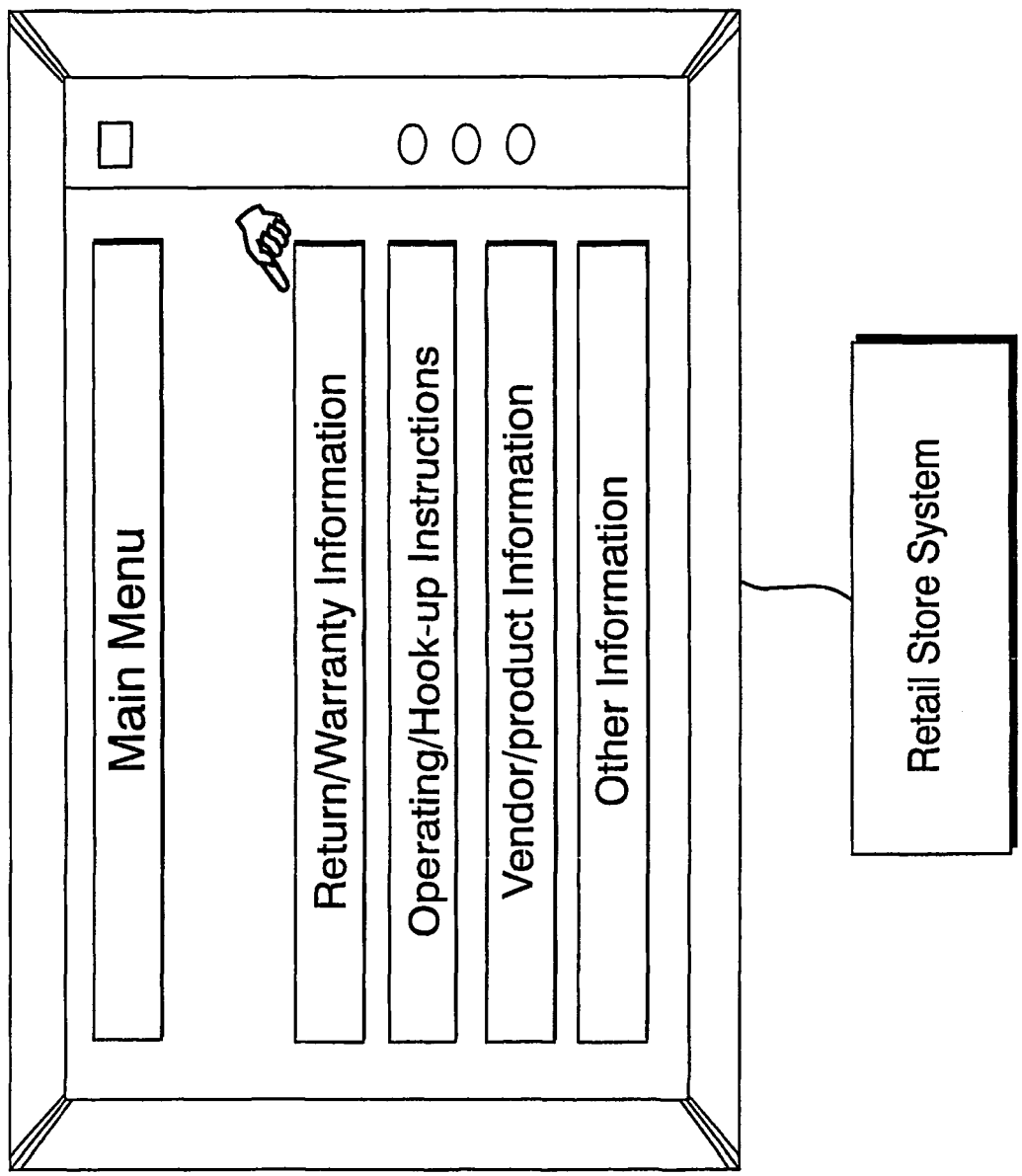
Figure 16B:
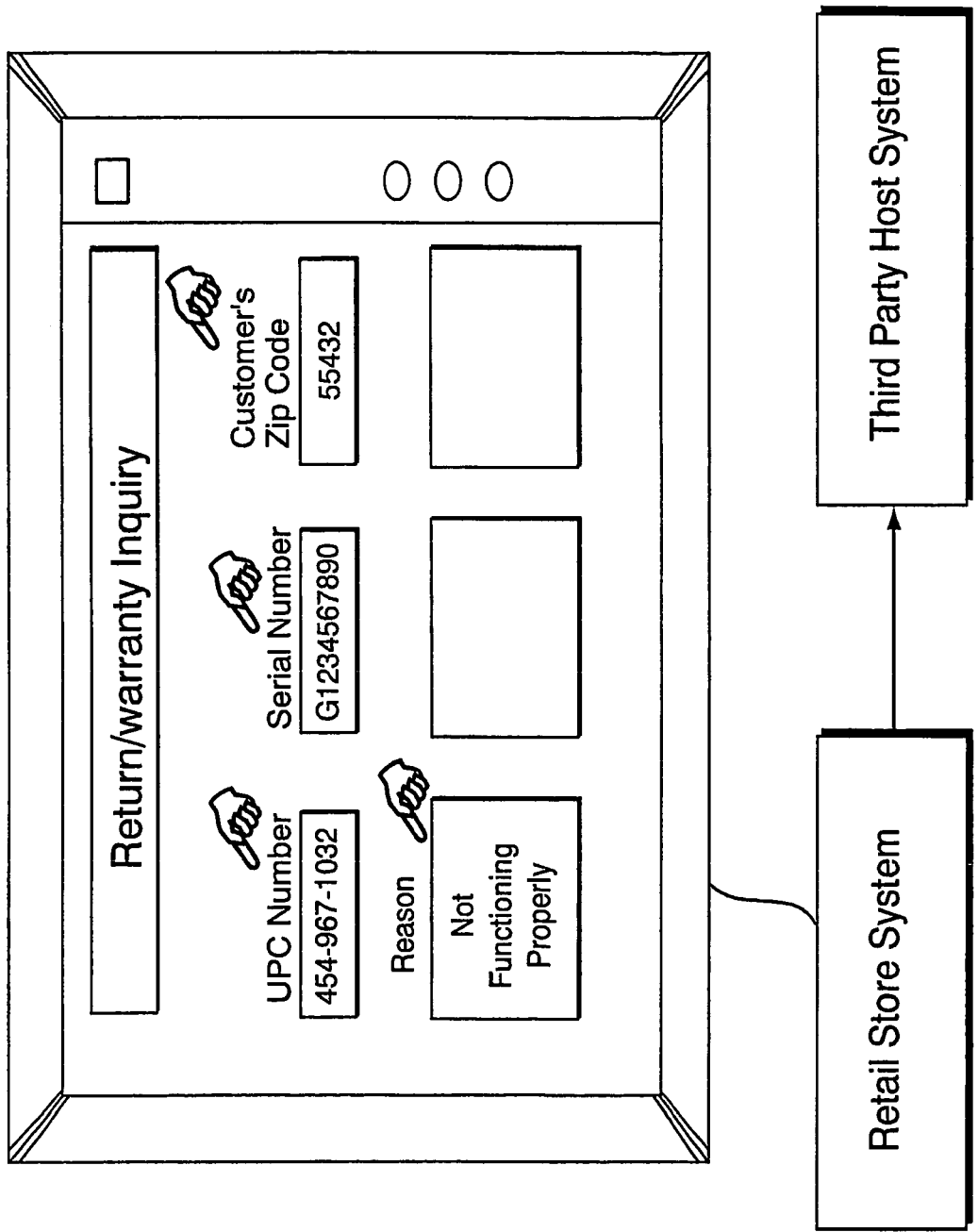

Turning now to FIGS. 16A through 16G, a user at a retail store may access the central registration computer system to make a customer service request. Upon access, a main menu is displayed which provides the user with options to request return/warranty information, operating/hook-up instructions, vendor/product information, or other information. FIGS. 16A through 16B illustrate a series of interactive customer interface screens that may be displayed upon selection of return/warranty information.

As illustrated in FIG. 16B, the user may, for example, be prompted to input the product UPC number, the product serial number and the customer's zip code. This information is then transmitted to the third party host system of the centralized database to be used in accessing the pertinent database record. The user may also be requested to input a reason for the return/warranty inquiry.

Figure 16C:
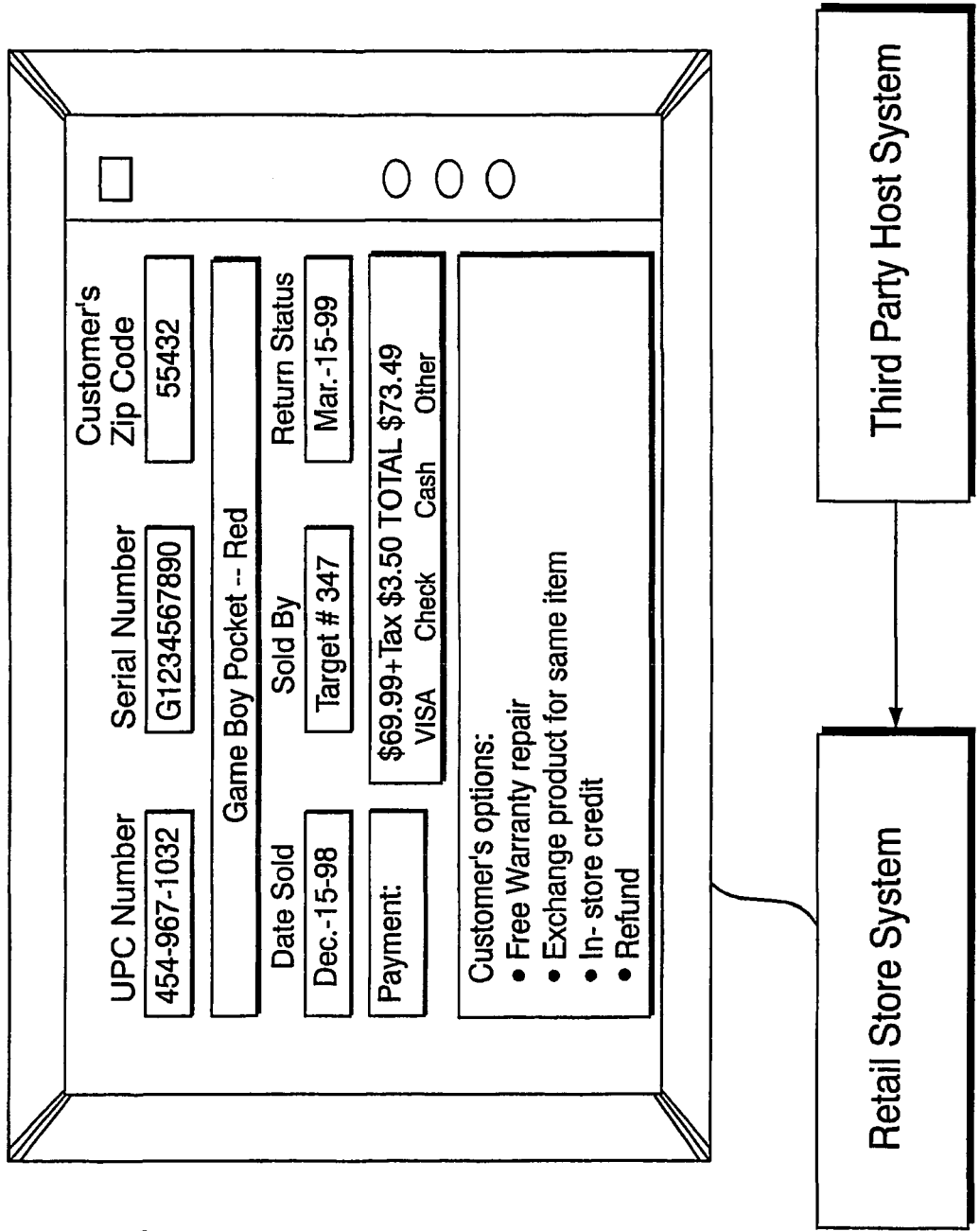
Figure 16D:
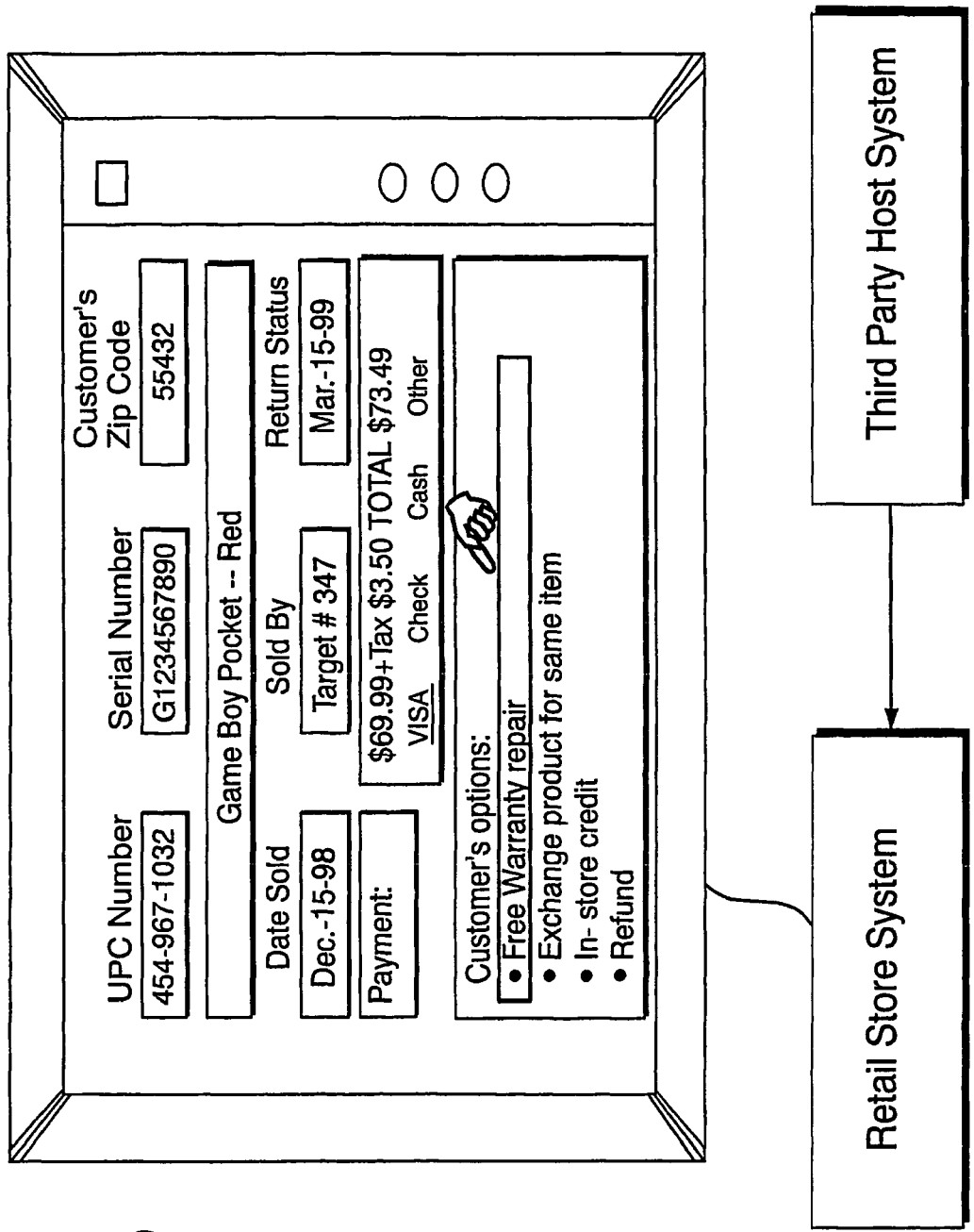
Figure 16E:
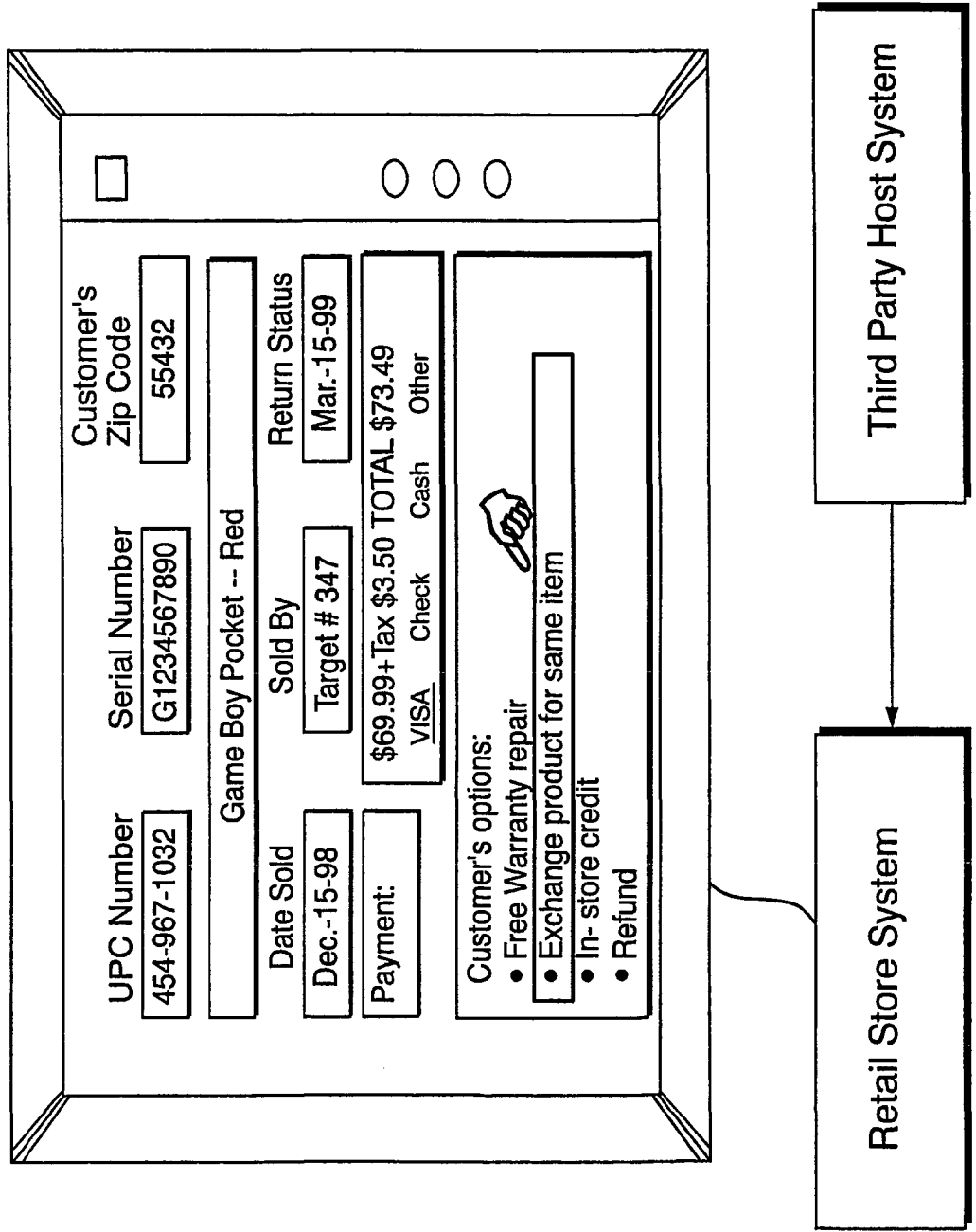
Figure 16F:
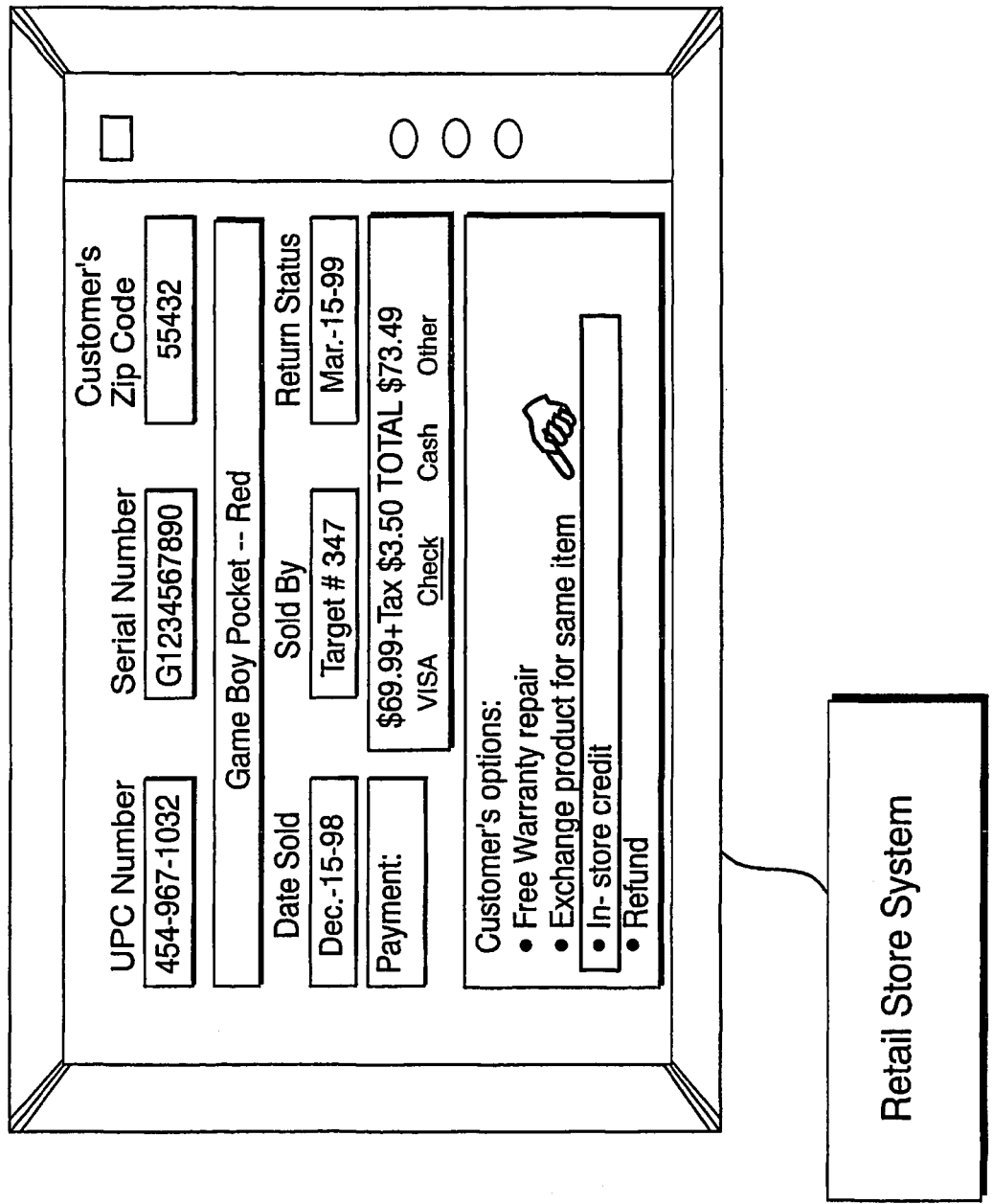

FIG. 16C shows information that may be returned to the retailer by the third party host system. In particular, the host system may return additional details concerning the original transaction as well as a list of customer options. The list of customer options may be determined by the host system in light of the applicable retailer and/or manufacturer warranty information included within the validation tables 1013 (see FIG. 13).

Turning now to FIGS. 16D through 16G, the retailer selects the option chosen by the customer by clicking on the appropriate choice. The host system then returns pertinent information relevant to the selected option. For example, if free warranty repair is selected, a list of local authorized repair shops may be listed. This list may be printed and provided to the customer by the retailer store. If the customer selects a product exchange, the retailer may be prompted to enter the serial number of the replacement product so that the central registration database may be updated accordingly. Similarly, the host system will update the registration database to reflect a return for in-store credit or refund.

Customer problems with products often are not the result of defects in the product, but rather may simply be the result of a lack of knowledge by the customer on the proper operation or hook-up of the product. Accordingly, the retailer may request information from the host system to assist the customer in the proper operation or hookup of the product. Such information is preferably stored in an appropriate host system database. For example, a manufacturer may download instructions into the database for this purpose. The manufacturer ideally bears the responsibility of ensuring the information is kept current. As an alternative, the host system may access a manufacturer database to obtain this information when requested.

Figure 17A:
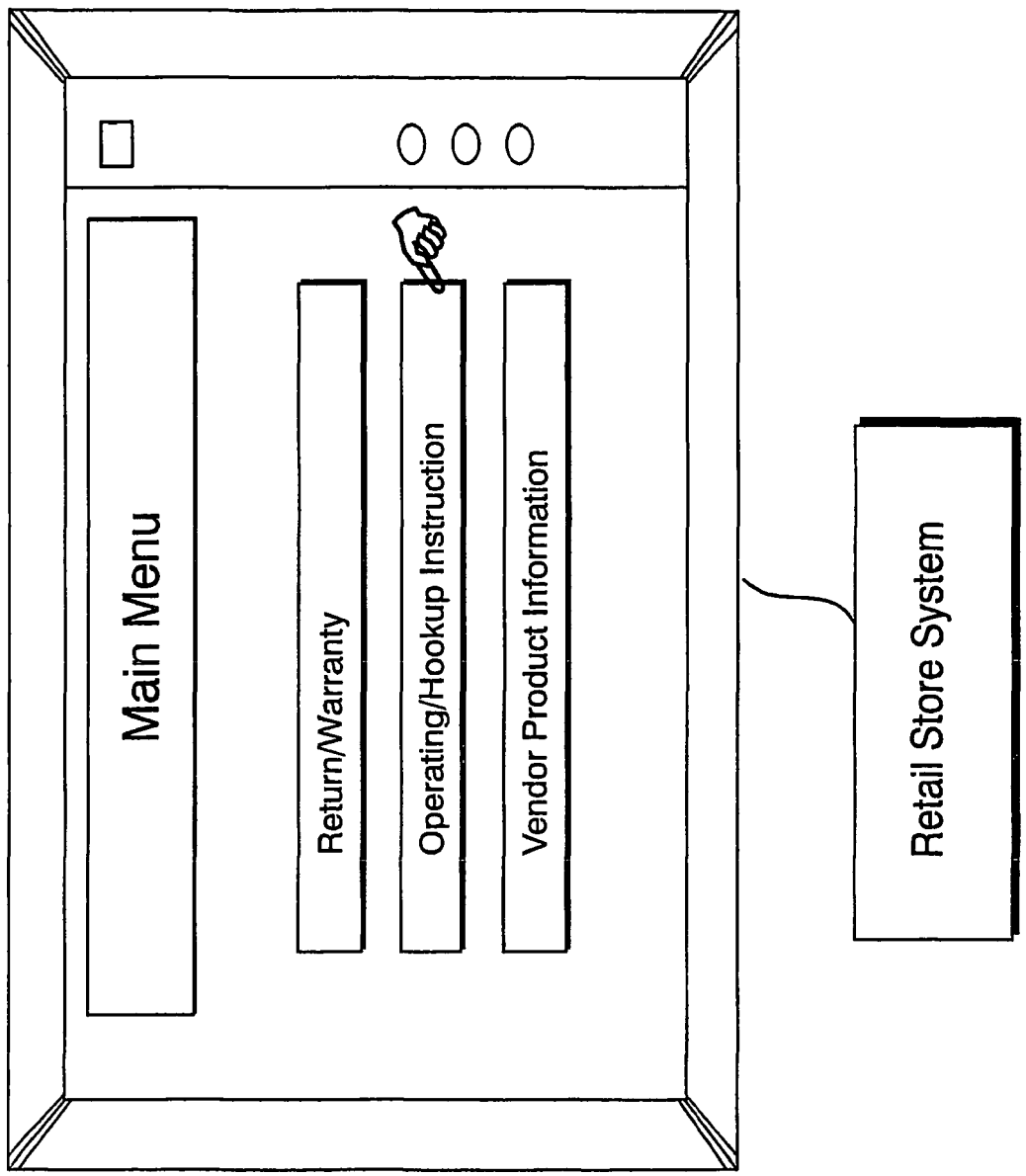
Figure 17B:
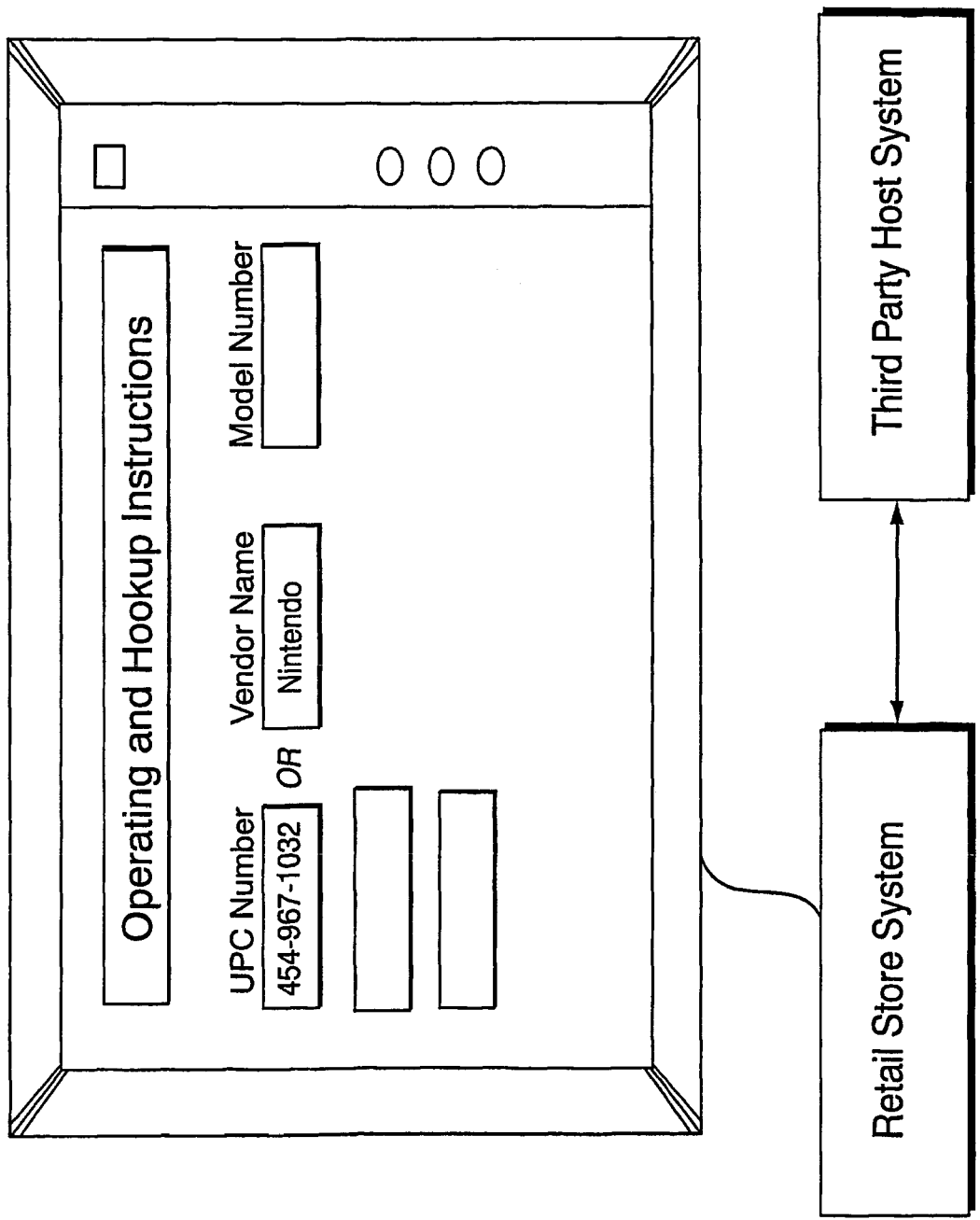
Figure 17C:
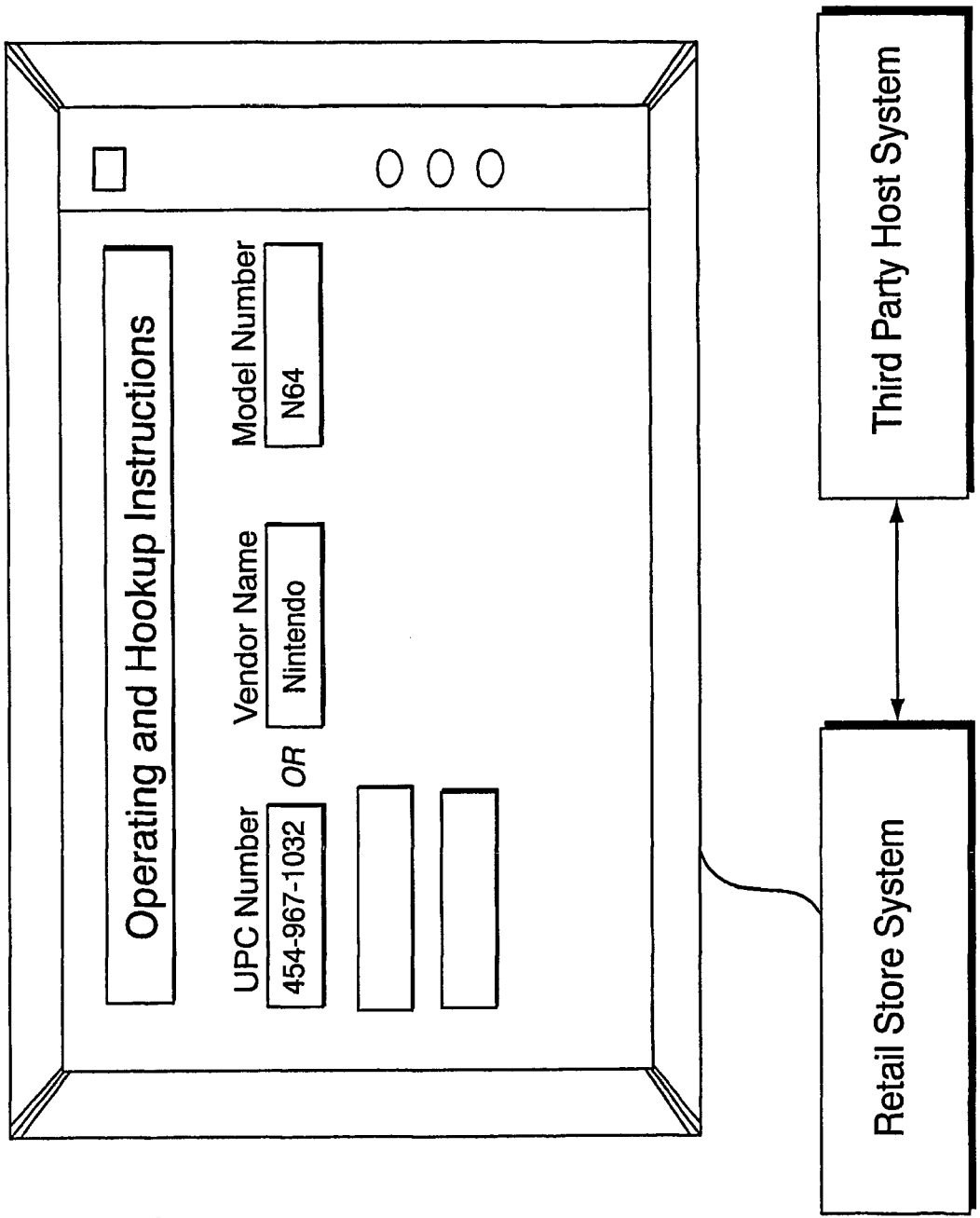
Figure 17D:
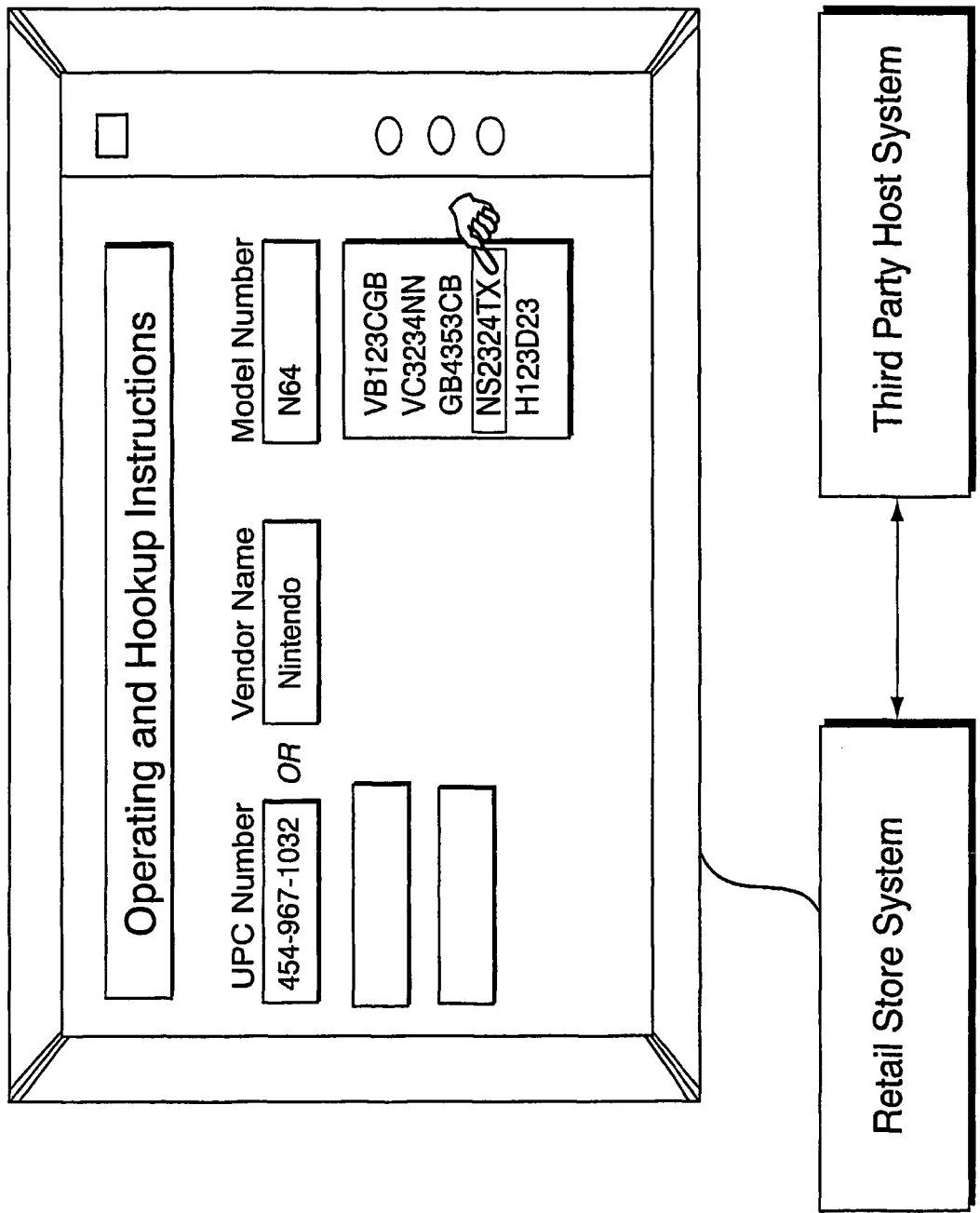

FIGS. 17A through 17H illustrate interactive user interface display screens that may be utilized when a customer chooses to obtain operating/hookup instructions. As shown in FIG. 17B, the user is prompted to enter the UPC number or the vendor name and model number. If the vendor name/model number option is used, the host system may be programmed to recognize the vendor name based upon the first few characters. For example, once a user enters "NINT", the system may recognize the vendor as NINTENDO, as illustrated in FIG. 17C. Once the vendor name is recognized or completely input, a pull down menu of possible model numbers may be provided for user selection, as shown in FIG. 17D.

Figure 17E:
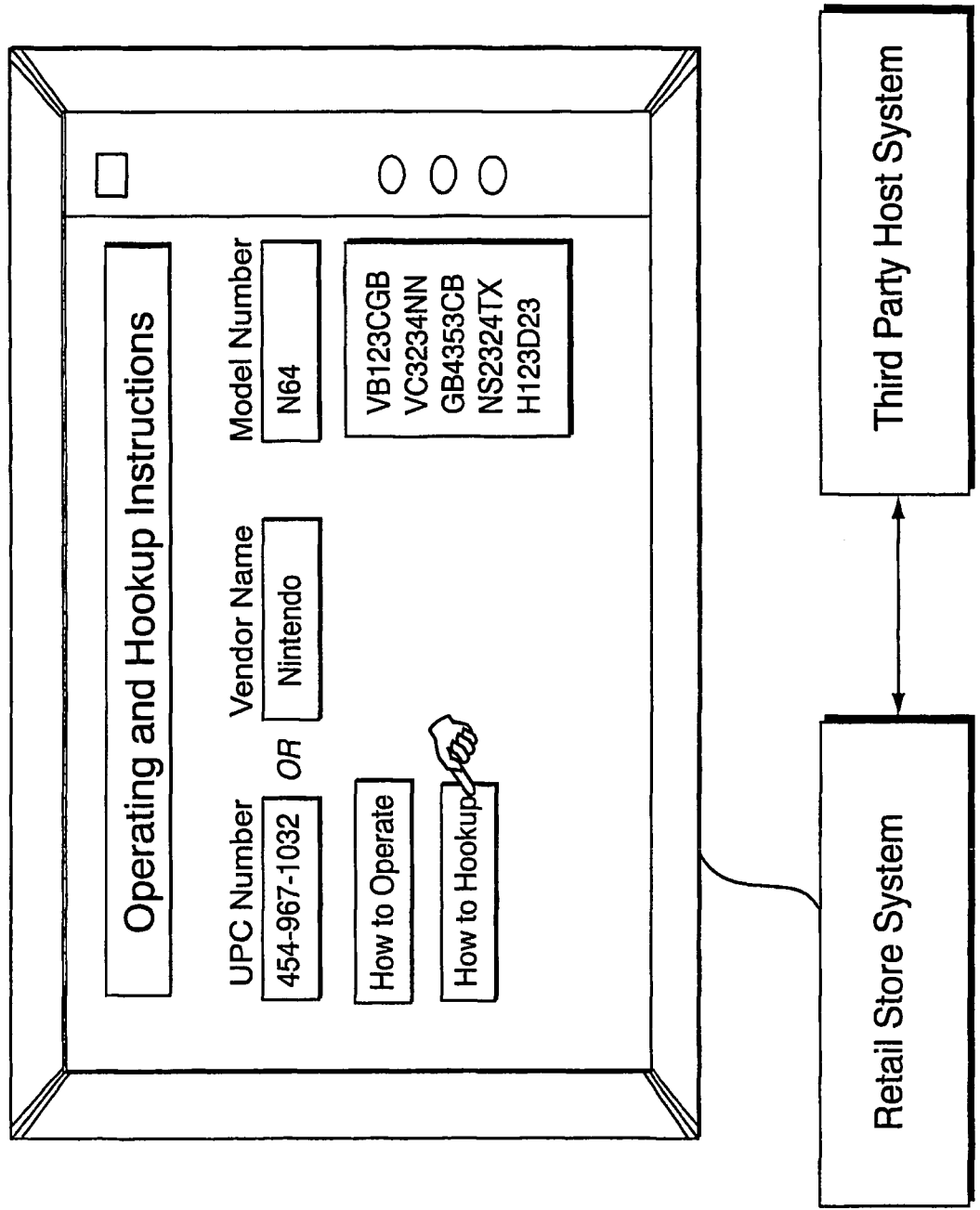
Figure 17G:
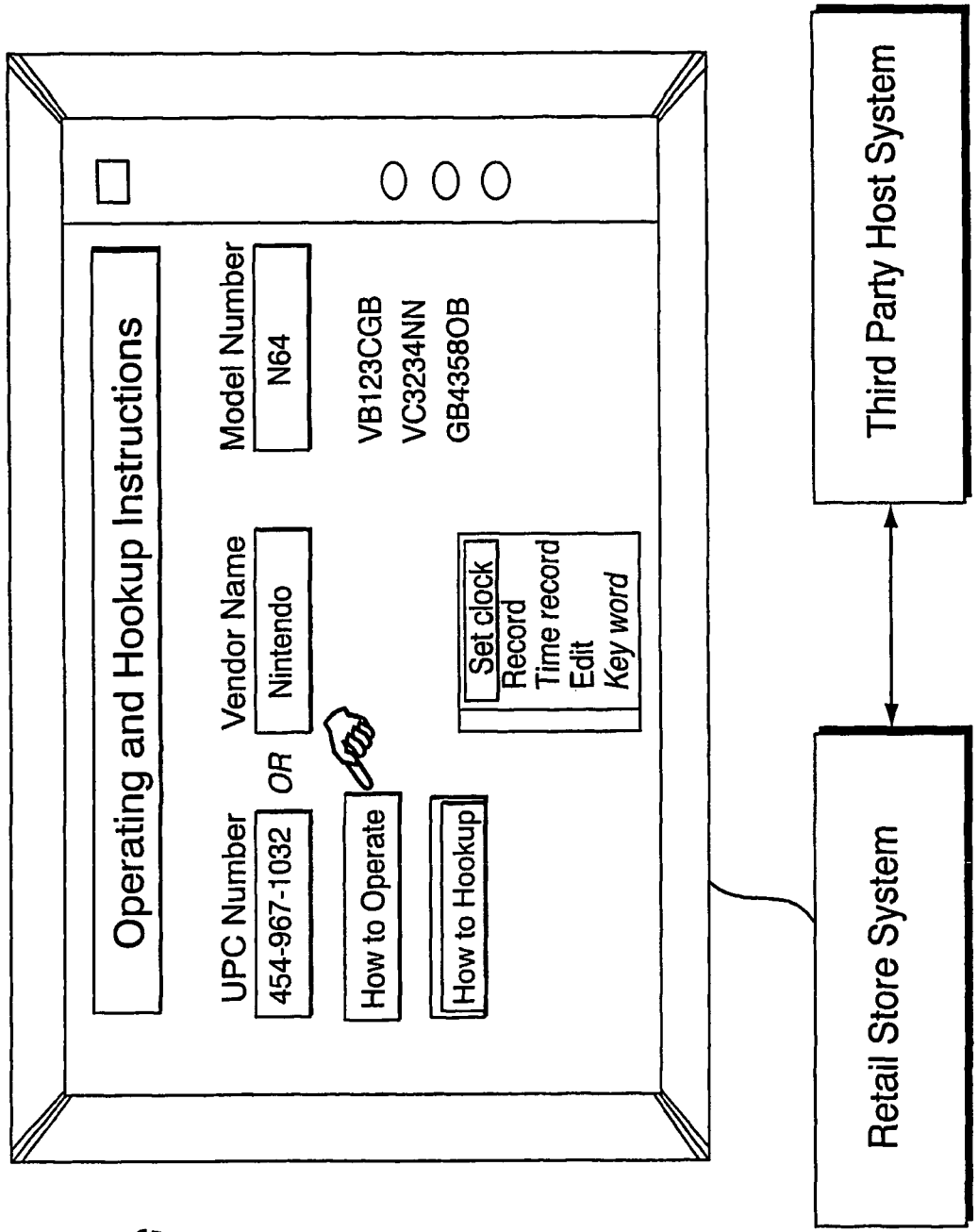

Referring to FIG. 17E, the user is then prompted to select information on either the operation or proper hook-up of the product. In this example, the user selects hook-up information. The host system then displays appropriate hook-up information (FIG. 17F), which may be printed for the customer. Similarly, FIGS. 17G and 17H illustrate the interactive screen displays if operation instructions are requested. As shown in FIG. 17G, the user may be prompted to enter additional information concerning the particular operation of interest, for example, how to set the clock, how to record, how to edit, etc. Again, the appropriate information concerning the customer inquiry then may be displayed and printed.

Figure 18B:
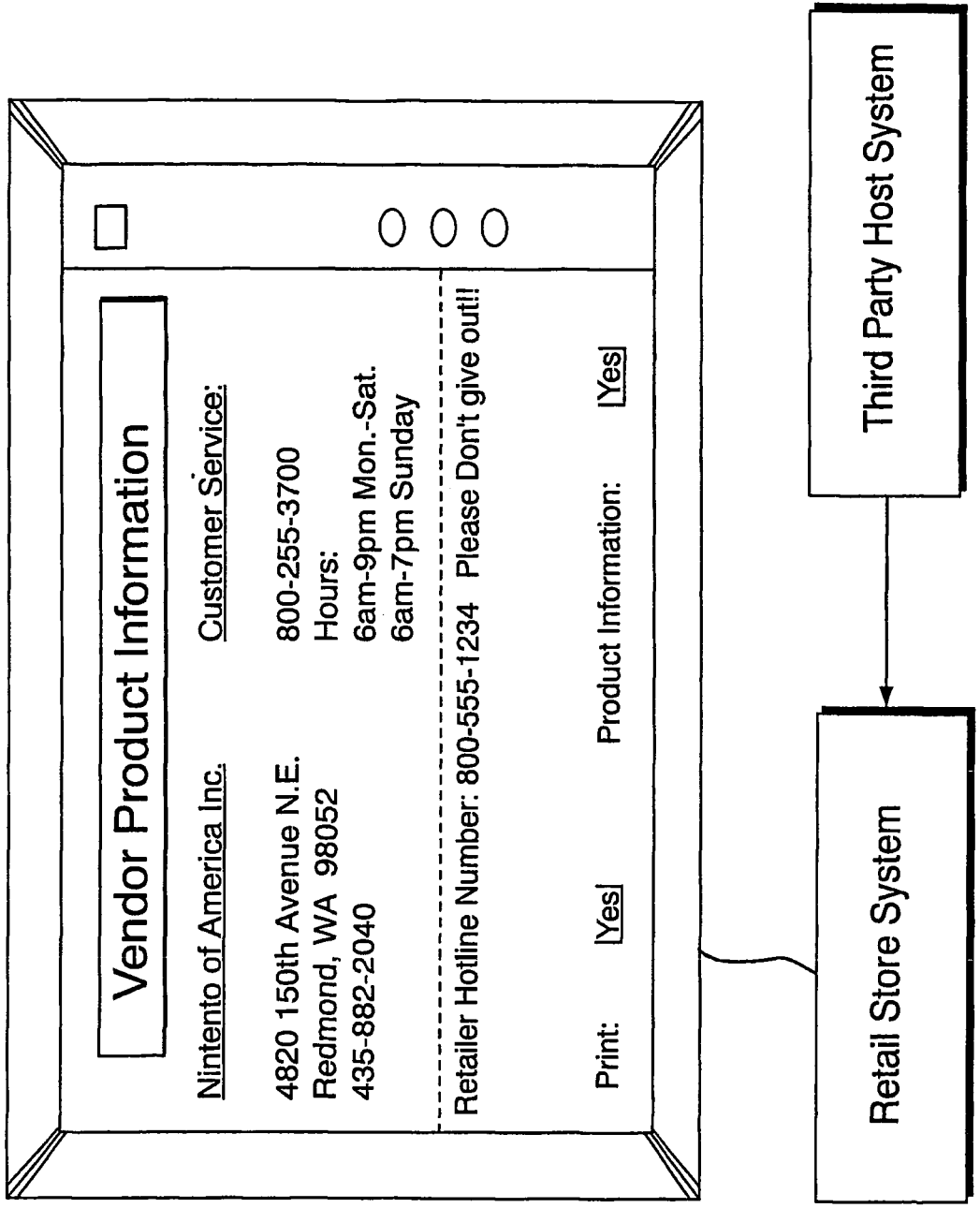
Figure 18C:
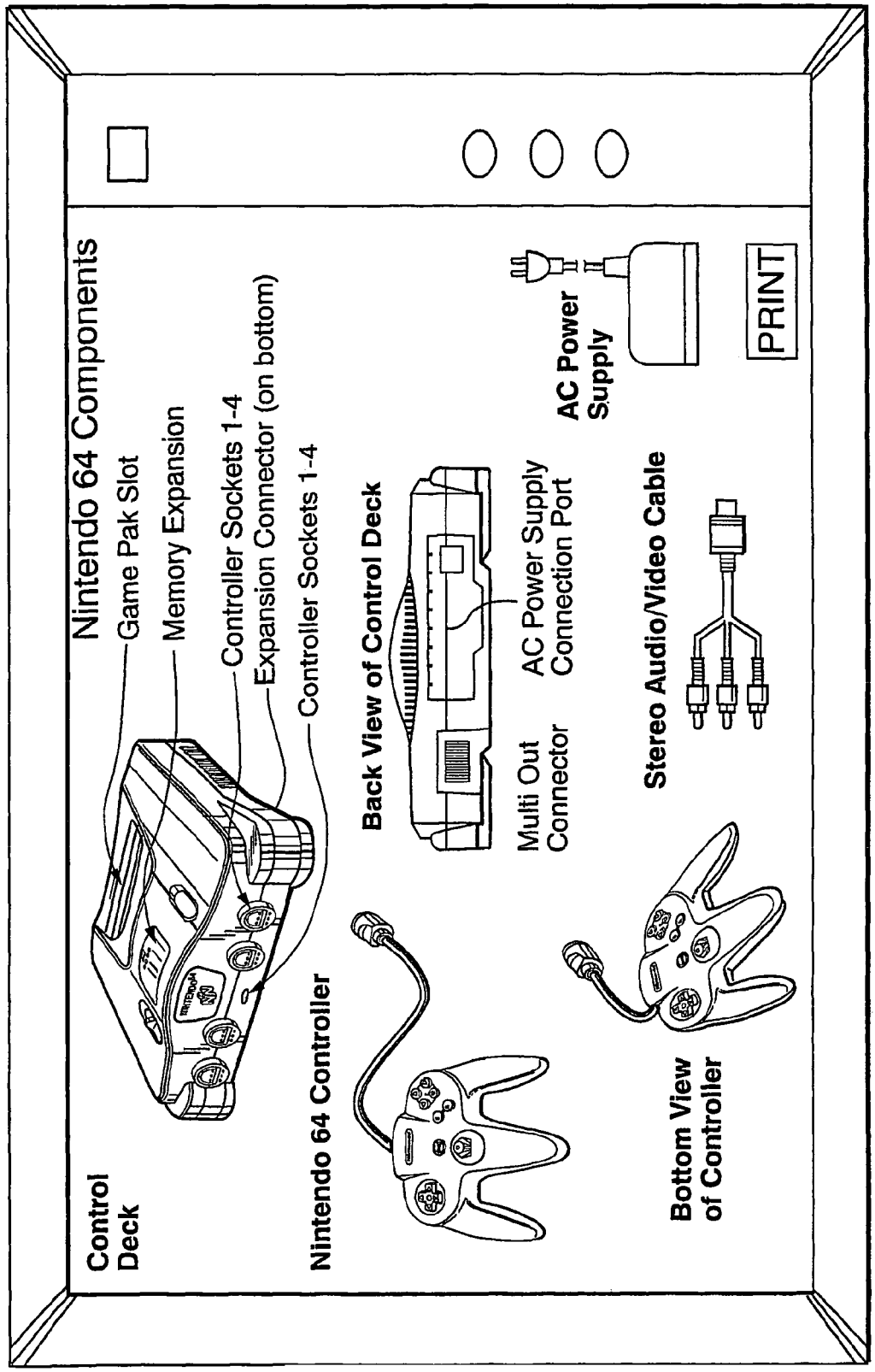
Figure 18D:
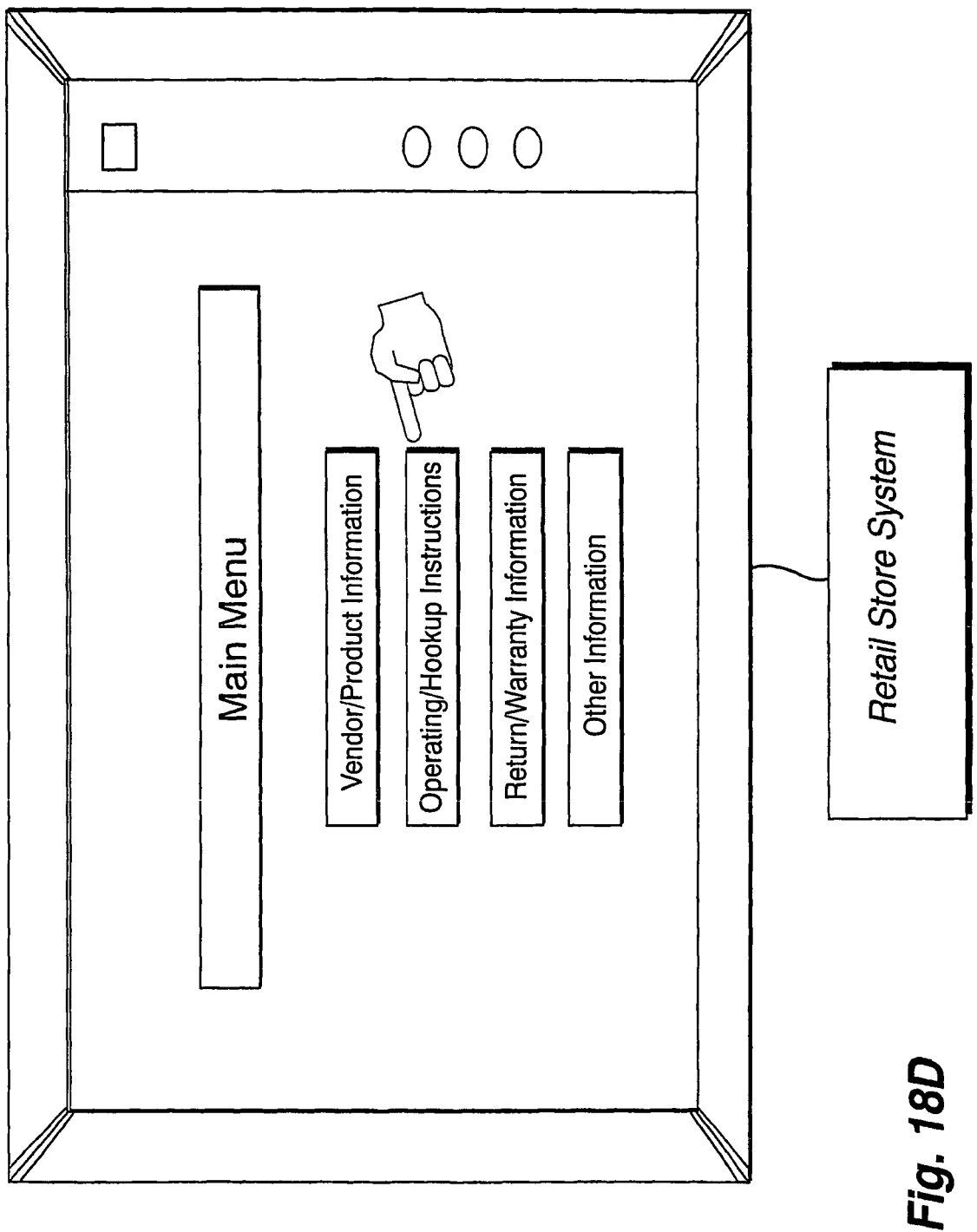
Figure 18E:
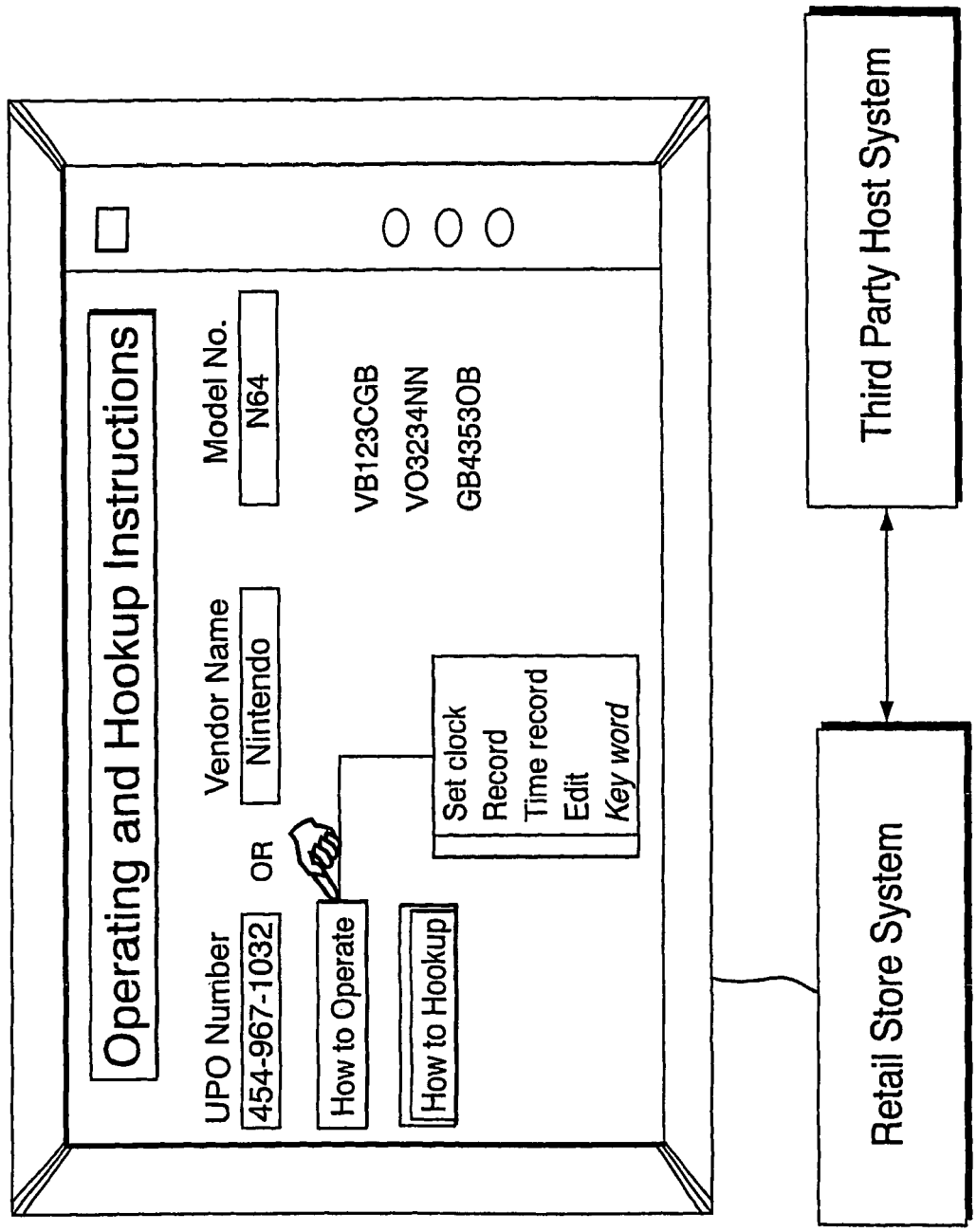
Figure 18F:
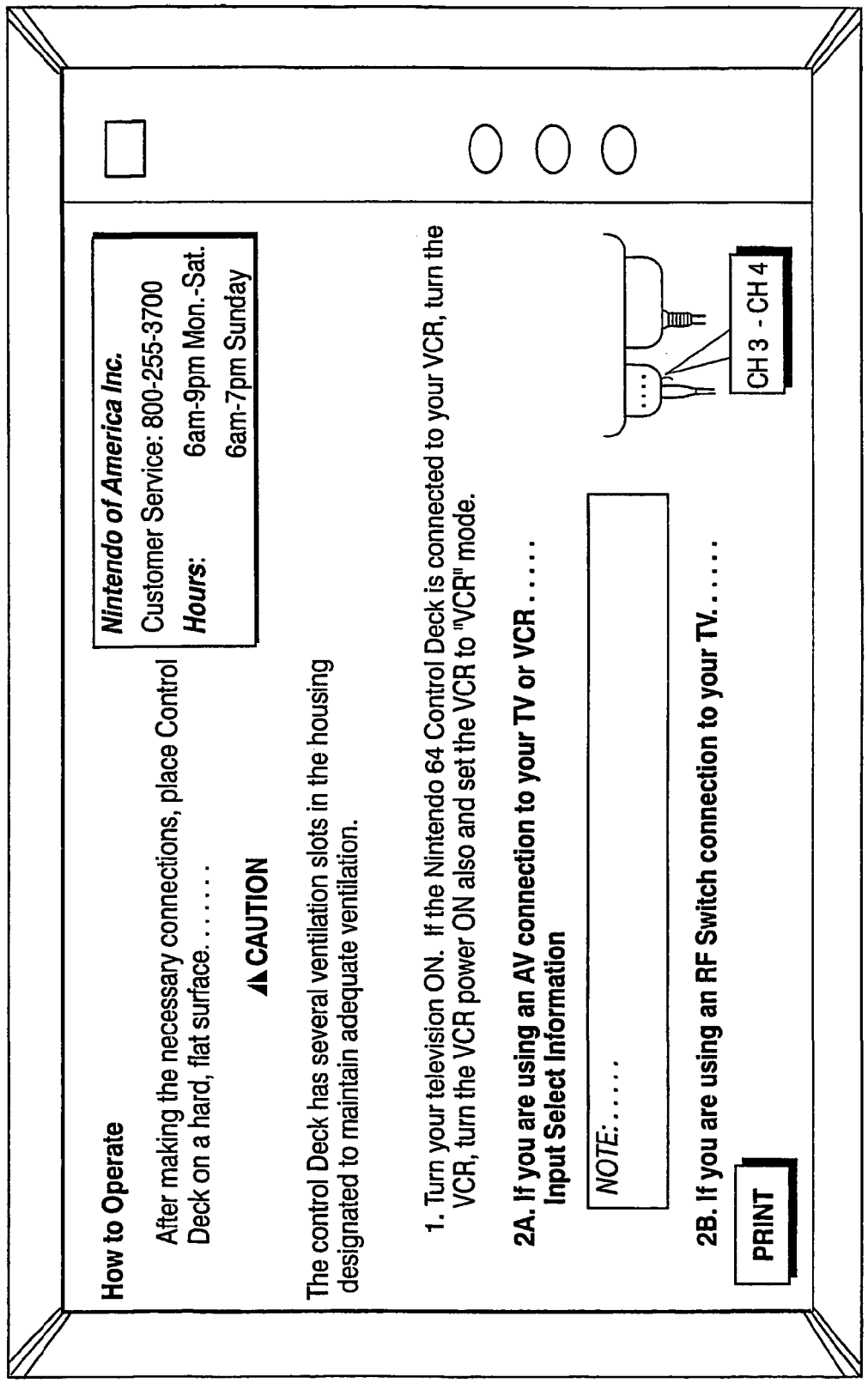

FIGS. 18A through 18F show interactive screens that may be displayed when the user selects vendor/product information. The user would again be prompted to enter sufficient information for the host system to determine which records to access, as described above in connection with FIGS. 17B through 17D. Pertinent information concerning the vendor (FIG. 18B) or the product (FIG. 18C) may then be displayed. This vendor information may be useful to the retailer, for example, to contact the manufacturer with questions or to provide the customer with a manufacturer customer service phone number. The product information may be used, for example, to verify what components were sold with the products so that the retailer can verify the return of all major components. If desired, the retailer may also return to the main menu to obtain further information concerning proper hook-up or operation of the product, as illustrated in FIGS. 18D through 18F.

Figure 19:
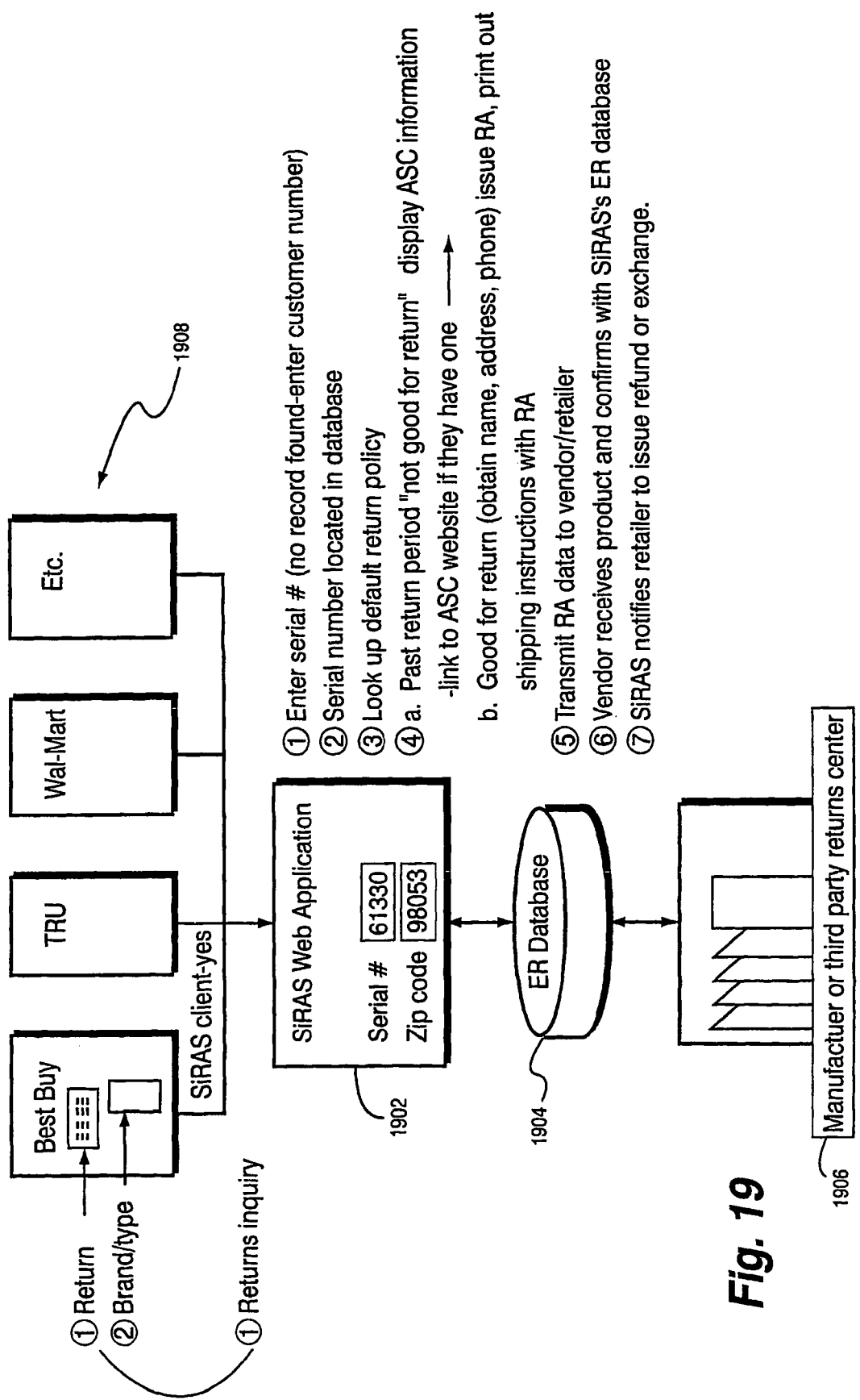
FIG. 19 is an overview of the main components of the Web site embodiment of the invention, wherein the customer accesses the transaction information and obtains a return authorization.

Referring now to FIG. 19, in accordance with an important aspect of the present invention, a return authorization engine is provided for use directly by customers or purchasers of products. While this feature of the invention is particularly advantageous when used in connection with the return of products purchased on-line from e-tailers, it may also be used to enable consumers to initiate their own returns from products purchased from conventional retail locations as well.

In a preferred embodiment, a Web site is provided which can be accessed by the customer via an Internet connection or the like. FIG. 19 shows an overview of the main components and flow of this aspect of the invention. The customer accesses the web site 1902 and enters information related to the return, such as a serial number of the product to be returned. The Web site can request any suitable information to be entered by the customer, such as name, address, place of purchase, date of purchase etc. However, if the product is a serialized product (i.e. a product that has been previously registered in the transaction database (electronic registration (ER)) in the manner described above, then all that is needed is the serial number in order to provide the customer with information on return qualification and return procedures. The serial number is then used to access the ER database to determine if the product qualifies for return based on the applicable return criteria. If the product does qualify for return, the customer is given a return authorization (RA) number and return instructions. The RA and return instructions can be printed at the customer's computer used to access the Web site. The return instructions preferably include shipping instructions indicating where and how the product should be shipped for the return. The system may also tell the customer who to expect a refund or exchange from and how long it will take.

Once the vendor or other designated party receives the product at the return center 1906, the vendor would then provide a confirmation to the ER database system 1904 that the product has been returned. The database system 1904 would then notify the e-tailer or any other appropriate party involved in the transaction to issue a refund to the customer or provide an exchange depending on the particular circumstances of the particular transaction involved.

The above described embodiment provides numerous benefits. First, the customer is able to generate his/her own return authorization (RA), which saves the e-tailer, retailer or manufacturer from having to be involved in this process. In other words, the invention automates the return process thereby eliminating the need to provide, for example, call centers for returns. In addition, the product can be shipped directly to the manufacturer, thereby avoiding shipping and handling expenses for the retailer and delays by a third party service provider. The customer may also continuously track the return process on the Web site 1902 (e.g. RA received, product received by the manufacturer, check in process; check sent, etc.).

In accordance with a preferred embodiment of the invention, the Web site 1902 is linked directly to a shipper, such as UPS, FedEx or U.S. mail, to request a pickup for return or service of the product from the customer, thereby further automating the return process and further simplifying the return procedure for the consumer. The system also includes flexible default return policies (as described above) that can be defined and updated by retailers, e-tailers and/or manufacturers.

If the ER database determines that the product is not eligible for return the customer will be advised of this fact and preferably be given information about repair facilities that may be able to repair the product if desired and/or operating or hook-up instructions. The information that may be provided to the user is similar that that described above with respect to FIGS. 16A-18F. In other words, this embodiment is similar to the in-store embodiment described above, except that the customer does not go to a store for the return. Thus, the description and exemplary screens discussed above regarding the physical retail embodiment are equally applicable to the direct consumer access embodiment now being described.

The instant invention provides a front-end clearing house (a centralized buffer between the customer and the various retailer/e-tailers) for the purpose of validating legitimate returns that comply with the retailer/e-tailer and/or manufacturer's returns policy and guidelines. Once the product is determined to be eligible for return (using the product's unique identifier, such as serial number and the applicable return criteria) additional menus (similar to those described above with respect to the store embodiment) will appear to prompt the user for any additional desired information. This information may be, for example, personal information used to determine if the person attempting to return the product is, in fact, the rightful or original owner of the particular product and is eligible for a return credit. The system may consider the person attempting to return the product as the rightful purchaser by, for example, requesting the customer to enter information that the person who purchased the product should know, such as approximately when and where the product was purchased. The entered information can then be compared with the information in the ER database 1904 to make a determination if the return should be accepted by the particular person seeking to make the return. This screen may be similar to that shown in FIG. 15 as described above. If the ER system determines that the product is eligible for return, the customer is provided with a pre-return return authorization (RA), as well as detailed instructions on where to ship the product, who to expect a refund from and the approximate processing time.

It is noted that when products are purchased on-line through an e-tailer, the transaction information for the ER database can be obtained any time during the fulfillment process. For example, the warehouse that ships the product could scan or otherwise obtain the unique identifier (e.g. serial number). This information can then be sent to the ER database together with information on the purchase date, so that the information can be matched with applicable return criteria and stored for later use with a possible return request for the product. When products are purchased on-line, the e-tailer typically would have the credit card or check information on the purchaser. This information can be used later by the e-tailer to issue a refund or credit after the system notifies the e-tailer that the product has been properly returned. However, if sufficient information is not available on the purchaser to provide a refund, the Web site may request all necessary information during the initial return authorization requesting procedure.

Figure 20:
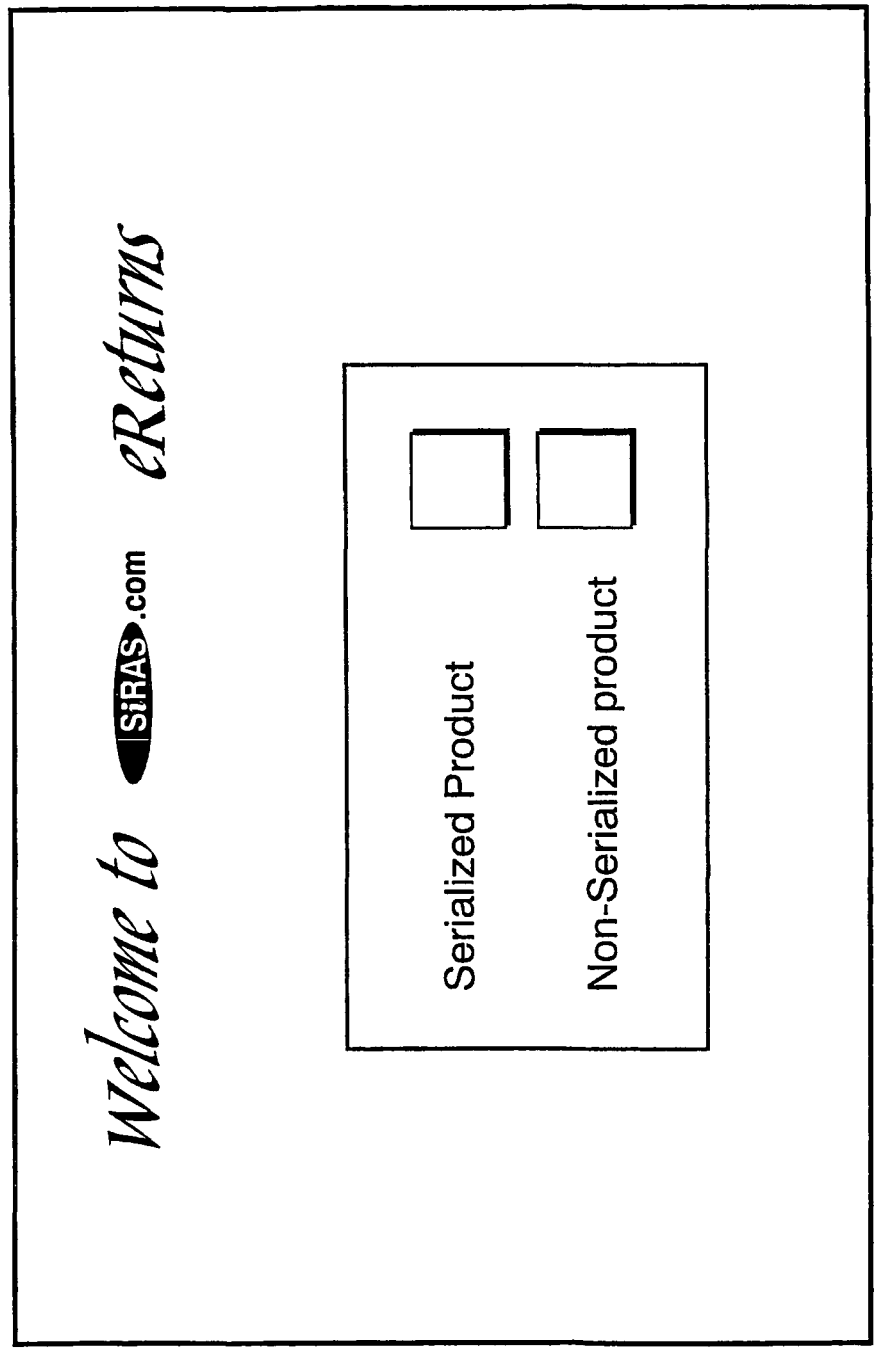
FIG. 20 shows an exemplary initial screen on the Web site of FIG. 19, wherein the customer indicates whether the product sought to be returned is serialized or non-serialized.

FIG. 20 shows a sample screen that could be initially shown on the Web site 1902 for the purpose of asking if the product is a serialized or non-serialized product (i.e. was it previously registered with the ER system). If so, another screen, such as shown in FIG. 21, is then displayed to obtain the serial number and the place of purchase. If not serialized, the system would then provide information to the customer regarding returns of non-serialized products. For example, the system could automate whatever existing procedures the e-tailer or retailer has for accepting returns of such products.

In a preferred embodiment, the e-tailer would provide on its web site 1908 a link to the returns Web site 1902, so that a customer who desires to return a product can access the original site where the product was purchased and then click on a banner, icon or the like to be redirected to the returns Web site 1902.

Figure 22:

Additional exemplary screens are shown in FIGS. 22-35. FIG. 22 shows an example where the product is good for return; FIGS. 23 and 24 show examples where the product is not good for return with manager override; FIGS. 25 and 26 show examples where the product is not good for return (less than extended period), good for warranty repair; FIGS. 27 and 28 show examples where the product is not good for return (greater than extended period), good for warranty repair; FIGS. 29 and 30 show examples where the product is not good for return (no override), not good for warranty repair with manager override; FIGS. 31-33 show examples where all product return periods have expired (no override), providing repair center lookup; FIG. 34 shows an example where the product was manufactured by a non-participating manufacturer; and FIG. 35 shows an example where there is a UPC/Serial Number mismatch between the product packaging and the product.

The implementations described above illustrate the characteristics, features and advantages of the present invention. These implementations, of course, are not exhaustive, and other implementations within the scope and spirit of the present invention will be apparent to those skilled in the art. Although the invention is described primarily in the context of a three-level customer/retailer/manufacturer arrangement, other arrangements are available. For example, a four-level consumer/individual chain store/store headquarters/manufacturer arrangement may be implemented. Yet further levels may be added.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An electronic registration (ER) system comprising a processing system including at least one processor, the processing system being configured to:

receive a unique product identifier for a product previously purchased from an e-tailer presented for possible return;

access a product return database storing product return information for a plurality of previously purchased products to determine, in connection with the unique product identifier, whether the product presented for possible return qualifies for return; and generate and transmit a return authorization number and return instructions if the product being returned qualifies for return to enable the product presented for return to be returned directly to a manufacturer thereof.

2. The system of claim 1, wherein the processing system is further configured to provide general product information if the product does not qualify for return, and wherein the general product information comprises at least one of return policies, set-up information, repair information, warranty information, and service locations.

3. The system of claim 1, wherein the e-tailer and manufacturer are separate entities.

4. The system of claim 1, wherein the return instructions comprise at least one of return shipping instructions, how and from where to expect a refund, how and from where to expect an exchange, and an estimated processing time.

5. The system of claim 1, wherein the product identifier is a product serial number.

6. The system of claim 1, further comprising an interface accessible by a return center, the interface being configured to receive messages from the return center when returned products are received by the return center from purchasers who have returned those products.

7. The system of claim 6, wherein the interface is configured to receive the messages from the return center and, in response to a received message from the return center, to generate a confirmation message for, and send the confirmation to, a party responsible for providing a refund or exchange to the respective purchaser.

8. The system of claim 7, wherein the party is the e-tailer associated with the original purchase.

9. The system of claim 1, further comprising a tracking subsystem configured for access by purchasers in order to lookup status information concerning a return operation, the status information indicating whether: a return authorization (RA) number has been generated, a returned product has been received by the product's manufacturer, a request for refund is being processed, and a refund has been made.

10. A method of operating an electronic registration (ER) system comprising a processing system including at least one processor, the method comprising:

receiving, over a network connection, a unique product identifier for a product previously purchased from an e-tailer by a consumer and presented for possible return;

accessing a product return database storing product return information for a plurality of previously purchased products to determine, in connection with the unique product identifier, whether the product presented for possible return qualifies for return;

generating a return authorization number and return instructions if the product being returned qualifies for return to enable the product presented for return to be returned directly to a manufacturer thereof; and transmitting the return authorization number and return instructions to the consumer if the product being returned qualifies for return.

11. The method of claim 10, further comprising providing general product information to the consumer if the product does not qualify for return.

12. The method of claim 11, wherein the general product information comprises at least one of return policies, set-up information, repair information, warranty information, and service locations.

13. The method of claim 10, wherein the return instructions comprise at least one of return shipping instructions, how and from where to expect a refund, how and from where to expect an exchange, and an estimated processing time.

14. The method of claim 10, wherein the product identifier is a product serial number.

15. The method of claim 10, further comprising receiving, via an interface accessible by a return center, a message from the return center that a returned product has been received.

16. The method of claim 15, further comprising:

generating a confirmation message when the message is received; and sending the confirmation message to a party responsible for providing a refund or exchange to the consumer who purchased the product.

17. The method of claim 16, wherein the party is the e-tailer associated with the product's original purchase.

18. The method of claim 10, further comprising providing status information concerning a return operation, in connection with a tracking subsystem, the status information indicating whether: a return authorization (RA) number has been generated, a returned product has been received by the product's manufacturer, a request for refund is being processed, and a refund has been made.

19. A non-transitory computer readable storage medium tangibly storing a program comprising instructions that, when run, manage an electronic registration (ER) system by at least:

receiving, over a network connection, a unique product identifier for a product previously purchased from an e-tailer by a consumer and presented for possible return;

accessing a product return database storing product return information for a plurality of previously purchased products to determine, in connection with the unique product identifier, whether the product presented for possible return qualifies for return;

generating a return authorization number and return instructions if the product being returned qualifies for return to enable the product presented for return to be returned directly to a manufacturer thereof; and transmitting the return authorization number and return instructions to the consumer if the product being returned qualifies for return.

20. The non-transitory computer readable storage medium of claim 19, wherein the program comprises further instructions for at least:

receiving, via an interface accessible by a return center, a message from the return center that a returned product has been received;

generating a confirmation message when the message is received; and sending the confirmation message to a party responsible for providing a refund or exchange to the consumer who purchased the product.

* * * * *